United States Patent
Kim et al.

(10) Patent No.: US 9,609,645 B2
(45) Date of Patent: *Mar. 28, 2017

(54) METHOD FOR TRANSMITTING DOWNLINK CONTROL CHANNEL IN A MOBILE COMMUNICATIONS SYSTEM AND A METHOD FOR MAPPING THE CONTROL CHANNEL TO PHYSICAL RESOURCE USING BLOCK INTERLEAVER IN A MOBILE COMMUNICATIONS SYSTEM

(71) Applicant: LG ELECTRONICS, Seoul (KR)

(72) Inventors: So Yeon Kim, Anyang-si (KR); Young Woo Yun, Anyang-si (KR); Ki Jun Kim, Anyang-si (KR); Moon Il Lee, Anyang-si (KR); Hyun Soo Ko, Anyang-si (KR); Jae Hoon Chung, Anyang-si (KR); Ji Ae Seok, Anyang-si (KR); Seung Hyun Kang, Anyang-si (KR); Suk Hyon Yoon, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,257

(22) Filed: Jul. 11, 2016

(65) Prior Publication Data

US 2016/0323857 A1 Nov. 3, 2016

Related U.S. Application Data

(63) Continuation of application No. 14/703,437, filed on May 4, 2015, now Pat. No. 9,414,376, which is a
(Continued)

(30) Foreign Application Priority Data

Nov. 30, 2007 (KR) .......... 10-2007-0123603
Nov. 30, 2007 (KR) .......... 10-2007-0123605
(Continued)

(51) Int. Cl.
H04W 72/04 (2009.01)
H04L 5/00 (2006.01)
H04W 48/12 (2009.01)

(52) U.S. Cl.
CPC ......... H04W 72/042 (2013.01); H04L 5/0007 (2013.01); H04L 5/0053 (2013.01); H04W 48/12 (2013.01)

(58) Field of Classification Search
CPC ... H04L 1/0071; H04L 5/0053; H04L 5/0007; H04W 72/042; H04W 48/12
See application file for complete search history.

(56) References Cited

U.S. PATENT DOCUMENTS 7,668,188 B2   2/2010   Chang et al.
2005/0041572 A1   2/2005   Dottling et al.
(Continued)

FOREIGN PATENT DOCUMENTS

JP  2000-174675  6/2000
JP  2003-504933  2/2003
WO  WO 2006/130541  12/2006

OTHER PUBLICATIONS

"Cyclically Shifted Multiple Interleavers", K. Kusume and G. Bauch, 2006, IEEE.
(Continued)

Primary Examiner — Habte Mered
(74) Attorney, Agent, or Firm — Dentons US LLP

(57) ABSTRACT

A method for transmitting a downlink control channel in a mobile communication system and a method for mapping
(Continued)

the control channel to physical resources using a block interleaver are provided. In order to transmit a downlink control channel in a mobile communication system, information bits are modulated to generate one or more modulation symbols according to a specific modulation scheme, the modulation symbols are interleaved using a block interleaver, and the interleaved modulated symbols are mapped to resource elements allocated for transmission of at least one control channel in a subframe, thereby transmitting the at least one control channel.

10 Claims, 39 Drawing Sheets

Related U.S. Application Data continuation of application No. 14/106,239, filed on Dec. 13, 2013, now Pat. No. 9,049,710, which is a continuation of application No. 13/928,148, filed on Jun. 26, 2013, now Pat. No. 9,055,580, which is a continuation of application No. 13/554,914, filed on Jul. 20, 2012, now Pat. No. 8,638,654, which is a continuation of application No. 12/451,093, filed as application No. PCT/KR2008/002093 on Apr. 14, 2008, now Pat. No. 8,254,245.

(60) Provisional application No. 60/983,600, filed on Oct. 30, 2007, provisional application No. 60/983,156, filed on Oct. 26, 2007, provisional application No. 60/955,869, filed on Aug. 14, 2007, provisional application No. 60/945,111, filed on Jun. 20, 2007, provisional application No. 60/914,622, filed on Apr. 27, 2007.

(30) Foreign Application Priority Data

Jan. 8, 2008 (KR) .................. 10-2008-0002201
Jan. 23, 2008 (KR) .................. 10-2008-0006927

(56) References Cited

U.S. PATENT DOCUMENTS

| | | |
|---|---|---|
| 2006/0104379 A1 | 5/2006 | Li et al. |
| 2006/0250944 A1 | 11/2006 | Hong et al. |
| 2008/0225965 A1 | 9/2008 | Pi et al. |
| 2010/0246717 A1 | 9/2010 | Aldana |

OTHER PUBLICATIONS

Inkyu Lee et al. "Space-time bit-interleaved coded modulation for OFDM systems." in: Signal Processing, IEEE Transactions, Mar. 2004, vol. 52, pp. 820-825.
Kddi et al. "L1/L2 Control Channel Structure with CDM Based Multiplexing in E-UTRA Downlink", 3GPP TSG RAN WG1 meeting #48 bis, St. Julians, Malta, Mar. 26-30, 2007, R1-071702 (original R1-070885).
Texas Instruments: "Multiplexing PDCCH Grants in E-UTRA Downlink", 3GPP TSG RAN WG1 #48 bis, St. Julians, Malta, Mar. 26-30, 2007, R1-071490.

(a)

(b)

METHOD FOR TRANSMITTING DOWNLINK CONTROL CHANNEL IN A MOBILE COMMUNICATIONS SYSTEM AND A METHOD FOR MAPPING THE CONTROL CHANNEL TO PHYSICAL RESOURCE USING BLOCK INTERLEAVER IN A MOBILE COMMUNICATIONS SYSTEM

This application is a continuation application of U.S. patent application Ser. No. 14/703,437 filed May 4, 2015, which is a continuation application of U.S. patent application Ser. No. 14/106,239 filed Dec. 13, 2013, now U.S. Pat. No. 9,049,710, which is a continuation application of U.S. patent application Ser. No. 13/928,148 filed Jun. 26, 2013, now U.S. Pat. No. 9,055,710, which is a continuation of U.S. patent application Ser. No. 13/554,914 filed Jul. 20, 2012, now U.S. Pat. No. 8,628,654, which is a continuation of U.S. patent application Ser. No. 12/451,093 filed Oct. 26, 2009, now U.S. Pat. No. 8,254,245, which is a National Stage Entry of International Application No. PCT/KR2008/002093 filed Apr. 14, 2008, which claims priority to U.S. Provisional Application No. 60/914,622 filed Apr. 27, 2007, 60/945,111 filed Jun. 20, 2007, 60/955,869 filed Aug. 14, 2007, 60/983,156 fled Oct. 26, 2007 and 60/983,600 filed Oct. 30, 2007, and to Korean Application Nos. 10-2007-0123603 filed Nov. 30, 2007, 10-2007-0123605 filed Nov. 30, 2007, 10-2008-0002201 filed Jan. 8, 2008 and 10-2008-0006927 filed Jan. 23, 2008, all of which are incorporated herein by reference.

TECHNICAL FIELD

The present disclosure relates to a mobile communication system, and more particularly, to a method for transmitting a downlink control channel in a mobile communication system and a method for mapping the control channel to physical resources using a block interleaver.

BACKGROUND ART

In an Orthogonal Frequency Division Multiplexing (OFDM) communication system, uplink/downlink data packets are transmitted in units of subframes, each of which is defined as a specific time interval including multiple OFDM symbols. In the system, multiple terminals can communicate through one base station and wireless resources are allocated through scheduling of the respective terminals. Uplink/downlink communication of a terminal is performed through the resources allocated in subframes.

Here, not only uplink/downlink data packets but also various pieces of control information for transmission of the uplink/downlink data packets are transmitted. The control information includes various pieces of information required to transmit and receive uplink/downlink data packets such as wireless resource information, coding methods, and modulation methods used for transmitting and receiving uplink/downlink data packets. Resources are allocated to all or part of multiple OFDM symbols included in one subframe for transmitting such various pieces of control information as well as for transmitting data packets. The control information is transmitted through the allocated resources in the subframe.

According to wireless resource scheduling for transmitting uplink/downlink data packets and control information of multiple terminals, the base station maps corresponding information bits to wireless resources to transmit the information bits to the terminals. In the case of downlink control channel transmission, mapping wireless resources to control channels for terminals so that the control channels are uniformly distributed and transmitted over the allocated wireless resources advantageously achieves diversity effects since pieces of control information of a number of terminals can be transmitted together in downlink. In the case where scheduling is performed using virtual resource units, a method for mapping the virtual resource units to actual physical resources should be provided to perform actual transmission.

DISCLOSURE

Technical Problem

The present invention has been made in view of the above circumstances in the background art, and it is an object of the present invention to provide a method for transmitting downlink control channels in a mobile communication system. Another object of the present invention is to provide a method for mapping control channels to physical resources using a block interleaver in a mobile communication system.

Technical Solution

In accordance with one aspect of the invention, the above objects can be accomplished by providing a method for transmitting a control channel in a mobile communication system, the method including modulating information bits to generate a plurality of modulated symbols according to a specific modulation scheme, interleaving the plurality of modulated symbols using a block interleaver in units of modulated symbol groups, each including a plurality of continuous modulated symbols, mapping a plurality of modulated symbol groups to resource elements allocated for transmission of at least one control channel in a subframe, and transmitting the at least one control channel, wherein the interleaving includes inputting the plurality of modulated symbol groups row by row to the block interleaver, performing inter-column permutation on the plurality of modulated symbol groups based on a specific permutation pattern, and outputting the plurality of modulated symbol groups column by column from the block interleaver.

The size of the block interleaver may be determined according to the number of the plurality of modulated symbol groups transmitted in the subframe.

The number of rows of the block interleaver may be determined based on a predetermined number of columns of the block interleaver and the number of the plurality of modulated symbol groups transmitted in the subframe.

Each modulated symbol group may be mapped to a resource element group having a plurality of resource elements, the number of resource elements in each resource element group being identical to the number of modulated symbols in each modulated symbol group.

The number of modulated symbols in each modulated symbol group and the number of resource elements in each resource element group may be determined according to the number of transmission antennas or spatial multiplexing rate.

The plurality of modulated symbol groups may be cyclically shifted using a cell-specific value.

The plurality of modulated symbol groups may be mapped to the resource elements excluding resource elements allocated for at least one of a reference signal, an ACK/NACK signal, and a Control Channel Format Indicator (CCFI).

The plurality of modulated symbol groups may be mapped to the resource elements according to a time-first mapping scheme.

The method may further include at least one of scrambling the information bits for the control channel prior to the modulating, mapping the plurality of modulated symbols to layers, the number of which is equal to or less than the number of transmission antennas of the mobile communication system, and precoding the plurality of modulated symbols for each layer.

The control channel may be transmitted using one or more Control Channel Elements (CCEs), each including at least one of the plurality of modulated symbols.

Advantageous Effects

According to the embodiments described in the present disclosure, it is possible to effectively transmit a downlink control channel in a mobile communication system. It is also possible to map the control channel to physical resources using a characteristic block interleaver in the mobile communication system.

In addition, according to the methods for transmitting and mapping control channels described in the present disclosure, it is possible to uniformly spread control information of each terminal over a total time/frequency domain. It is also possible to minimize the influence of inter-cell interference in multi-cell environments through randomization of inter-cell interference.

MODE FOR INVENTION

The preferred embodiments of the present invention will now be described in detail with reference to the accompanying drawings.

Figure 1:
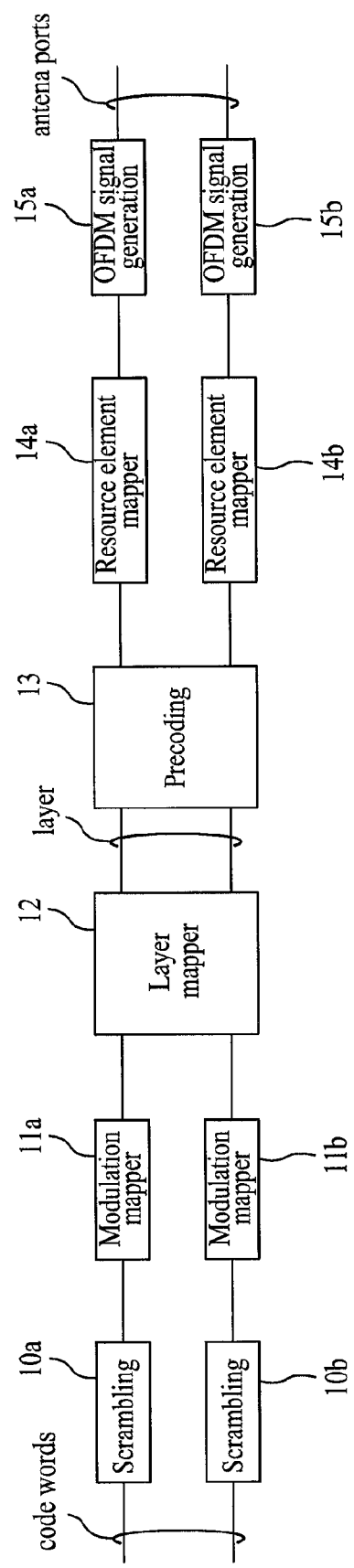
FIG. 1 illustrates an example of a procedure in which a transmitting end processes a signal to transmit a specific channel in a mobile communication system.

FIG. 1 illustrates an example procedure in which a transmitting end processes a signal to transmit a specific channel in a mobile communication system.

As shown in FIG. 1, the transmitting end in the mobile communication system performs scrambling 10a and 10b for each codeword generated after the information bit sequence is coded. Scrambling is an operation for mixing bits in a coded information bit sequence using an arbitrary rule (i.e., in an arbitrary order). This operation may be performed using a specific scrambling sequence.

Modulation operations 11(a) and 11(b) are performed for the codewords according to a specific modulation scheme to construct modulated symbols, respectively. Examples of the modulation scheme include BPSK, QPSK, 8PSK, 8QAM, 16QAM, and 64QAM. Modulated symbols generated after modulation can be represented by a complex number such as (x+jy).

Layer mapping (12) is performed to map the modulated symbol sequence generated for each codeword to layers. The number of the layers may be less than or equal to the number of transmit antennas of the mobile communication system and can be adaptively set, for example taking into consideration feedback information received from a receiving end, according to communication environments or states. Through the layer mapping operation, each codeword can be mapped to one or more layers. In the case of a multiple antenna system, layer mapping can be performed taking into consideration spatial multiplexing or transmit diversity effects.

Precoding (13) can be performed after layer mapping is done. Precoding is an operation for mapping a transmission vector generated for each layer to resources of each transmit antenna. In the multiple antenna system, multiple transmit antennas can be used more effectively through a specific precoding scheme.

In the case of the multiple antenna system, a variety of precoding schemes can be applied taking into consideration spatial multiplexing or transmit diversity effects. In the case of a closed-loop system using feedback information from the receiving end, a codebook including a plurality of precoding matrix indices can be used to easily select a precoding matrix used for precoding.

The modulated symbol sequences output for the transmit antennas through precoding in this manner are mapped to respective resource elements of the transmit antennas 14a and 14b.

The present disclosure provides a method for mapping a modulated symbol sequence for a specific channel to physical resources in a mobile communication system. The specific channel may include a variety of transport channels such as a control channel that can be defined in a mobile communication system. More specifically, the present disclosure provides a method for mapping modulated symbols of a control channel to physical resources allocated to one subframe such that resources of one terminal can be uniformly distributed over the transmission band.

When an information bit sequence is mapped to Resource Elements (REs), basically, each RE can be directly defined as a combination of an OFDM symbol in the time domain and a subcarrier in the frequency domain in examples of an OFDM communication system. Mapping to REs can be performed on the basis of a predetermined number of REs.

When mapping to REs is performed, it is possible to use the concept of a Resource Block (RB) including one or more REs. An RB can be defined as a combination of multiple continuous OFDM symbols and multiple continuous subcarriers in examples of an OFDM communication system. The size of an RB can be determined variably according to the type of a cyclic prefix or a system, a frame structure, and the like.

Besides a physical resource block which is defined as an actual time-frequency resource, a virtual resource block, which has the same size as a physical resource block and can be mapped to a physical resource block, can be defined and used as a resource block. A base station can more efficiently schedule communication resources through a logical resource concept of the virtual resource block.

For example, in this case, a specific relation is established between virtual unit blocks and actual physical resource blocks, and, if the base station schedules resources based on the virtual resource blocks, then transmission data can be mapped to actual physical resource blocks based on the scheduling so that the transmission data can be transmitted to the receiving side through the mapped actual physical resource blocks. It will be apparent to those skilled in the art that the physical resource block and virtual resource block can be interchangeably applied in the following description.

In addition, a Resource Element Group (REG) including a number of REs can be defined. Mapping of REGs can be applied in the same manner as mapping of REs. For example, when multiple antenna transmit diversity such as Space Frequency Block Coding (SFBC) is applied, it is possible to take into consideration mapping to REs corresponding to the same number of consecutive subcarriers as the number of transmit antennas according to a multiple antenna transmission scheme.

In this case, one RE can be considered one REG including only one subcarrier. Accordingly, mapping according to the above or following embodiments can be applied to REGs, each including multiple REs according to the number of transmit antennas or a spatial multiplexing rate.

A modulated symbol sequence mapped to REs is converted into signals in the time domain (for example, OFDM signals), which are then transmitted through respective transmit antennas.

Embodiment 1

According to this embodiment, interleaving can be performed using a block interleaver before mapping to physical resources.

Interleaving can be performed through the block interleaver using random interleaving or a specific permutation pattern interleaving. Due to structural characteristics of the block interleaver, interleaving effects can be obtained using a simple operation according to input and output directions (row-wise or column-wise), in which a symbol sequence is input (written) and output (read) to and from the interleaver, and permutation-related direction.

In addition, when outputs of the interleaver are mapped to physical resources, a cyclic shift operation can be additionally performed using cell-specific information such as a cell ID as a shift factor to add cell-specific elements in order to minimize inter-cell interference even when the interleaver is commonly used for multiple cells.

Figure 2:
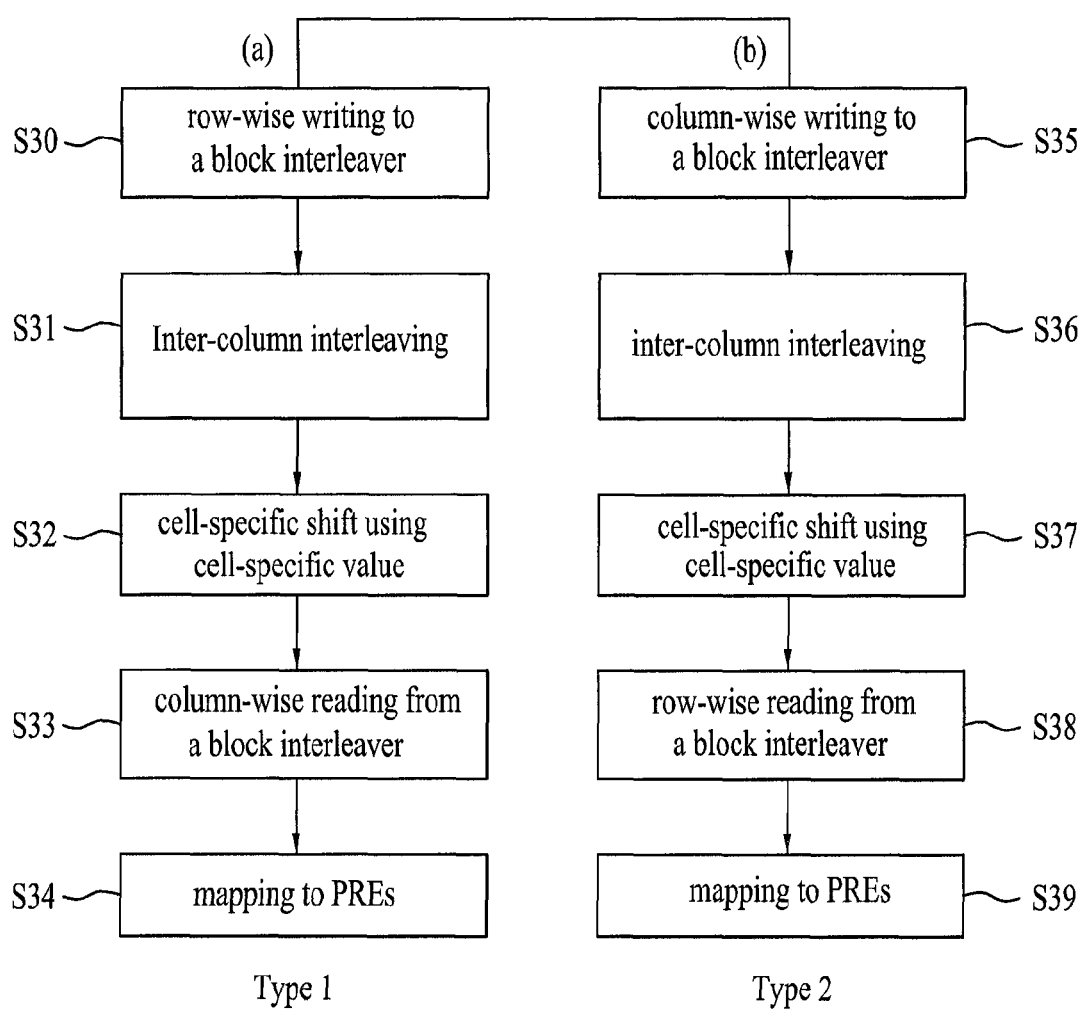
FIGS. 2(a) and 2(b) illustrate two examples of a method for mapping to a physical RE after performing interleaving using a block interleaver according to an embodiment of the invention.

FIGS. 2(a) and 2(b) illustrate two examples of a method for mapping to a physical RE after performing interleaving using a block interleaver according to an embodiment of the invention.

FIG. 2(a) illustrates an exemplary mapping method of Type 1 that is defined as the case where the direction of input to the block interleaver is a row direction (row-wise).

First, at step S30, modulated symbols in the modulated symbol sequence produced by performing processing such as coding and modulation on information bits for transmission in a subframe are sequentially input (i.e., written) row-wise (i.e., row by row) to the block interleaver as assumed above. Here, it is preferable that the modulated symbols be grouped into modulated symbol groups and then the modulated symbol sequence be input in units of modulated symbol groups to the interleaver. In the following description, it is assumed for ease of explanation that the modulated symbol sequence is input in units of modulated symbols to the interleaver and the subsequent operations are performed in units of modulated symbols. However, it is apparent that operations such as a cell-specific shift operation can be applied in the same manner to both the case of interleaving performed as described below and the case of interleaving that is performed on a modulated symbol sequence input to the interleaver in units of modulated symbol groups, each including a predetermined number of modulated symbols.

Then, at step S31, the block interleaver can perform interleaving such as inter-column interleaving on modulated symbols input row-wise to the block interleaver. For example, the block interleaver can perform intra-column permutation or inter-column permutation. The intra-column permutation or inter-column permutation can be performed using a random pattern or a specific permutation pattern. The permutation pattern can be generated using cell-specific information taking into consideration inter-cell interference.

Then, at step S32, shift operation can be additionally performed on the modulated symbols on which the intra-column permutation was performed at step S32. Taking into consideration inter-cell interference, cell-specific information can be used as a shift factor for determining a shift offset.

The shift operation of step S32 can be performed in the order as shown in FIGS. 2(a) and 2(b). Alternatively, after an output process of step S33 is performed, the shift operation can be performed on a modulated symbol sequence output (i.e., read) from the block interleaver so that the shifted symbol sequence can be mapped to physical resources. Here, after the interleaver outputs the modulated symbols at step S33, shifting may be performed using a cell-specific value, thereby reducing inter-cell interference. Of course, this operation can be removed from the operations of the invention.

At step S33, the block interleaver outputs the modulated symbols after performing random interleaving and shifting thereupon. Here, the block interleaver outputs symbols in a column-wise manner opposite to the manner in which they were input to the block interleaver. Then, at step S34, the output symbol sequence is mapped to physical REs allocated for control channel transmission included in a subframe and the mapped sequence is then transmitted to one or more terminals.

More specifically, interleaving is performed using a block interleaver which is common for multiple cells and cyclic shift is performed on the modulated symbol sequence output from the block interleaver using cell-specific information, thereby reducing system complexity and the amount of signaling information while reducing inter-cell interference.

FIG. 2(b) illustrates an exemplary mapping method of Type 2 that is defined as the case where the direction of input to the block interleaver is a column direction (column-wise).

The difference between the method of FIG. 2(b) and that of FIG. 2(a) is that the modulated symbol sequence produced by performing processing such as coding and modulation on information bits for transmission in a subframe is sequentially input (i.e., written) to the block interleaver column-wise (column by column) rather than row-wise as assumed above at step S35, permutation is performed row by row at step S36, and the modulated symbols are output (i.e., read) row-wise (i.e., row by row) from the block interleaver at step S38. That is, detailed operations of the method of FIG. 2(b) are similar to those of the method of FIG. 2(a) with the only difference being input and output directions of the block interleaver and the units in which permutation is performed.

The mapping at steps S34 and S39 in FIGS. 2(a) and 2(b) can be implemented using a frequency (subcarrier)-first mapping scheme or a time (OFDM symbol)-first mapping scheme or a mapping scheme in which the two schemes are applied in units of Physical Resource Blocks (PRBs) in the time/frequency resource regions.

The size of the block interleaver can be determined using a variety of methods. For example, for ease of use of the block interleaver, either the row or column size of the block interleaver can be fixed and the other can be determined to be variable according to the amount of information. For example, when a block interleaver is used in mapping for control channel transmission, the column size of the block interleaver is fixed and the row size can be varied according to the number of REs or the number of modulated symbols corresponding to a control channel transmitted in a subframe.

On the other hand, when the determined size of the block interleaver does not match the number of physical REs allocated for transmission of a specific channel in a subframe, for example, when the size of the block interleaver is larger than the number of physical REs allocated for transmission of a specific channel in a subframe, the degree of freedom of the size of the block interleaver can be increased by additionally performing processes of adding dummy elements to modulated symbols when the symbols are input to the block interleaver and pruning the dummy elements when the modulated symbols are output from the block interleaver.

In addition, in the case where resources allocated for different channel transmission are included in resources included in a region allocated for specific channel transmission in a subframe, mapping can be performed taking into consideration the number of REs excluding the resources allocated for different channel transmission. Alternatively, mapping can be carried out by performing interleaving on a plurality of channels together.

For example, the number of REs, which can be used for control channel transmission in OFDM symbols used for downlink control channel transmission through a subframe, may exclude the number of REs used for transmission of a Reference Signal (RS), a Physical Control Format Indication Channel (PCFICH) carrying a Control Channel Format Indicator (CCFI) which is information regarding a control channel transport format, a Paging Indicator Channel (PICH) or a Physical Hybrid-ARQ Indicator Channel (PHICH) carrying downlink (DL) ACK/NACK, and the like in the OFDM symbols.

Figure 3:
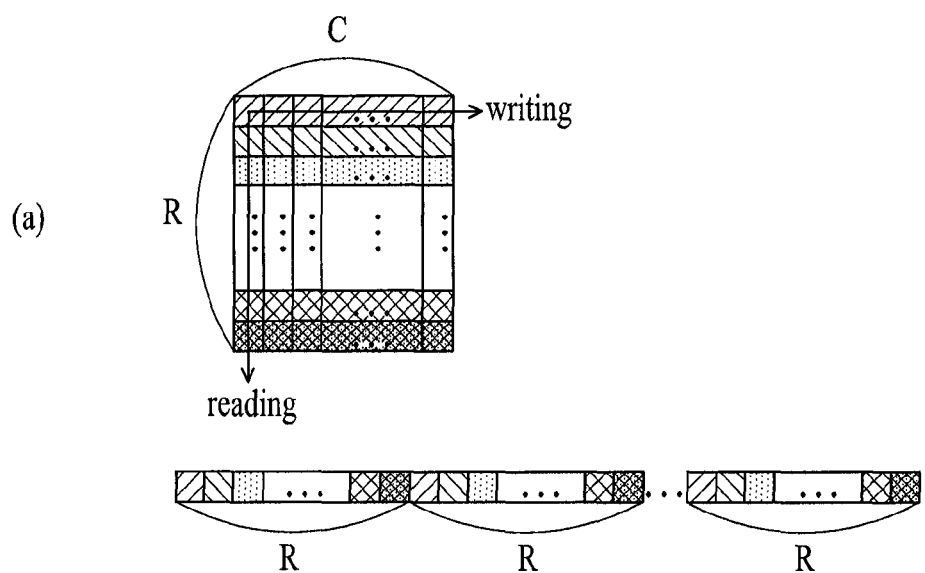
FIGS. 3(a) and 3(b) illustrate detailed examples of a block interleaver applicable to an embodiment of the invention wherein the block interleaver operates with different input and output directions.
Figure 3:
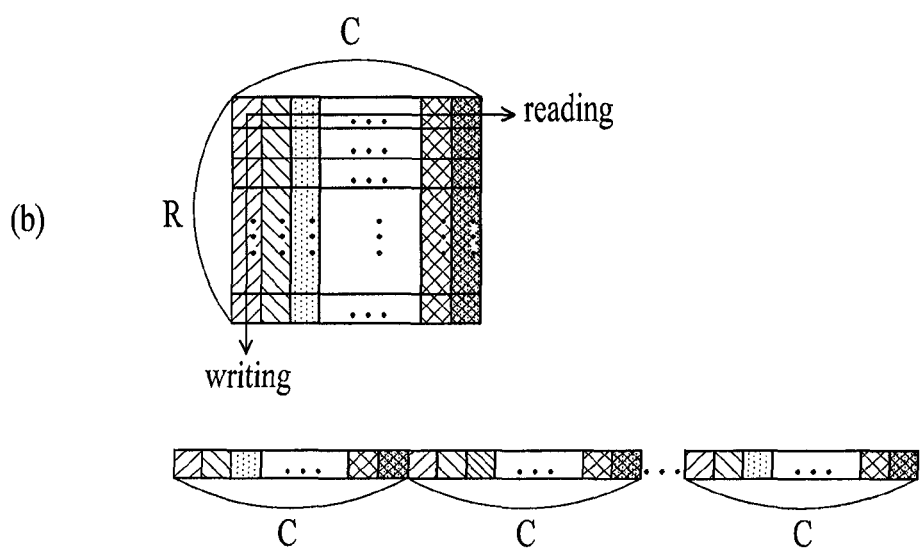

FIGS. 3(a) and 3(b) illustrate detailed examples of a block interleaver applicable to an embodiment of the invention wherein the block interleaver operates with different input and output directions. In FIGS. 3(a) and 3(b), "R" denotes the number of rows and "C" denotes the number of columns.

FIG. 3(a) illustrates input and output operations of the block interleaver when modulated symbols are input in a row direction (row-wise) to the block interleaver. Since modulated symbols are input row-wise, they will be output column-wise according to the embodiment as shown in FIG. 3(a). That is, a modulated symbol sequence can be input to the block interleaver sequentially from 1st to Rth rows of the block interleaver or in any order of rows. After interleaving is performed, modulated symbols can be output from the block interleaver sequentially from 1st to C columns of the block interleaver or in any order.

FIG. 3(b) illustrates input and output operations of the block interleaver when modulated symbols are input in a column direction (column-wise) to the block interleaver. Since modulated symbols are input column-wise, they will be output row-wise according to the embodiment as shown in FIG. 3(a). That is, a modulated symbol sequence can be input to the block interleaver sequentially from 1st to Cth columns of the block interleaver or in any order of columns. After interleaving is performed, modulated symbols can be output from the block interleaver sequentially from 1st to R rows of the block interleaver or in any order.

The order of elements before they are input to the block interleaver and the order of elements that are output from the block interleaver can be changed (or can be made different) through the simple method of using different input and output directions of the block interleaver in this manner. Using the block interleaver with different input and output directions in the above manner allows channel elements to be distributed and transmitted uniformly over resources.

Figure 4:
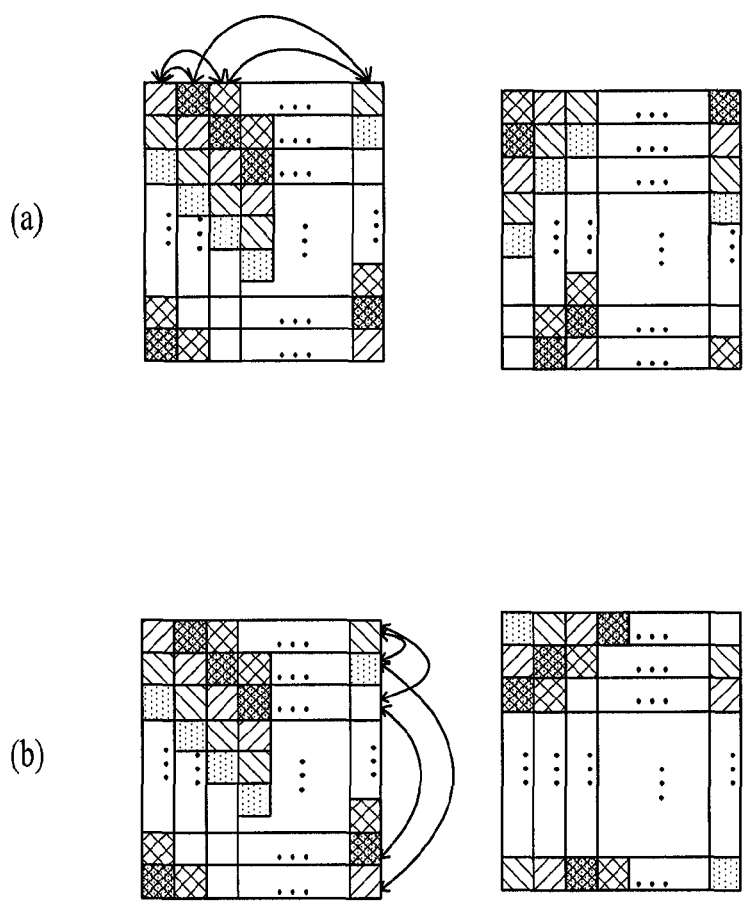
FIGS. 4(a) and 4(b) illustrate how a permutation operation is performed in the method of interleaving using a block interleaver according to an embodiment of the invention.

FIGS. 4(a) and 4(b) illustrate how a permutation operation is performed in the method of interleaving using a block interleaver according to an embodiment of the invention.

When a modulated symbol sequence is input to the block interleaver, the inter-column permutation or inter-row permutation operation according to the embodiment can be performed by replacing all modulated symbols in a row or column in the block interleaver with those of another row or column.

For example, when inter-column permutation shown in FIG. 4(a) is performed, all modulated symbols input to the first column can be replaced with those of another column. When inter-row permutation shown in FIG. 4(b) is performed, modulated symbols input to the first row can be replaced with those of another row.

Inter-row permutation or inter-column permutation is an operation for changing the order of columns or rows to be output from the interleaver before the interleaver outputs the modulated symbols. This operation can change the order of columns or rows to be mapped to physical REs after the interleaver outputs modulated symbols.

In particular, diversity or randomness can be increased if the inter-column permutation operation is performed when the input direction is a row direction and the output direction is a column direction as shown in FIG. 4(a) and the inter-row permutation operation is performed when the input direction is a column direction and can be increased if the output direction is a row direction as shown in FIG. 4(b).

In this case, a unique permutation pattern such as a cell ID of each cell can be generated using unique information of each cell in order to minimize the influence of inter-cell interference.

The influence of inter-cell interference can also be reduced by performing an inter-column permutation operation using a specific pattern commonly used for each cell and an operation such as cyclic shift using a cell-specific factor.

FIGS. 5(a) and 5(b) illustrate example methods for performing intra-column permutation or intra-row permutation using a block interleaver according to an embodiment of the invention.

Specifically, FIG. 5(a) illustrates how intra-column permutation is performed using a block interleaver. This method is more effective when the input direction of the block interleaver is a row direction.

One specific example of the method of intra-column permutation in the block interleaver is intra-column random reordering. That is, $0^{th}$ column random reordering is performed on interleaver elements included in a first column of the block interleaver and $1^{st}$ column random reordering is performed on interleaver elements included in a second column of the block interleaver. In the same manner, $2^{nd}$ column random reordering is performed on interleaver elements included in a third column of the block interleaver and $c-1^{th}$ column random reordering is performed on interleaver elements included in a Cth column of the block interleaver.

The intra-column random reordering operation can be implemented by performing a random reordering process in which row positions of elements of each column are replaced with row positions corresponding to the generated random numbers through random number generation or allocation. The random reordering operation can be implemented as a detailed method in which, when a random pattern for interleaving is obtained, the random pattern is stored as a lookup table in a storage medium and the lookup table is used to smoothly perform random interleaving and de-interleaving.

When the above intra-column random reordering operation is applied, the order of elements of each column is determined without any regularity with the orders of elements of other columns since, when random reordering is applied to each column, the order of row positions of elements of each column is individually changed based on random numbers generated for the column, regardless of random patterns produced by random reordering of elements in neighboring columns. Due to these characteristics, unique mapping patterns of cells can be generated even though the same interleaver is used for all cells.

Mathematical Expression 1 is an example representation of the intra-column random reordering operation according to the embodiment.

$$(r',c')=(RR(r,c),c) \quad \text{[MATHEMATICAL EXPRESSION 1]}$$

In Mathematical Expression 1, r and c are variables representing row and column indices of an element of the block interleaver to which an interleaver element has been mapped or from which an interleaver element will be pruned before the intra-column reordering operation is performed. r' and c' are variables representing row and column indices of an element of the block interleaver to which an interleaver element has been mapped or from which an interleaver element will be pruned after the intra-column reordering operation is performed.

In Mathematical Expression 1, an operation for generating a unique reordering pattern of each column is defined as a function RR(r,c). Any specific operation method for generating a unique reordering pattern of each column can be represented by the function RR(r,c). Mathematical Expression 2 represents an example of the function RR(r,c).

$$RR(r,c)=\{r+CH(r,c)+CO(c)\}\% R \quad \text{[MATHEMATICAL EXPRESSION 2]}$$

In Mathematical Expression 2, a function CH(r,c) defines hopping of a block interleaver element of a row index r (i.e., a row having index r) in a column index c (i.e., a column having index c) to an element corresponding to a unique value within a range of R elements in a column vector using the two (row and column) indices. In addition, a function CO(c) defines addition of a different offset to all elements of each column index c. A variety of operation methods can be represented using the function CH(r,c) and CO(c). Mathematical Expression 3 and Mathematical Expression 4 represent detailed examples of the functions CH(r,c) and CO(c) and the function RR(r,r) specified by these two functions.

$$CH(r,c)=r*c$$

$$CO(c)=c+P$$

$$RR(r,c)=\{r*(1+c)+c+P\}\% R \quad \text{[MATHEMATICAL EXPRESSION 3]}$$

$$CH(r,c)=r*(c+P)$$

$$CO(c)=c+P$$

$$RR(r,c)=\{r*(1+c+P)+c+P\}\% R \quad \text{[MATHEMATICAL EXPRESSION 4]}$$

In Mathematical Expressions 3 and 4, "P" represents the difference between an R value finally determined when the number of rows of the block interleaver is determined to be a prime number and an R value determined without taking into consideration the prime number.

When a random pattern for each column is generated, a random number may be generated within a range having a row size of R so as to satisfy a mapping requirement of the frequency domain that modulated symbols of a specific channel of a terminal be distributed and transmitted over a total system bandwidth and also to satisfy a mapping requirement of the time domain that modulated symbols of a specific channel of a terminal be transmitted uniformly using n OFDM symbols used for transmission.

If a random pattern is generated that does not satisfy these requirements, the following problem occurs. For example, in the case where a control channel such as PHICH or PCFICH is transmitted through a first OFDM symbol, the first OFDM symbol may include a CCE to which none of the modulated symbols of a control channel for a single terminal can be mapped according to a cell-specific shift value since the number of REs available for PDCCH transmission in the first OFDM symbol is small.

In one method to prevent this problem, a random pattern of each column and a random pattern of a previous column can be compared and a random number distance associated with random numbers generated in each column of a block interleaver for the modulated symbols of a specific channel of a terminal can be determined to be less than the number of interleaver elements that can be mapped to the first OFDM symbol. Here, the random number distance can be defined as the difference between the position index of a specific column of a block interleaver for the modulated symbols of a control channel of a specific terminal and the position index of a column subsequent to the specific column.

Taking into consideration the mapping requirement of the time domain described above, it is possible to achieve better effects in terms of transmission power scheduling and coverage of specific channels.

Another specific example of the method of intra-column permutation in the block interleaver is intra-column permutation (column-wise permutation) using a specific permutation pattern. This method can be implemented through a specific permutation pattern based on row and column indices of a resource element group that has been input to the block interleaver. In the column-wise permutation method, it is preferable that a permutation pattern applied to each column be uniquely constructed for each column. This enables implementation of intra-column (column-wise) permutation patterns with a very low correlation therebetween.

Figure 5:
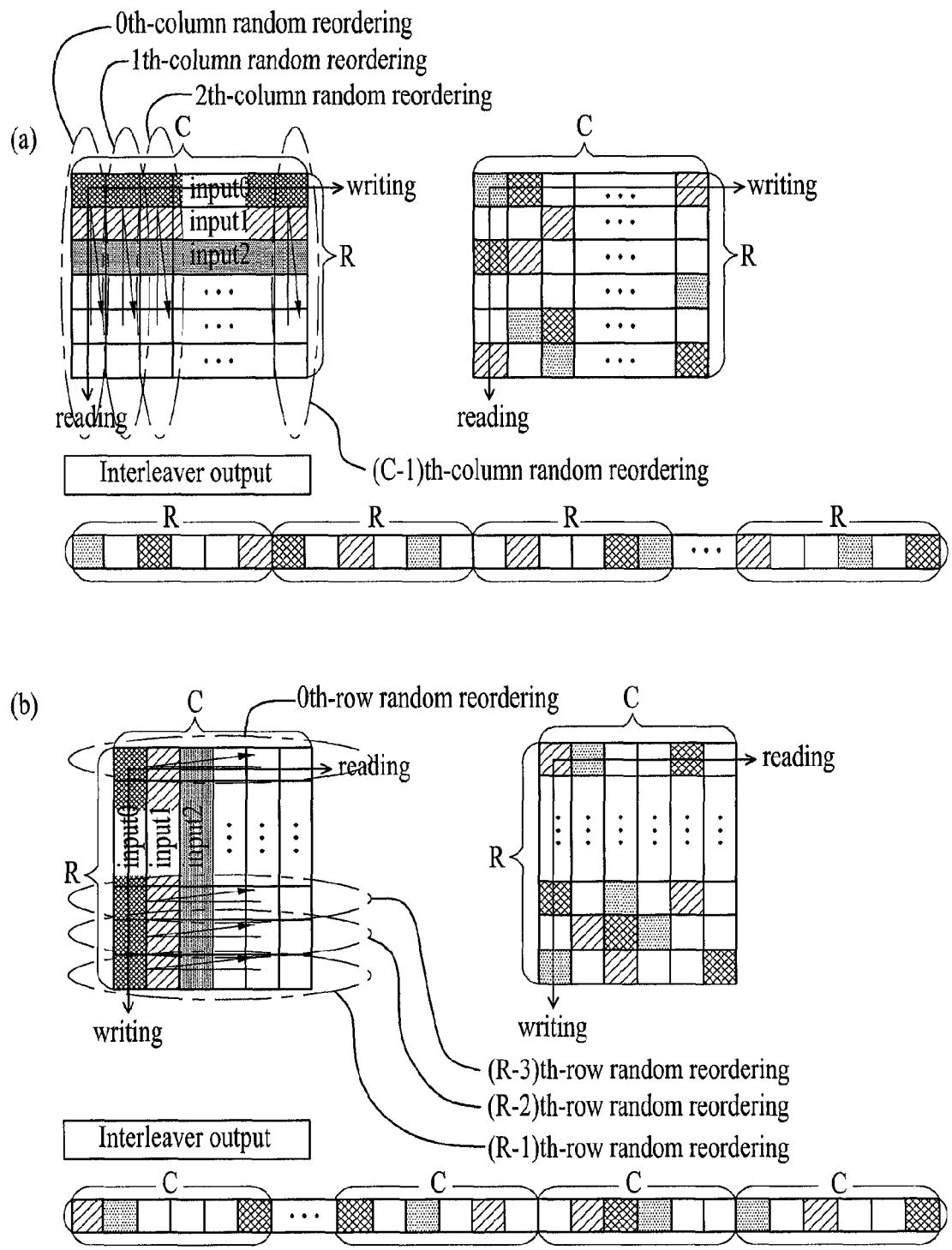
FIGS. 5(a) and 5(b) illustrate example methods for performing intra-column permutation or intra-row permutation using a block interleaver according to an embodiment of the invention.

In the case where interleaving is performed based on a specific permutation pattern using the block interleaver as described above, the basic operating structure is similar to that of the random interleaving of FIG. 5 with the only difference being that notations "ith-column random reordering" and "ith-row random reordering" can be replaced with "ith-column-wise permutation" and "ith-row-wise permutation". Here, "i" represents an index of each row or column when interleaving is performed row by row or column by column.

The embodiment of the permutation pattern can be represented by the following Table 1.

TABLE 1

PERMUTATION PATTERNS n = 3 (sequence length is 144)

{5, 29, 50, 51, 72, 88, 112, 130, 143, 15, 23, 43, 59, 82, 99, 107, 131, 147, 11, 27, 40, 61, 80, 100, 110, 123, 140, 16, 26, 44, 65, 78, 95, 105, 127, 145, 8, 21, 42, 66, 83, 87, 104, 120, 134, 3, 25, 45, 58, 69, 90, 103, 126, 149, 9, 32, 46, 67, 79, 98, 102, 118, 136, 13, 30, 49, 53, 75, 97, 114, 121, 144, 6, 17, 35, 56, 77, 101, 106, 124, 142, 1, 19, 37, 60, 74, 96, 116, 128, 139, 0, 24, 38, 57, 81, 91, 109, 133, 146, 4, 28, 34, 54, 76, 85, 108, 129, 135, 7, 31, 48, 62, 73, 89, 113, 119, 137, 12, 33, 47, 55, 71, 92, 117, 122, 138, 2, 20, 36, 52, 70, 94, 115, 125, 141, 10, 18, 39, 63, 68, 86, 111, 132, 148} n = 2 (sequence length is 72)

{7, 12, 23, 28, 40, 50, 52, 63, 67, 4, 15, 26, 29, 41, 46, 57, 62, 70, 8, 13, 22, 30, 38, 49, 51, 66, 69, 2, 11, 19, 32, 39, 44, 54, 61, 68,

TABLE 1-continued

PERMUTATION PATTERNS 6, 10, 24, 27, 42, 43, 56, 59, 71, 0, 9, 25, 31, 35, 47, 58, 64, 73, 5, 17, 20, 33, 36, 45, 53, 60, 74, 3, 16, 18, 34, 37, 48, 55, 65, 72}

In Table 1, numbers in "{ }" denote sequence indices of symbols in a modulated symbol sequence after interleaving, which are arranged in the order of sequence indices of the symbols in the modulated symbol sequence before interleaving. "n" denotes the number of OFDM symbols used for transmission of a specific channel. Here, sequence indices can be sequentially allocated to symbols in the modulated symbol sequence before interleaving in the order in which the symbols are input to the interleaver (i.e., allocated sequentially in the row direction in which the modulated symbols are input to the block interleaver).

Thus, the sequence indices of symbols in a modulated symbol sequence before interleaving can be referred to as input sequence indices. That is, the index of an element of 1st row and 1st column is determined to be 0, the index of an element of 1st row and 2nd column is determined to be 1, and the index of an element of 1st row and 3rd column is determined to be 2. After indices of all elements of the 1st row are determined, the next index can be allocated to an element of 2nd row and 1st column. Remaining block interleaver elements can be sequentially analyzed using the same method.

Here, sequence indices can be sequentially allocated to symbols in the modulated symbol sequence after interleaving in the order in which the symbols are output from the interleaver (i.e., sequentially allocated in the column direction in which the modulated symbols are output from the block interleaver). The sequence indices of the symbols in the modulated symbol sequence after interleaving are denoted by numbers in Table 1. Thus, the sequence indices of symbols in the modulated symbol sequence after interleaving can be referred to as output sequence indices. That is, the index of an element of 1st row and 1st column is determined to be 0, the index of an element of 2nd row and 1st column is determined to be 1, and the index of an element of 3rd row and 1st column is determined to be 2. After indices of all elements of the 1st column are determined, the next index can be allocated to an element of 1st row and 2nd column. Remaining block interleaver elements can be sequentially analyzed using the same method.

According to the position index allocation method, Table 1 can be analyzed as follows. When n=3, a modulated symbol at a 0th position is shifted to a 5th position after interleaving and a modulated symbol at a 1st position is shifted to a 29th position after interleaving. In this case, two identical symbols before and after random interleaving are located in the same column, which indicates that intra-column random interleaving has been performed.

FIG. 5(b) illustrates how intra-row permutation is performed using a block interleaver. This method is more effective when the input direction of the block interleaver is a column direction. The method of FIG. 5(b) can be considered the same as that of FIG. 5(a) in terms of the purposes and characteristics of operations of the method. However, the method of FIG. 5(b) is performed in a different random reordering or permutation-related direction from that of FIG. 5(a).

Interleaver elements can be cyclically shifted using cell-specific information such as a cell ID of each cell after the block random interleaving process is completed as described above. For example, an output sequence of the block interleaver for a cell having a shift factor of 0 can be directly mapped to physical REs without shifting and an output sequence of the block interleaver for a cell having a shift factor of 10 can be mapped to physical REs after cyclically shifting elements of the sequence by 10.

The cell-specific cyclic shift operation can be performed for the entirety of an output sequence of the block interleaver. For example, an interleaving element corresponding to the sum of a cell-specific value and a sequence position value (for example, a sequence index) indicating a position in the output sequence from the block interleaver can be mapped to an RE corresponding to the sequence index of the output sequence through the cell-specific shift operation. In this case, a modulo operation using the size of the entire output sequence may be added such that the sum of the cell-specific value and the sequence index does not exceed the size of the entire output sequence.

In addition, the cell-specific cyclic shift operation can be performed on the block interleaver. For example, cyclic shifting can be performed on the block interleaver column by column in the same units in which permutation is performed. Mathematical Expression 5 is an example representation of an intra-column random reordering operation to which a cyclic shift operation of interleaver elements using cell-specific information (for example, cell ID) is added.

$$(r',c')=(RR(r,c)+S(\text{Cell\_ID}),c) \quad \text{[MATHEMATICAL EXPRESSION 5]}$$

In Mathematical Expression 5, an operation for outputting a shift factor value through a cell ID is represented by a function S(Cell_ID). Mathematical Expression 6 represents an example of the function S(Cell_ID).

$$S(\text{Cell\_ID},c)=\{\text{Cell\_ID}+CO(c)\}\% R$$

$$CO(c)=c+P \quad \text{[MATHEMATICAL EXPRESSION 6]}$$

Mathematical Expression 6 represents an example where a different shift factor is generated for each column together with cell-specific information. This example additionally uses a function CO(c) that adds a different offset to all elements of each column index c described above with reference to Mathematical Expression 2.

Although Mathematical Expressions 5 and 6 represent examples where cell-specific shift is performed after interleaving is done through a block interleaver by separately using a function that outputs a shift factor value, a cell-specific value can also be taken into consideration when interleaving is performed in the above Mathematical Expressions 2 to 4.

For example, it is possible to define and use a function RR(r, c, Cell_ID) by additionally taking into consideration a unique factor such as a cell ID in a function for generating a unique reordering pattern of each column. Alternatively, it is possible to define and use a function CH(r, c, Cell_ID) by additionally taking into consideration a unique factor such as a cell ID in a function for hopping to a unique value in each column or to define and use a function CO(c, Cell_ID) by additionally taking into consideration a unique factor such as a cell ID in a function for adding a different offset to all elements of each column index c.

Of course, it is possible to generate cell-specific unique mapping patterns as described above by performing either the shift or permutation operation. In addition, by using both the shift and permutation operations in the interleaving operation in the mapping procedure, it is possible to generate a larger number of cell-specific mapping patterns than when interleaving is performed using either the shift or permutation operation alone.

Mathematical Expression 7 represents an example method of representing an algorithm that can implement virtual interleaving for an interleaving operation using the block interleaver described above.

$$r = \text{floor}(i/C)$$

$$c = i \% C$$

$$k = \{r^*(1+c)+c+P\} \% R + (c)^* R$$

$$= \{\text{floor}(i/C)^*(1+i \% C)+i \% C+P\} \% R+(i \% C)^*R \quad \text{[MATHEMATICAL EXPRESSION 7]}$$

In Mathematical Expression 7, "r" and "c," which can be defined as in the above Mathematical Expression, represent position indices in the block interleaver allocated for virtual interleaving. In addition, "i" and "k" represent the input sequence index and the output sequence index of the block interleaver that can be seen in the description of Table 1, respectively. That is, the algorithm can be constructed using relations between the input/output REG sequence indices i and k for the specific interleaving operations of the block interleaver described above.

Here, R, C, and P may have the same values as those used when the block interleaver is implemented. A function floor( ) is a truncation function which outputs the maximum of integer values equal to or less than an input value.

Using the virtual interleaving method, it is possible to achieve block interleaving effects which can easily satisfy mapping requirements in the time/frequency domain and minimize inter-cell interference in multi-cell environments without additional memory or complexity.

FIGS. 6(a) and 6(b) illustrate an example method for mapping a symbol sequence output from the block interleaver to physical resource elements according to the embodiment of the invention.

FIG. 6(a) represents an example where mapping is performed according to a time (OFDM symbol)-first mapping scheme. That is, in this method, the sequence of output symbols are sequentially mapped to physical resource elements, first on the time axis, by first increasing the OFDM symbol index in the mapping order.

FIG. 6(b) represents an example where mapping is performed according to a frequency (subcarrier)-first index mapping scheme. That is, in this method, the sequence of output symbols are sequentially mapped to physical resource elements, first on the frequency axis, by first increasing the subcarrier symbol index in the mapping order.

Figure 6:
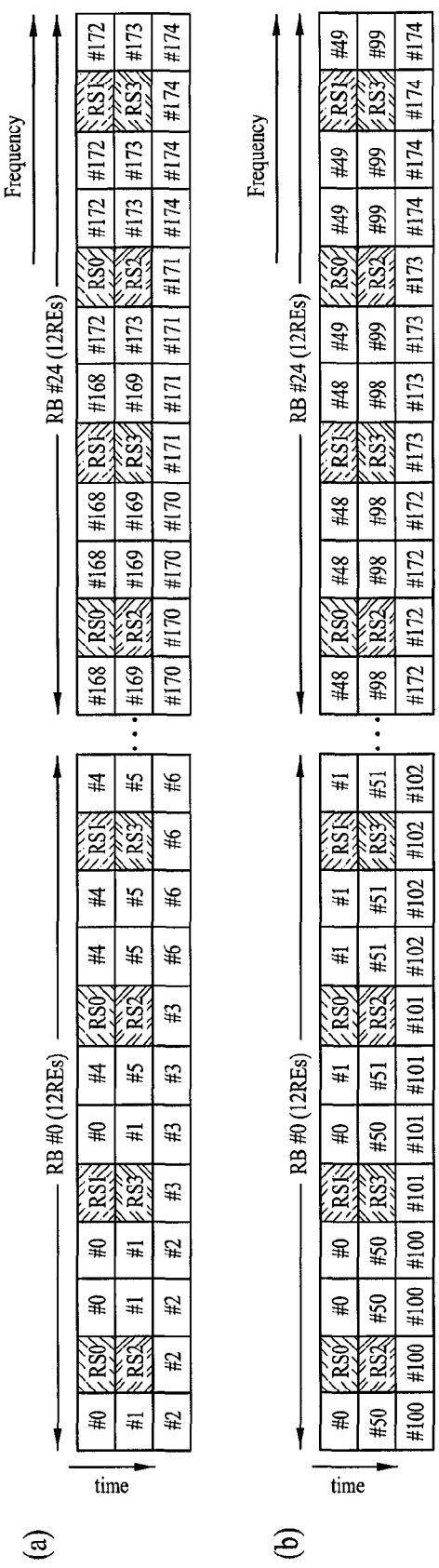
FIGS. 6(a) and 6(b) illustrate an example method for mapping a symbol sequence output from the block interleaver to physical resource elements according to the embodiment of the invention.

An index written in each block in FIGS. 6(a) and 6(b) is an index of a specific modulated symbol group transmitted through consecutive subcarriers. That is, #0 can represent physical resource elements to which modulated symbols included in a modulated symbol group 0 are mapped. In this embodiment, a single modulated symbol group includes four modulated symbols taking into consideration that the total number of transmit antennas is 4. From FIG. 6, it can be seen that modulated symbols are mapped to physical resource elements excluding those for transmitting reference signals RS0, RS1, RS2, and RS3 for the total of four antennas.

Embodiment 2

The following embodiments will be described with reference to more detailed examples where the block interleaving operation described above is performed when a base station in a mobile communication system transmits a downlink control channel carrying control information of multiple terminals, i.e., a Physical Downlink Control CHannel (PDCCH).

In the following embodiments of the invention, a control channel is transmitted using n OFDM symbols in a subframe corresponding to a Transmit Time Interval (TTI) in an OFDM communication system. Here, "n" represents the number of OFDM symbols carrying a control channel. For example, in a Long-Term Evolution (LTE) system, "n" can be selected from natural numbers equal to or less than 3 (n≤3).

Here, modulated symbols in a modulated symbol sequence of control channel information can be mapped to REs, respectively. For example, the modulated symbol sequence may be a sequence of symbols generated after a sequence of control channel information bits undergoes all or part of channel coding and rate matching, cell-specific scrambling, and modulation as described above.

A Control Channel Element (CCE), which is a virtual resource used for control channel scheduling, can be defined as an element for transmitting a control channel of a single terminal. Since the CCE is a logical resource, control information of a terminal can be actually transmitted through discontinuous physical resources even though the control information of the terminal is transmitted through a set of consecutive CCEs. Relations between logical/physical resources can be predefined in the system.

A group of modulated symbols in a CCE mapped to each REG can be defined as a mini-CCE when taking into consideration mapping to an REG including REs corresponding to the same number of consecutive subcarriers as the number of transmit antennas according to a multiple antenna transmission scheme. For example, modulated symbols in one mini-CCE can be mapped to one REG The sizes of a mini-CCI and an REG can be determined to correspond to each other. Each of the sizes of a mini-CCI and an REG can be defined as including a variable number of modulated symbols. For example, a mini-CCE can be considered a resource unit that includes a number of modulated symbols corresponding to the number of transmit antennas. Alternatively, a mini-CCE and an REG can each be defined as a modulated symbol group including a fixed number of consecutive modulated symbols. For example, a mini-CCE can be considered a resource unit including the same number of modulated symbols as the number of subcarriers included in a unit for application of an SFBC+FSTD technique, which combines Space Frequency Block Coding (SFBC) and Frequency Switched Transmit Diversity (FSTD) techniques, so that the coding technique enabling simultaneous application of the SFBC and FSTD techniques is applied in a fixed format or manner.

Here, the amount of control information that can be transmitted through a CCE can be defined according to a predefined coding rate and modulation method. Pieces of corresponding control information can be transmitted through one or more CCEs so as to provide a terminal with a coding rate achieving a specified reception quality with a modulation method having been defined.

For example, control information bits transmitted through a CCE can be defined as 48 bits when it is assumed that a CCE in a system transmission band includes 36 REs, the coding rate is 2/3, and the data modulation scheme is Quadrature Phase Shift Keying (QPSK). Pieces of corresponding control information may be transmitted through CCE aggregation of one or more CCEs so as to provide a terminal with a coding rate achieving a specified reception quality with a modulation method having been defined.

Different CCEs can be defined for control information for downlink data and control information for uplink data since the size of control information for downlink data and the size of control information for uplink data may be different.

A base station performs scheduling for control channel transmission to multiple terminals through one or more CCEs and then transmits a control channel by mapping the control channel to multiple REs or REGs in the physical domain. In the following description, a process for mapping CCEs to resources in the physical domain will be referred to as "CCE to RE mapping."

One CCE-to-RE mapping method that can be considered is distributed mapping. In this method, it is preferable that a control channel of a specific terminal or CCEs included in the control channel be mapped to physical REs in a distributed manner over n OFDM symbols and a total system band.

In terms of the frequency domain, it is possible to obtain frequency diversity gain by mapping CCEs to a total system band such that the CCEs are distributed over the total system band. In terms of the time domain, it is possible to increase coverage and to support balanced transmission power of control channels by transmitting CCEs over n OFDM symbols.

Another CCE-to-RE mapping method that can be considered is cell-specific mapping. In this method, it is preferable that CCEs be mapped to physical REs in a cell-specific pattern (i.e., in a unique pattern for each cell). This enables implementation of randomization of inter-cell interference in multi-cell environments.

For example, in the case where a base station of each cell uses the same CCE-to-RE mapping method in multi-cell environments, CCEs of each cell are mapped to the same time/frequency resource elements and therefore inter-cell interference of transmission of CCEs may be significantly increased in a specific case of the method of allocation of transmission power of CCEs.

More specifically, it is possible to support an adaptive coding rate in order to guarantee as uniform an error rate as possible in downlink control channels of the same type for terminals in various channel environments and to satisfy a preset error-rate requirement for different types of downlink control channels. In the following description, "CCE aggregation" actually refers to an Adaptive Modulation and Coding (AMC) level.

Transmission power control can be applied to each individual CCE aggregation level in a situation where limited CCE aggregation is supported in order to effectively maintain overhead of blind decoding of terminals. Here, significant inter-cell interference may occur in a specific CCE-to-RE mapping pattern in the case where the difference of transmission power between REs of the physical domain to which individual CCEs are mapped is very high.

Accordingly, it is preferable that cell-specific CCE-to-RE mapping be performed to achieve not only characteristics capable of distributing CCEs of each cell uniformly over the total time/frequency domain but also characteristics capable of minimizing the influence of inter-cell interference through randomization of the inter-cell interference.

Embodiment 3

Figure 7:
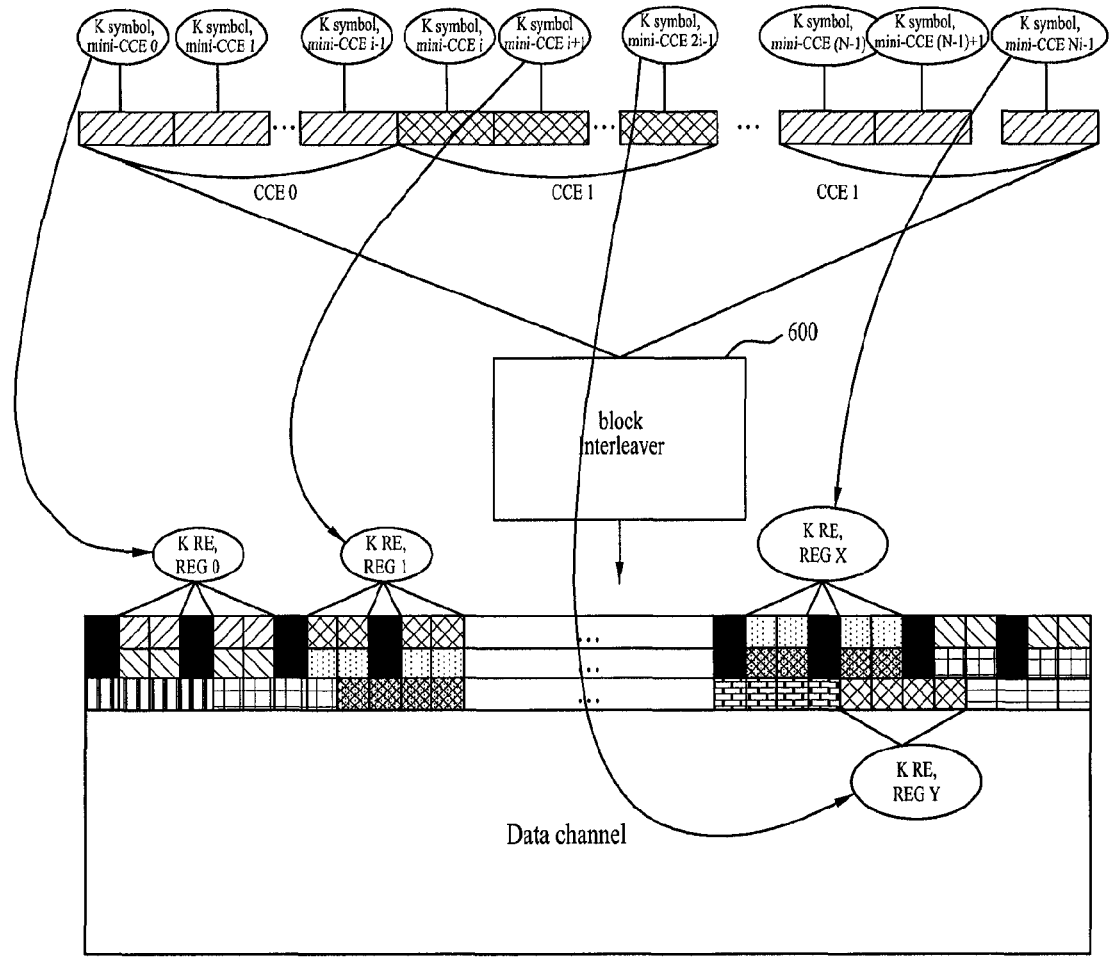
FIG. 7 illustrates a mapping relation between virtual and physical resources in an OFDM communication system.

FIG. 7 illustrates a mapping relation between virtual and physical resources in an OFDM communication system.

Specifically, FIG. 7 illustrates an example where a Resource Element Group (REG) in an OFDM symbol is a group of k subcarriers, i.e., k Resource Elements (REs), where $1 \leq k \leq$ maximum number of transmit antennas supported in system.

In this case, mini-CCEs and REGs can be mapped one to one. Here, it is preferable that mini-CCEs in one CCE be mapped to REGs in a distributed manner through an interleaving operation using a block interleaver 600 according to the invention.

A modulated symbol sequence of CCEs output from the block interleaver 600 can be sequentially mapped to physical REs in the frequency or time domain in the order from physical REs of a first OFDM symbol to those of an nth OFDM symbol. A specific rule can also be applied when modulated symbols are sequentially mapped to the frequency or time domain. In this process, it will be more effective to use a block interleaver with different input and output directions as described above.

In this case, in the operation for mapping CCE symbols to physical REs in a specific pattern, at least one of the modulated symbols of every CCE transmitted in a subframe in a specific bandwidth interval is mapped to physical REs. When multiple antennas are used, at least one REG may be mapped within a specific bandwidth interval.

In addition, since a specific bandwidth interval having such characteristics is mapped to the total system bandwidth, it is possible to satisfy a mapping requirement of the frequency domain that a CCE be mapped in a distributed manner over the total system bandwidth. In addition, using the block interleaver described above, it is possible to satisfy the time domain characteristics requirement that CCE symbols be uniformly mapped to each OFDM symbol according to a specific uniformity condition.

Consequently, applying the interleaving method with different input and output directions achieves uniform distribution of CCEs of each cell over the total time/frequency domain in the CCE-to-RE mapping procedure. That is, optimum time/frequency diversity gain can be obtained by uniformly mapping pieces of CCE information to REs in the time/frequency domain.

When an REG is defined, it is possible to perform mapping in units of REGs as described above. For example, mini-CCE 0 of CCE 0 can be mapped to REG 0 and mini-CCE i+1 of CCE 1 can be mapped to REG 1.

Reference will first be made to a method of using the block interleaver described above when mapping CCE to REs of the time/frequency domain according to a CCE-to-RE mapping method satisfying the above requirements and reference will then be made to a virtual interleaving method for virtually implementing block interleaving through setting of rules of use of symbol memory address swapping and address arrangement of an input symbol sequence, instead of implementing block interleaver operations through additional physical memory setting for each operation.

FIGS. 8(a) and 8(b) illustrate example methods for determining a block interleaver size according to an embodiment of the invention.

A block interleaver size according to the embodiment can be defined by the number of rows R and the number of columns C and the R and C values can be determined based on not only an input CCE size but also a detailed operating method of the block interleaver.

Specifically, FIG. 8(a) illustrates an example method for determining a block interleaver size in the case where the direction of input of modulated symbols to the block interleaver is a row direction. Here, the number of columns C of the block interleaver can be determined to be the CCE size (i.e., the number of REs or REGs to which one CCE is mapped). The number of rows R of the block interleaver can be determined to be the maximum number of CCEs that can be transmitted in one subframe.

By constructing a block interleaver such that one CCE can be input to one row, modulated symbols of each of a plurality of CCEs in one unit of transmission can be transmitted through distributed REs using a simple operation of applying different input and output directions.

By determining a column size of the block interleaver taking into consideration the amount of control channel information allocated to a specific terminal and performing a permutation operation on interleaver elements in each column of the block interleaver, it is possible to guarantee the requirement that, after a CCE is mapped to physical REGs, physical REGs included in the CCE be located respectively in specific frequency bandwidths.

By mapping mini-CCEs to REGs through an interleaving operation that guarantees the requirement that mini-CCEs included in a CCE be located respectively in specific frequency bandwidths, it is possible to map one CCE to the total frequency bandwidth such that the CCE is uniformly distributed over the total frequency bandwidth while preventing one CCE from being mapped locally to a specific frequency band.

However, since the number of REs allocated for transmission of a control channel in n OFDM symbols can be changed by transmission of another channel, some REG may remain even when a maximum number of CCEs have been mapped to C REGs. In this case, the maximum number of CCEs plus 1 can be determined to be the number of rows R.

More specifically, the maximum number of CCEs $N_{CCE}$ that can be transmitted through an OFDM symbol can be defined to be $$\left\lfloor \frac{K}{C} \right\rfloor.$$

In other words, R can be set to $N_{CCE}+1$ if K is greater than $N_{CCE}*C$ and R can be set to $N_{CCE}$ if K is equal to $N_{CCE}*C$.

In addition, when a block interleaver operates using a specific function to perform interleaving on each column of the block interleaver after modulated symbols are input in a row direction (row-wise), it may be preferable that the number of rows R of the block interleaver be set to a prime number. If the determined R value is a prime number, it can be directly determined to be the number of rows R of the block interleaver. If the determined R value is not a prime number, the smallest prime number greater than the determined R value can be determined to be the number of rows R of the block interleaver.

In the following, let us assume that K is the total number of REs or REGs that can be used for transmission of a control channel in n OFDM symbols used for transmission of downlink control channels through a subframe.

If the block interleaver size is determined by the R and C values determined through the above method, mapping can be performed by pruning the same number of elements as the difference between R*C and K. Here, K REs may include $N_{CCE}*C$ REs used for CCE transmission and remaining $K-(N_{CCE}*C)$ REs used for other channel transmission. The frequency domain diversity can be optimized by determining the block interleaver size also taking into consideration $K-(N_{CCE}*C)$ REs, which are not used for transmission of CCEs, among a total of K REs and performing block interleaving according to the determination.

Here, the total number of K REs or REGs that can be used for control channel transmission may exclude the number of REs used for transmission of a Reference Signal (RS), a Physical Control Format Indication Channel (PCFICH) carrying a Control Channel Format Indicator (CCFI) which is information regarding a control channel transport format, a Paging Indicator Channel (PICH) or a Physical Hybrid-ARQ Indicator Channel (PHICH) carrying downlink (DL) ACK/NACK, and the like in n OFDM symbols.

FIG. 8(b) illustrates an example method for determining a block interleaver size in the case where the direction of input of modulated symbols to the block interleaver is a column direction. Details of the implementation method of FIG. 8(b) are similar to those of FIG. 8(a) described above with the only difference being that the number of columns C of the block interleaver can be determined to be the maximum number of CCEs that can be transmitted in one subframe and the number of rows R of the block interleaver can be determined to be the CCE size (i.e., the number of REs or REGs included in one CCE).

As described above, the number of rows and the number of columns of the block interleaver are basically defined based on the maximum number of CCEs that can be transmitted within available physical REs in association with CCEs which are basic scheduling units for transmission of control channel information. However, if the total number of REs defined based on the maximum number of transmittable CCEs is not exactly equal to the total number of physical REs available for control channel transmission, time/frequency domain diversity characteristics can be kept uniform by applying the pruning technique.

In summary, the number of rows or columns of the block interleaver (i.e., the size of the block interleaver) can be increased or decreased according to the total number of available physical REs and the number of rows and columns can be changed or fixed with time depending on circumstances or conditions (or requirements).

Embodiment 4

According to this embodiment, mapping can be implemented after interleaving is performed using the block interleaver described above through a method of multiplexing CCEs for transmitting a control channel.

Figure 9:
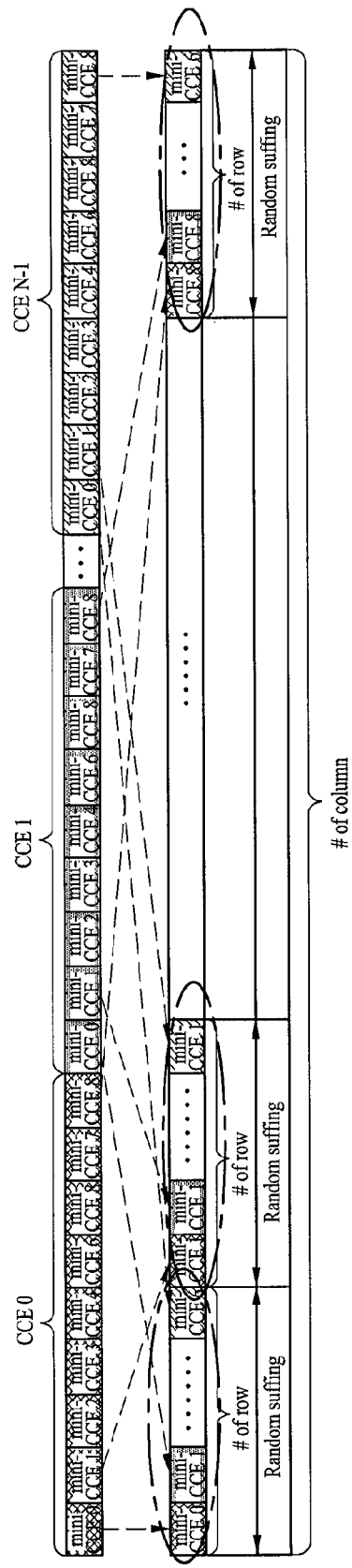
FIG. 9 illustrates an example multiplexing method which can implement interleaving using a block interleaver according to an embodiment of the invention.

FIG. 9 illustrates an example multiplexing method which can implement interleaving using a block interleaver according to an embodiment of the invention.

Specifically, FIG. 9 illustrates an example where a total of N CCEs (CCE 0, CCE 1, CCE N−1) can be transmitted through one subframe and each CCE includes a total of 9 mini-CCEs (mini-CCE 0-mini-CCE 8).

Here, a mini-CCE can be defined as an entity corresponding to a group of modulated symbols that are mapped to an REG according to a multiple antenna transmission technique among modulated symbols transmitted in a CCE as described above. For example, when the number of transmit antennas is 4, a modulated symbol group including a total of 4 modulated symbols can be defined as a mini-CCE. That is, in the following description, we can assume that each mini-CCE is mapped to an REG When mapping to an OFDM symbol is performed to transmit N CCEs, a group of mini-CCEs is constructed such that the group of mini-CCEs includes at least one mini-CCE of each of the N CCEs according to this embodiment. The positions of mini-CCEs are mixed through random reordering or permutation based on a specific permutation pattern in a group of mini-CCEs. The length of a random sequence generated through random reordering may be limited to the maximum number of CCEs that can be transmitted in a subframe.

It is possible to perform random reordering on each group so as to satisfy a requirement that, for each CCE, the distance between the position of a mini-CCE of the CCE generated in a previous group and the position of a mini-CCE of the CCE generated in a current group be less than the number of REGs that can be transmitted in the first OFDM symbol.

FIG. 9 illustrates an example where a group is constructed such that it includes at least one of the mini-CCEs of each CCE. That is, a total of 9 groups including a group G0 including a mini-CCE 0 of each CCE, a group G1 including a mini-CCE 1 of each CCE, . . . , and a group G8 including a mini-CCE 8 of each CCE can be formed in the example of FIG. 9. The positions of REGs in each group such as group G0, group G1, . . . , and group G9 can be randomly reordered.

Here, in the case where the input direction is a row direction in the method of using a block interleaver, it can be assumed that the number of mini-CCEs in each group is equal to the number of rows (# of rows) and the number of groups is equal to the number of columns (# of columns).

This method can be commonly applied to every cell such that random reordering is performed for each group and a cell-specific shift of a mapping pattern is performed using cell-specific information such as a cell ID and mapping to physical REGs is then sequentially performed.

Embodiment 5

Reference will now be made in detail to an interleaving operation of a block interleaver according to this embodiment which can distribute REs, to which modulated symbols of CCEs input to the block interleaver are mapped, over a total system band so as to obtain frequency diversity gain.

Figure 10:
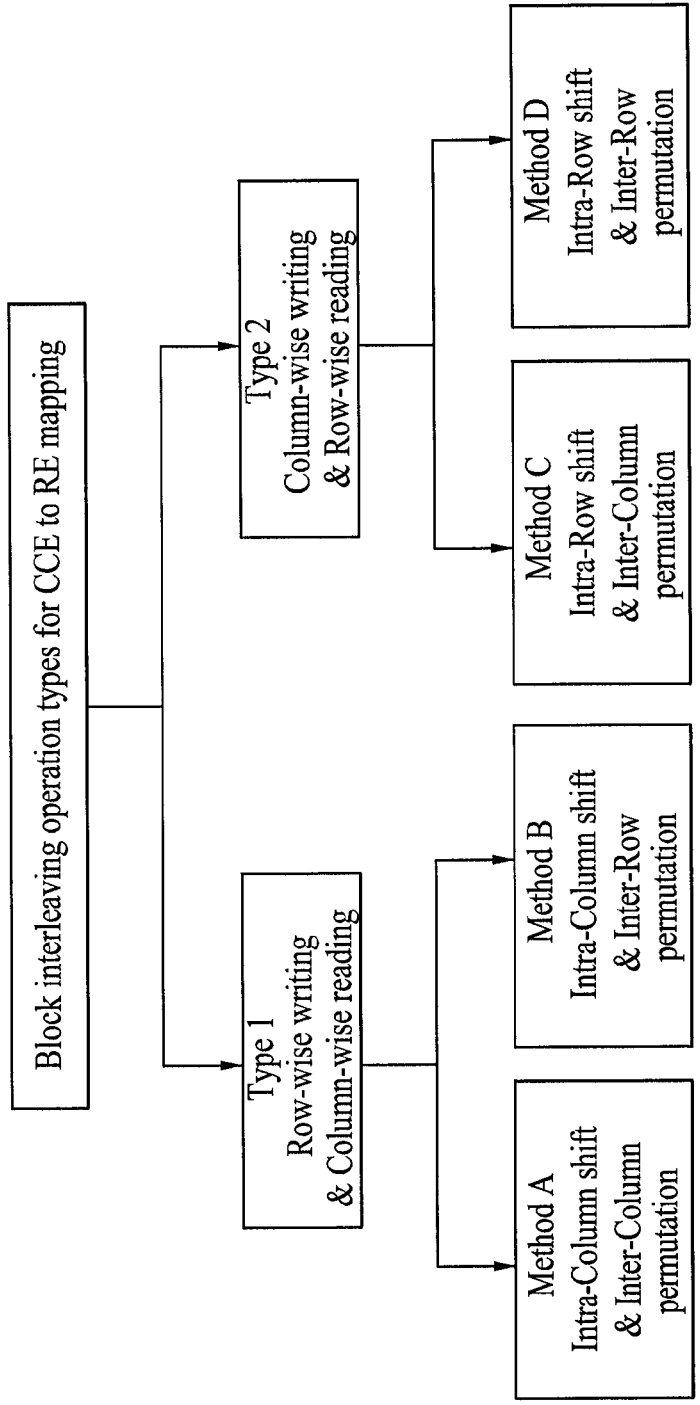
FIG. 10 illustrates a specification table provided to explain methods of operating a block interleaver according to an embodiment of the invention.

FIG. 10 illustrates a specification table provided to explain methods of operating a block interleaver according to an embodiment of the invention.

Four types of operations shown in FIG. 10 are defined as block interleaving operations that are performed at a block interleaver to accomplish purposes of CCE-to-RE mapping.

The four types can be considered extensions of the two types described above with reference to FIG. 2. However, while it is assumed in the description of FIG. 2 that an intra-column permutation or intra-row permutation operation and/or an inter-column permutation or inter-row permutation operation is performed, it is assumed in the description of FIG. 10 that an intra-column shift or intra-row shift operation and/or an inter-column shift or inter-row shift operation is performed.

As described above, input (writing) and output (reading) directions of a block interleaver can be set to be different in order to provide a basic diversity gain in the time-frequency domain. As shown in FIG. 10, a row-wise writing & column-wise reading type (Type 1) and a column-wise writing & row-wise reading type (Type 2) can be defined as two operating types.

Combinations of two types of shift and permutation methods can be defined for each of the two types of input/output methods (Type 1 and Type 2). In the following description, it is assumed that these combinations can provide a basic diversity gain in the frequency domain and can increase coverage and support balanced transmission power of control channels in the time domain.

Two types of methods, i.e., intra-column shift & inter-column permutation (Method A) and intra-column shift & inter-row permutation (Method B) are associated with Type 1. Two types of methods, i.e., intra-row shift & inter-column permutation (Method C) and intra-row shift & inter-row permutation (Method D), are associated with Type 2.

Here, a different shift offset value or a different permutation pattern may be set for each row or each column so as to obtain effects maximizing diversity and randomization.

Figure 11:
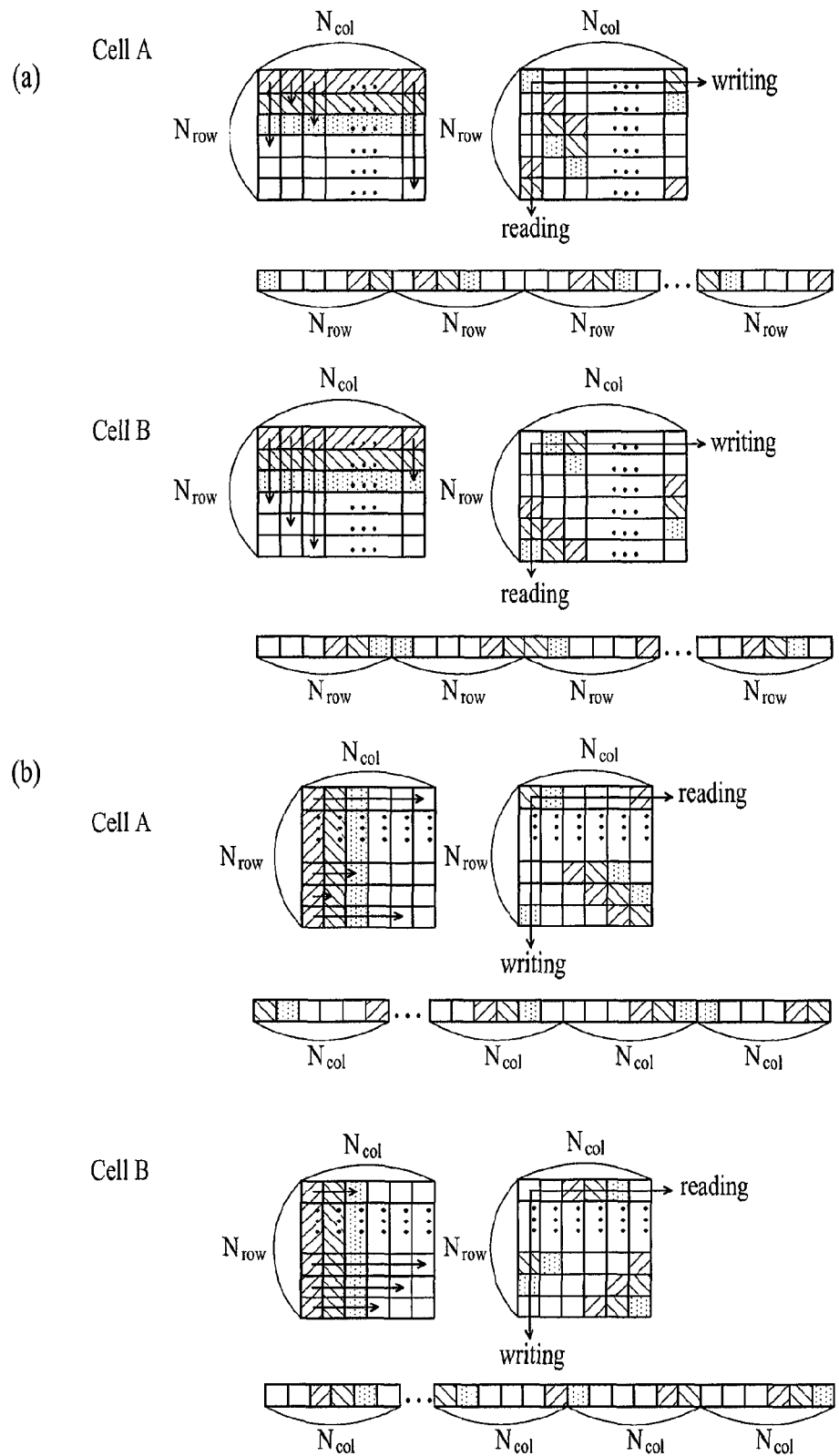
FIGS. 11(a) and 11(b) illustrate a shift operation in an interleaving operation method using a block interleaver according to an embodiment of the invention.

FIGS. 11(a) and 11(b) illustrates a shift operation in an interleaving operation method using a block interleaver according to an embodiment of the invention. In FIGS. 11(a) and 11(b), $N_{row}$ denotes the number of rows and $N_{col}$ denotes the number of columns.

The shift operation can be performed such that modulated symbol sequences of CCEs input to the block interleaver are shifted by a specific offset value in either a row or column direction of a block interleaver.

For example, when an intra-column shift shown in FIG. 11(a) is performed, the row positions of CCEs input to the same column of the block interleaver are changed by the same offset value. In addition, when an intra-row shift shown in FIG. 11(b) is performed, the column positions of CCEs included in the same row of the block interleaver are changed by the same offset value.

Especially, when the input direction of the block interleaver is a row direction and the output direction is a column direction, i.e., in the case of Type 1, the intra-row shift operation is performed as shown in FIG. 11(a) and, when the input direction of the block interleaver is a column direction and the output direction is a row direction, i.e., in the case of Type 2, the intra-column shift operation is performed as shown in FIG. 11(b), thereby improving diversity or randomization characteristics.

Time/frequency mapping characteristics can be maintained by shifting within a row or column alone taking into consideration input and output directions, and mapping patterns obtained after mapping is done can also be made various by defining a shift offset value (the extent of shift) for each row and for each column.

More specifically, cell-specific information such as a cell ID can be used to generate a shift offset value or a shift pattern based on the shift offset value in the intra-row or intra-column shift operation as described above. If a shift pattern is generated using cell-specific information such as a cell ID, it is possible to generate a different interleaver output (i.e., a unique mapping pattern) for each cell even though an intra-column or intra-row shift operation is performed using the same interleaver structure for different cells as can be seen from FIGS. 11(a) and 11(b).

Accordingly, even when an intra-column or intra-row shift operation is performed using the same interleaver structure at a plurality of cells, cell-specific shift results can be obtained, thereby minimizing the influence of inter-cell interference of a control channel of each cell.

Figure 12:
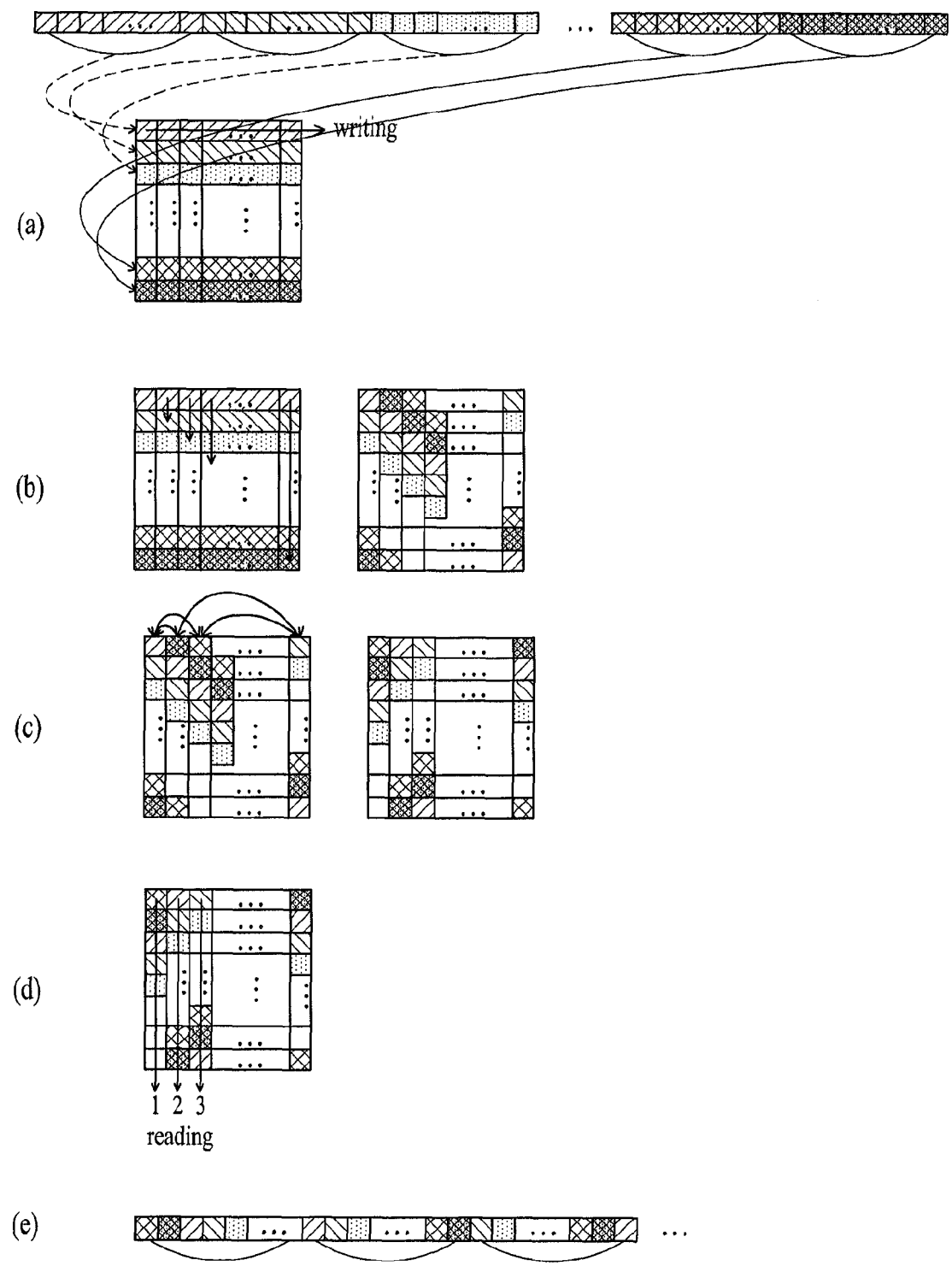
FIGS. 12(a) and 12(e) illustrate an example method for mapping a control channel interleaved using a block interleaver according to an embodiment of the invention.

FIGS. 12(a) and 12(b) illustrate an example method for mapping a control channel interleaved using a block interleaver according to an embodiment of the invention.

In this embodiment, interleaving is performed using a block interleaver according to Type 1 & Method A (row-wise writing & column-wise reading, intra-column shift, inter-column permutation).

FIG. 12(a) illustrates a procedure in which CCEs transmitted in a subframe are input to a block interleaver in a row direction of the block interleaver. FIG. 12(b) illustrates a method for performing an intra-column shift operation among the block interleaving operations using a block interleaver.

Mathematical Expression 8 represents an example of the cell-specific intra-column shift.

$$O_{shift} = \text{Cell ID} \% R$$

$$(r',c') = ((r + O_{shift} \cdot c) \% R, c), \quad \text{[MATHEMATICAL EXPRESSION 8]}$$

where r=0, 1, ..., R−1, c=0, 1, ..., C−1

In Mathematical Expression 8, R represents the number of rows of the block interleaver, C represents the number of columns, (r,c) represents an address of row and column before interleaving, and (r', c') represents an address of row and column after interleaving. And, $O_{shift}$ represents a cell-specific factor used for a cell-specific intra-column shift operation.

Figure 8:
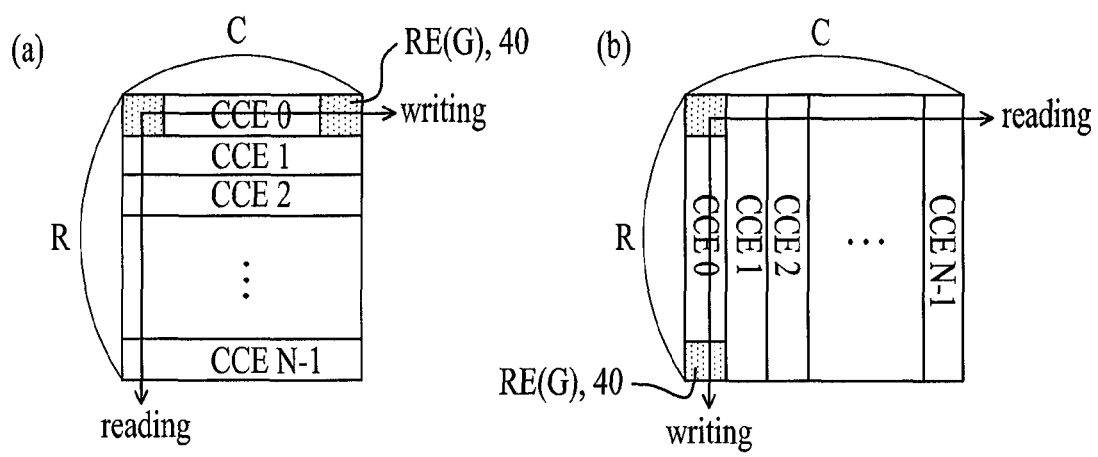
FIGS. 8(a) and 8(b) illustrate example methods for determining a block interleaver size according to an embodiment of the invention.

If a cell-specific intra-column shift operation is performed according to the interleaving operation represented in FIG. 8, rows in each column are shifted using a unique 0shift value for each cell, thereby achieving a pattern in which the positions of modulated symbols of each CCE in each column of the block interleaver are unique for each cell.

FIG. 12(c) illustrates a method for performing an inter-column permutation operation among the block interleaving operations using a block interleaver.

Mathematical Expression 9 represents an example of the cell-specific inter-column permutation.

$$O_{perm} = \lfloor \text{CellID} / R \rfloor$$

$$(r',c') = (r, (c \cdot P + O_{perm}) \% C), \quad \text{[MATHEMATICAL EXPRESSION 9]}$$

where r=0, 1, ..., R−1, c=0, 1, ..., C−1, P=relative prime number with C

In Mathematical Expression 9, R represents the number of rows of the block interleaver, C represents the number of columns, (r,c) represents an address of row and column before interleaving, and (r', c') represents an address of row and column after interleaving. And, $O_{perm}$ represents a cell-specific factor used for a cell-specific inter-column permutation operation. In addition, P represents a natural number relatively prime to C, which is the number of columns, and may have one or more values according to the value of C.

If the cell-specific inter-column permutation operation is performed, the order of columns is changed using a unique 0shift value for each cell, so that the positions of columns is unique for each cell after the interleaving operation is performed.

FIG. 12(d) illustrates how interleaved modulated symbols of CCEs are output in a column direction from a block interleaver.

As described above, block interleaver operation is not changed and interleaving results may exhibit identical forms when input and output directions are changed. For example, when the input direction of the block interleaver is changed from a column direction to a row direction, an intra-column shift operation and an inter-column permutation operation, which are operations of the block interleaver, are replaced with an intra-row shift operation and an inter-row permutation operation, respectively. This indicates that the interleaving results can exhibit identical forms while only directions associated with the interleaving operation have been changed.

FIG. 12(e) illustrates partial results of mapping of an interleaved sequence of modulated symbols output from a block interleaver to time/frequency resources in a subframe.

In the case where mapping is performed in units of REGs, each including k REs, in order to support a transmit diversity technique of control channels, modulated symbols of CCEs are interleaved in units of modulated symbol groups, each including k modulated symbols, at the block interleaver and are then mapped to REGs in units of modulated symbol groups.

FIGS. 13(a) to 13(d) illustrate another example method for mapping an interleaved control channel using a block interleaver according to the embodiment of the invention.

This embodiment provides a method for performing a permutation operation or a cell-specific inter-column permutation operation at an output procedure rather than separately performing the operations. Embodiments of a CCE-to-RE mapping process at each step and block interleaver operations are described below in detail and specifically with reference to FIGS. 13(a) to 13(d).

In this embodiment, interleaving is also performed using a block interleaver according to Type 1 & Method A (row-wise writing & column-wise reading, intra-column shift, inter-column permutation).

Figure 13:
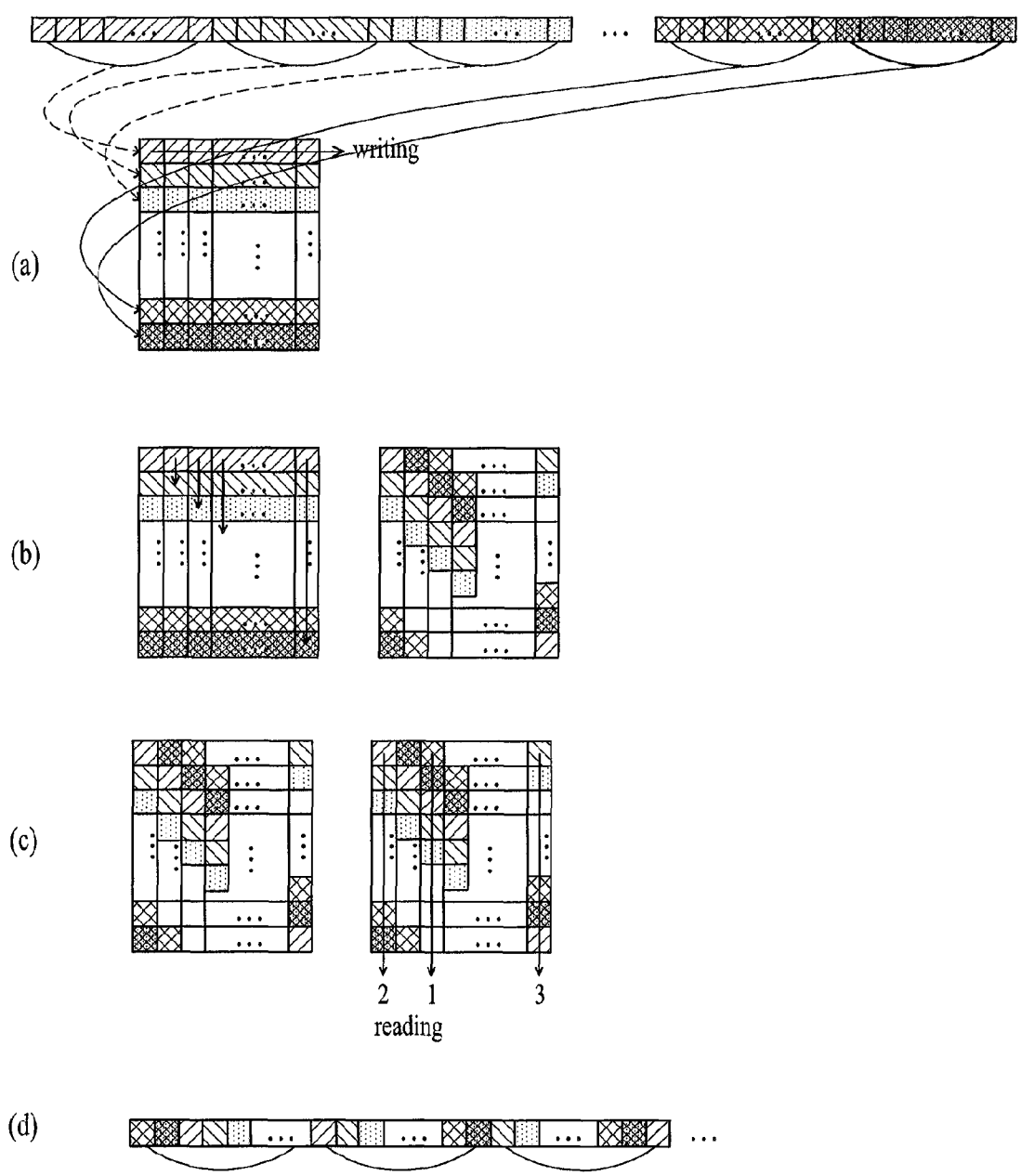
FIGS. 13(a) to 13(d) illustrate another example method for mapping an interleaved control channel using a block interleaver according to the embodiment of the invention.

Operations of FIGS. 13(a) to 13(c) can be seen from the description of operations of FIGS. 12(a) to 12(c).

However, FIG. 13(c) also shows an output process. According to the example of FIG. 13(c), modulated symbols are output in a column direction, wherein columns can be output in any order of columns rather than being output sequentially starting from the first column.

FIG. 13(d) illustrates partial results of mapping of an interleaved sequence of modulated symbols output from a block interleaver to time/frequency resources in a subframe. It can be seen from FIG. 13(d) that mapping results of FIG. 13(d) are identical to those of FIG. 12(e).

In FIGS. 12(e) and 13(d), a Physical Resource Element (PRE) and a Physical Resource Element Group (PREG) can be constructed so as to include k adjacent REs among REs at positions other than positions of REs occupied by a reference signal, a PCFICH, and a PHICH among all REs present in n OFDM symbols and a given system bandwidth.

If control channel elements are mapped to physical resource elements by performing block interleaving as described above, it is possible to minimize inter-cell interference in multi-cell environments while satisfying mapping requirements in the time/frequency domain described above.

Although not illustrated as a detailed example, it will be apparent that operations of Type 1 & Method B (row-wise writing & column-wise reading, intra-column shift, inter-row permutation), Type 2 & Method C (column-wise writing & row-wise reading, intra-row shift, inter-column permutation), and Type 2 & Method D (column-wise writing & row-wise reading, intra-row shift, inter-row permutation) can be implemented as processes and methods identical to detailed interleaving operations/configurations and processes using a block interleaver in the CCE-to-RE mapping procedure of the Type 1 & Method A scheme described above.

Mapping patterns generated through such processes and methods will have unique characteristics for each cell and satisfy time/frequency domain mapping and inter-cell interference randomization characteristics as in the case of Type 1 & Method A described in a section below.

Reference will now be made to various embodiments of determination of cell-specific $0_{shift}$ values in an intra-column shift operation described above in Mathematical Expression 8. First, a more generalized intra-column shift operation can be represented by the following Mathematical Expression 10.

Input(r,c) r=0,1,...,$N_{row}$-1 c=0,1,...,$N_{col}$-1

Output(r',c) r'=(r+v(cell_ID, cell_group_ID)+w(c))mod $N_{row}$ [MATHEMATICAL EXPRESSION 10]

In Mathematical Expression 10, a v(cell_ID, cell_group_ID) function represents an intermediate function that can provide an RE mapping pattern index sequence adapted to each cell or each cell group using a cell ID or a cell group ID. Through v(cell_ID, cell_group_ID), it is possible to output a shift offset value for coordination and randomization for cell-specific RE mapping pattern index allocation. w(c) represents an output function for outputting a column-based shift offset for implementing an intra-column shift operation. Through w(c), it is possible to generate various offset values that can be used for a specific form of implementation of an intra-column shift operation. One of the v(cell_ID,cell_group_ID) and w(c) functions can be set and used as a null function.

On the other hand, if the same offset value is applied to shift each column in the intra-column shift operation, it is possible to obtain the same results as an inter-row permutation operation. The following Mathematical Expression 11 represents an embodiment of inter-row permutation for shifting a CCE group or all groups using a unique fixed offset for each cell.

Input(r,c) r=0,1,...,$N_{row}$-1 c=0,1,...,$N_{col}$-1

Output(r',c) r'=(r+offset(cell_ID))mod $N_{row}$ [MATHEMATICAL EXPRESSION 11]

In Mathematical Expression 11, offset(cell_ID) represents a function for generating a unique shift offset for each cell using a cell ID.

Figure 14:
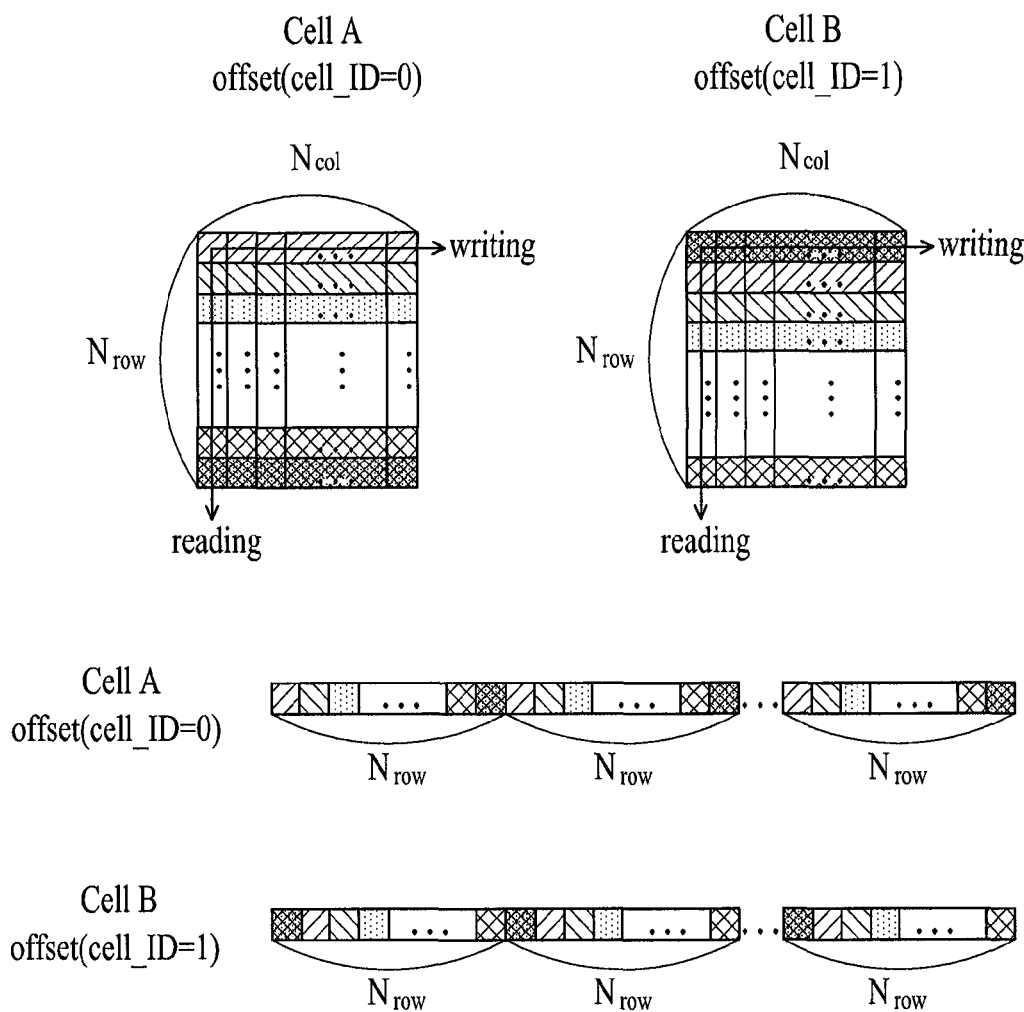
FIG. 14 illustrates an example where a block interleaver operates according to Mathematical Expression 11.

FIG. 14 illustrates an example where a block interleaver operates according to Mathematical Expression 11.

In the example of FIG. 14, an offset(cell_ID) value of "0" is set for cell A and an offset(cell_ID) value of "1" is set for cell B. Results of the inter-row permutation operation can be achieved by setting the same shift offset value for every column of the block interleaver as described above.

A specific embodiment of grouping and allocating RE mapping patterns for every 3 cells (cell_ID=0, 1, 2) in the above embodiment can be represented by the following Mathematical Expression 12.

Input(r,c) r=0,1,...,$N_{row}$-1 c=0,1,...,$N_{col}$-1

Output(r',c) r'=(r+$\lfloor N_{row}/3 \rfloor$·cell_ID)mod $N_{row}$ [MATHEMATICAL EXPRESSION 12]

Mathematical Expression 12 can be considered an example implementation of inter-row permutation for coordination of inter-cell interference.

Figure 15:
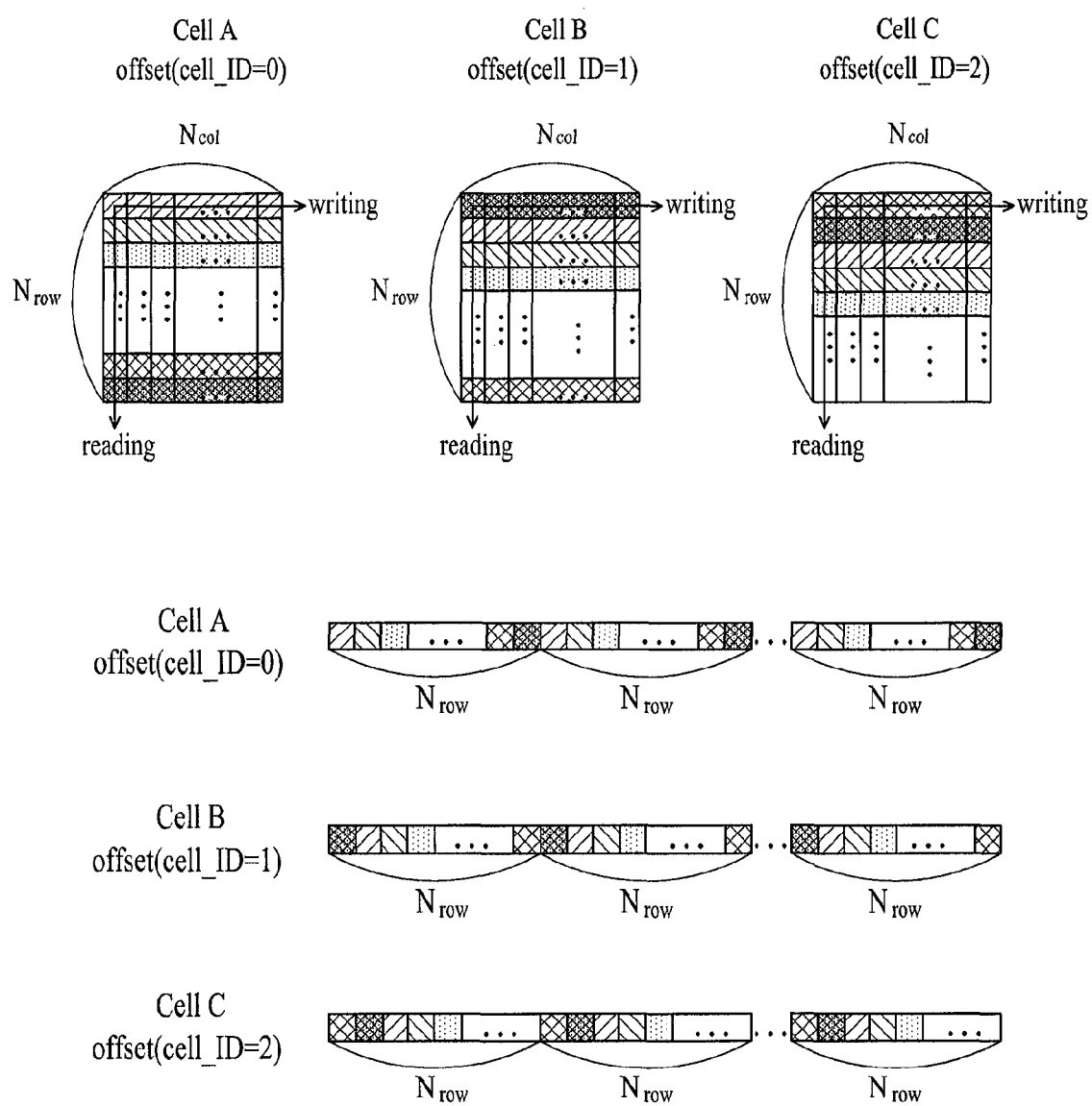
FIG. 15 illustrates an example where a block interleaver operates according to Mathematical Expression 12.

FIG. 15 illustrates an example where a block interleaver operates according to Mathematical Expression 12.

In the example of FIG. 15, a cell_ID value of "0" is set for cell A, a cell_ID value of "1" is set for cell B, and a cell_ID value of "2" is set for cell C.

If the two above embodiments implement inter-row permutation based on coordination of inter-cell interference, an intra-column shift operation for allocating an offset that randomly varies for each subframe based on a cell ID and a cell group ID as an inter-row permutation operation based on interference randomization can be represented by the following Mathematical Expression 13.

Input(r,c) r=0,1,...,$N_{row}$-1 c=0,1,...,$N_{col}$-1

Output(r',c) r'(r+random_gen(cell_ID, cell_group_ID))mod $N_{row}$ [MATHEMATICAL EXPRESSION 13]

In Mathematical Expression 13, random_gen(cell_ID, cell_group_ID) represents a function for outputting a random value each time block interleaving is applied to a subframe and an individual REG This function can generate a cell-specific pattern using a cell ID and a cell group ID.

Among embodiments of an intra-column shift operation wherein a different offset is applied to each column in the intra-column shift operation, an embodiment wherein shift is performed at the same intervals using an offset of constant k for each column is represented by the following Mathematical Expression 14.

Input(r,c) r=0,1,...,$N_{row}$-1 c=0,1,...,$N_{col}$-1

Output(r',c) r'=(r+c·k) mod $N_{row}$ [MATHEMATICAL EXPRESSION 14]

in case of a constant value of k

An embodiment in which a unique inter-row permutation operation for each cell is implemented together with an intra-column shift operation in the embodiment of Mathematical Expression 14 is represented by the following Mathematical Expression 15.

Input(r,c) r=0,1,...,$N_{row}$-1 c=0,1,...,$N_{col}$-1

Output(r',c) r'=(r+offset(cell_ID)+c·k)mod $N_{row}$ [MATHEMATICAL EXPRESSION 15]

in case of a constant value of k

As illustrated in Mathematical Expression 15, it is possible to allocate a unique RE mapping pattern for each cell using a unique offset(cell_ID) value for each cell and a common offset(cell_ID) value of k for every cell.

Mathematical Expression 16 represents an embodiment wherein a random value is generated for each column to apply a variable offset.

Input(r,c) r=0,1,...,$N_{row}$-1 c=0,1,...,$N_{col}$-1

Output(r',c) r'=(r+random_gen'(cell_ID, cell_group_ID))mod $N_{row}$ [MATHEMATICAL EXPRESSION 16]

In Mathematical Expression 16, random_gen'(cell_ID, cell_group_ID) represents a function for generating a random value for each column in order to implement an embodiment wherein a shift offset is randomly allocated to an RE mapping pattern for an intra-column shift operation.

Mathematical Expression 17 represents an example method of representing an algorithm for implementing virtual interleaving for an interleaving operation using the block interleaver described above. In Mathematical Expression 17, "PREG(j)" represents j-th physical resource element.

[MATHEMATICAL EXPRESSION 17]

```
j = 0
For (i = 0; i< R·C; i ++)
{
```
$Q = \{\alpha \cdot O_{perm} + (C-\alpha) \cdot \lfloor i/R \rfloor\} \% C$ } Main interleaving function $Temp = \{((i \% R) + R(1 + C) - O_{shift} \cdot Q) \% R\} \cdot C + Q$ If (Temp < # of useful REGs)
{
    PREG (j) = Temp } Address adjustment for pruning

```
    j ++
}
}
```

In Mathematical Expression 17, R represents the number of rows of virtual interleaving, C represents the number of columns, (r,c) represents an address of row and column before interleaving, and (r', c') represents an address of row and column after interleaving. And, $O_{perm}$ represents a cell-specific factor used for a cell-specific inter-column permutation operation and $O_{shift}$ represents an offset value as a cell-specific factor used for a cell-specific intra-column shift operation.

In the virtual interleaving representation, "α" used for calculation of a Q value is a value that is variable according to C and P, where P represents a natural number relatively prime to C, which is the number of columns, and may have one or more values according to the value of C. Tables 2 to 5 illustrate some combinations of the values of P and α that can be used according to the value of C.

TABLE 2

| C = 5 | |
|---|---|
| P | α |
| 2 | 2 |
| 3 | 3 |
| 4 | 1 |

TABLE 3

| C = 6 | |
|---|---|
| P | α |
| 5 | 1 |

TABLE 4

| C = 9 | |
|---|---|
| P | α |
| 2 | 4 |
| 4 | 2 |
| 5 | 7 |
| 7 | 5 |
| 8 | 1 |

TABLE 5

| C = 12 | |
|---|---|
| P | α |
| 5 | 7 |
| 7 | 5 |
| 11 | 1 |

If control channel elements are mapped to physical resource elements through the virtual interleaving procedure as described above, it is possible to satisfy the mapping requirements of time/frequency domain and to minimize inter-cell interference in multi-cell environments.

Embodiment 6

According to this embodiment, in the CCE-to-RE mapping procedure described above, one or more groups, each including one or more CCEs, can be defined for more efficient mapping and CCEs can be mapped using the defined groups.

Figure 16:
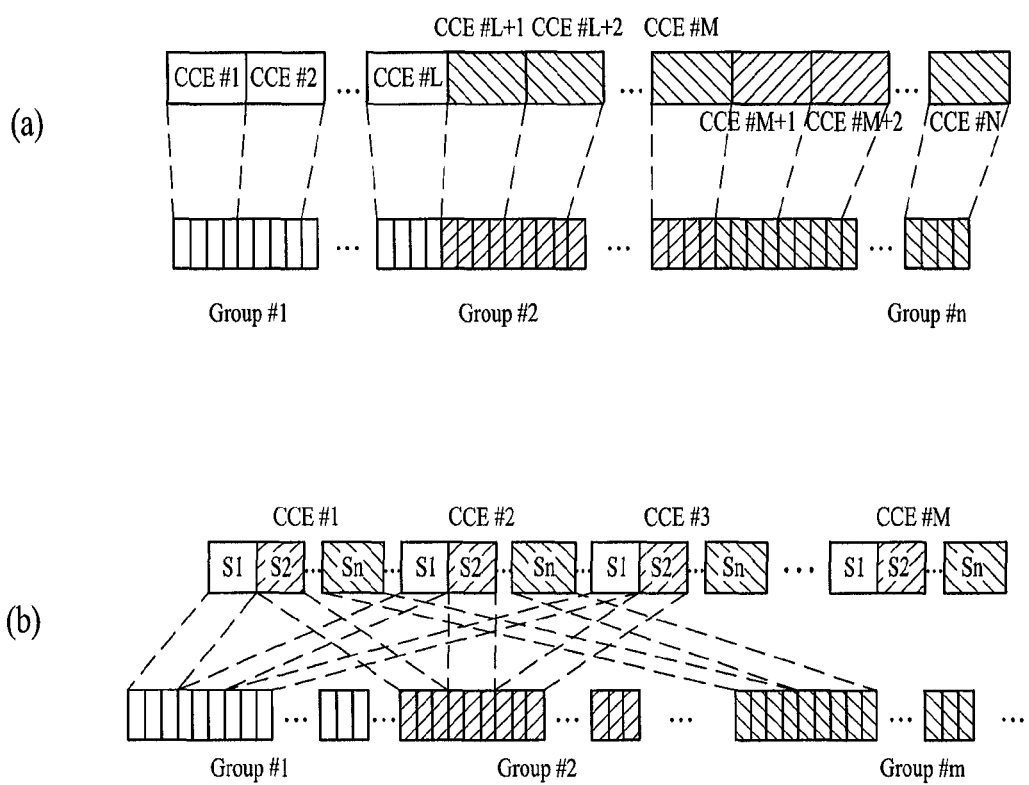
FIGS. 16(a) and 16(b) illustrate a method for defining a specific group including all or part of one or more CCEs according to an embodiment of the invention.

FIGS. 16(a) and 16(b) illustrate a method for defining a specific group including all or part of one or more CCEs according to an embodiment of the invention.

FIG. 16(a) illustrates an example method in which CCEs constructed to be transmitted in a single subframe are integrated into a single modulated symbol sequence and groups of arbitrary numbers of CCEs or REs are defined in the integrated modulated symbol sequence.

Specifically, FIG. 16(a) illustrates a method in which groups are defined in units of arbitrary numbers of CCEs and modulated symbols in each arbitrary number of CCEs are included in a corresponding group. For example, it can be seen from FIG. 16(a) that a total of n groups is defined and Group #1 includes CCE#1, CCE#2, . . . , and CCE#L, Group #2 includes CCE#L+1, CCE#L+2, . . . , and CCE#M, and Group #n includes CCE#M+1, CCE#M+2, . . . , and CCE#N. Here, N is the total number of CCEs transmitted in a corresponding subframe.

FIG. 16(b) illustrates a method in which groups are defined such that each group includes one or more CCEs while modulated symbols included in a CCE can be distributed so as to be included in different groups.

Specifically, FIG. 16(b) illustrates a group definition method in which each CCE is divided into one or more CCE segments and a segment(s) of every CCE is included in one group so that modulated symbols included in one CCE are distributed so as to be included in different groups. For example, as shown in FIG. 16(b), a total of n groups are defined and each CCE is divided into a number of CCE segments (for example, n CCE segments) corresponding to the number of defined groups. CCE segment #1 (S1) of each CCE is included in Group #1, CCE segment #2 (S2) of each CCE is included in Group #2, and CCE segment #n (Sn) of each CCE is included in Group #n.

When one or more groups are defined using the above methods, the total number of defined groups, the number of CCEs included in one group, or the number of modulated symbols of each CCE included in one group can be determined in various manners. For example, these numbers can be determined in association with the following method for mapping to an OFDM symbol carrying a control channel using groups defined as described below.

Figure 17:
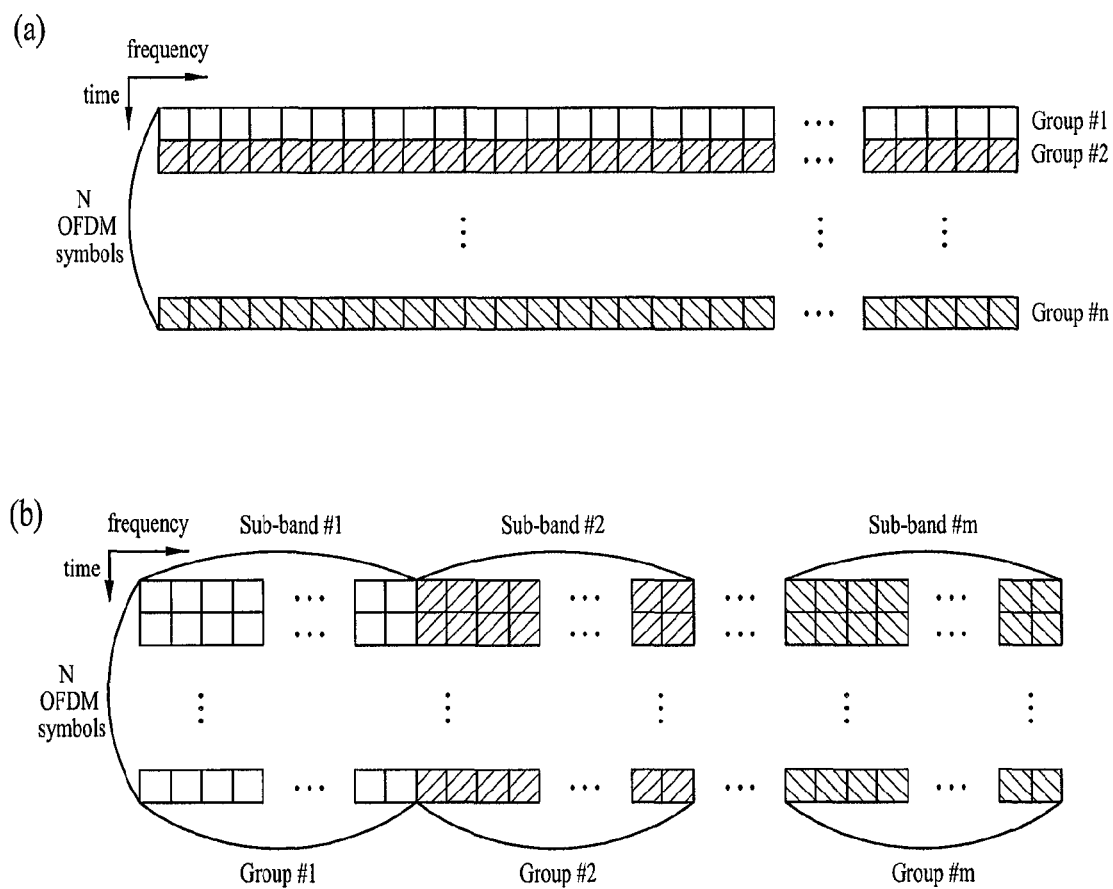
FIGS. 17(a) and 17(b) illustrate the method for mapping to an OFDM symbol for transmitting a control channel using groups defined according to an embodiment of the invention.

FIGS. 17(a) and 17(b) illustrate the method for mapping to an OFDM symbol for transmitting a control channel using groups defined according to an embodiment of the invention.

FIG. 17(a) illustrates an example where groups are mapped respectively to n OFDM symbols for control channel transmission. In this case, the total number of defined groups may be n and the number of modulated symbols included in one group may be determined to be proportional to or correspond to the number of Physical Resource Elements (PREs), which can be used for transmission of control information of CCEs, included in one OFDM symbol.

As shown in FIG. 17(a), modulated symbols included in Group #1 are mapped to a first OFDM symbol in a subframe corresponding to a Transmit Time Interval (TTI), modulated symbols included in Group #2 are mapped to a second OFDM symbol, and modulated symbols included in Group #n are mapped to an nth OFDM symbol. Although groups are sequentially mapped to n OFDM symbols for control channel transmission in the example illustrated in FIG. 17(a), the order of mapped OFDM symbols may be changed as needed.

FIG. 17(b) illustrates an example where one or more (for example, m) subbands, each including one or more subcarriers, are constructed in the frequency axis for a total of n OFDM symbols for control channel transmission. In the example illustrated in FIG. 17(b), each group is mapped to one of the m subbands. In this case, the total number of defined groups may be m and the number of modulated symbols included in one group may be determined to correspond to the number of Physical Resource Elements (PREs), which can be used for transmission of control information of CCEs, included in one subband.

As shown in FIG. 17(b), modulated symbols included in Group #1 are mapped to a first subband in a subframe corresponding to a Transmit Time Interval (TTI), modulated symbols included in Group #2 are mapped to a second subband, and modulated symbols included in Group #m are mapped to an mth subband. Although groups are sequentially mapped to the subbands in the example illustrated in FIG. 17(b), the order of mapped subbands may be changed as needed as in the example of FIG. 17(a).

PREs that can be used for transmission of control information of CCEs may be PREs allocated for control channel transmission among all PREs corresponding to a TTI, excluding all or part of PREs for transmission of pieces of information that are not transmitted through CCEs. Here, examples of the information not transmitted through CCEs include a reference signal, a PCFICH, a PHICH, and a PICH.

In the case where all or part of REs allocated for transmission of a PCFICH, a PHICH, and a PICH, other than CCEs, and a reference signal are included in PREs mapped for transmission of control information of CCEs, symbol puncturing may be performed on the all or part of the REs after CCE-to-RE mapping is terminated.

Figure 18:
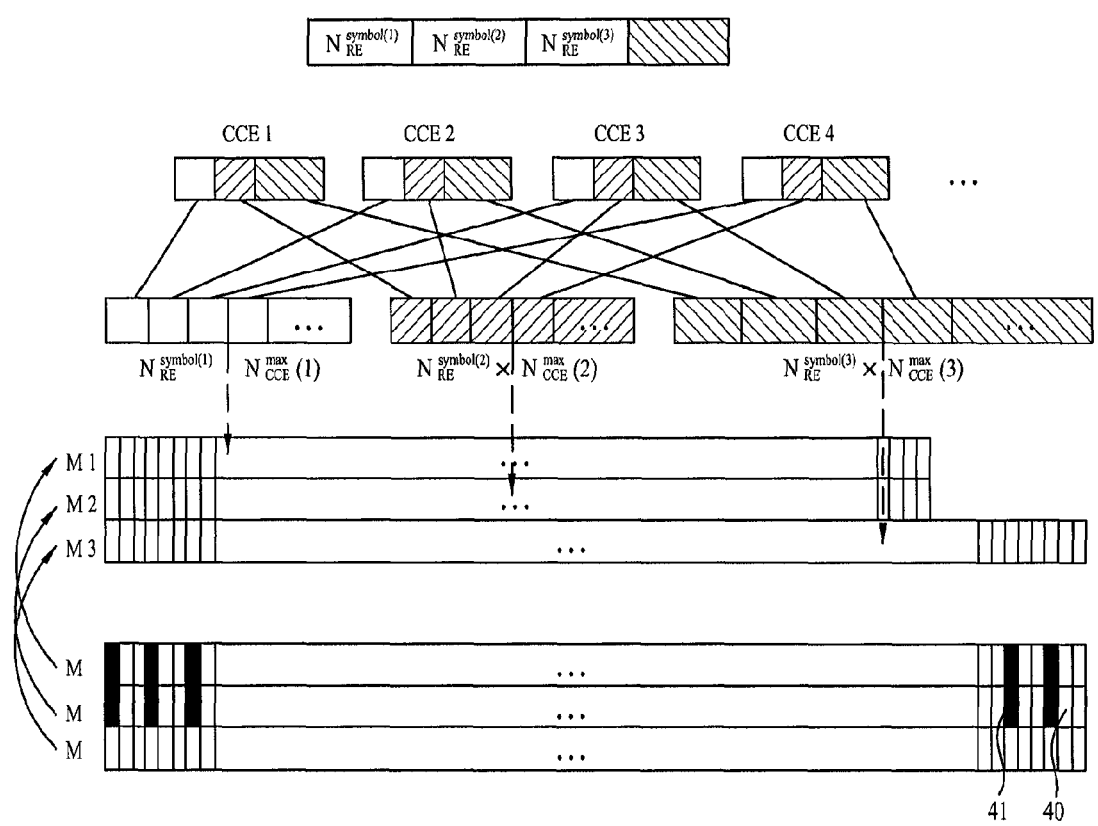
FIG. 18 illustrates another method for defining a group including all or part of one or more CCEs according to an embodiment of the invention.

FIG. 18 illustrates another method for defining a group including all or part of one or more CCEs according to an embodiment of the invention.

Reference will now be made to a group definition method that can be applied when the sizes of groups, i.e., the numbers of REs included in the groups, are different in the method described above with reference to FIG. 16(b) wherein modulated symbols included in a CCE are distributed so as to be included in different groups.

As shown in an upper side of FIG. 18, when each CCE is divided into one or more CCE segments so that a CCE segment of each CCE is included in one group, the size of each CCE segment, i.e., the number of modulated symbols included in each CCE segment, can be determined independently of each other.

That is, when each group has a different size, the size of each CCE segment can be determined to be proportional to the size of each group. For example, in the case where a total of 3 groups are defined and the ratio of the sizes of the groups is 1:1:1.5, the ratio of the sizes of CCE segments included in each CCE may be determined to be the same as 1:1:1.5.

An example where each group constructed according to this embodiment is mapped to one of the total of n OFDM symbols for control channel transmission will now be described in more detail with reference to the upper and lower sides of FIG. 18.

When modulated symbols of each CCE are transmitted by distributing the modulated symbols over n OFDM symbols, the ratio of the respective numbers of modulated symbols distributed to the n OFDM symbols may be equal to the ratio of the respective numbers (for example, M1:M2:M3) of PREs that can be used for CCE transmission of the OFDM symbols. Here, when control information is transmitted through 3 OFDM symbols, the values of M1, M2, and M3 are numbers obtained by subtracting the number of PREs used for other control information from M which is the number of PREs included in each of the OFDM symbols.

The number of PREs that can be used for CCE transmission may actually vary for each OFDM symbol due to other control information. Accordingly, if modulated symbols of one CCE are mapped to OFDM symbols by distributing the same number of modulated symbols over each OFDM symbol without taking into consideration the respective numbers of REs that can be used for CCE transmission in the OFDM symbols, the number of CCEs that can be transmitted in a subframe may be limited to the number of CCEs that can be transmitted through an OFDM symbol including the largest amount of other control information.

Each of the smallest rectangles 40 in the lower portion of FIG. 18 represents a PRE and dark portions 41 represent PREs that are not used for actual CCE-to-RE mapping and, instead, are used for purposes other than CCE transmission.

An embodiment of a method (i.e., a CCE segment configuration method) in which modulated symbols of a CCE are divided and allocated to the OFDM symbols such that the respective modulated symbols allocated to the OFDM symbols are proportional to the respective numbers of PREs that can be used for CCE transmission in the OFDM symbols (for example, at a ratio of M1:M2:M3) will now be described with reference to the following Mathematical Expressions. Notations used in the following Mathematical Expressions were selected for the sake of convenience and it will be apparent that it is possible to use any other notations with the same meanings.

The following Mathematical Expression 18 represents an example CCE segment configuration in the case where no transmit diversity scheme is used for control channel transmission.

[MATHEMATICAL EXPRESSION 18]

[Non-*SFBC case*]

1) $i \neq n$ $$N_{RE}^{symbol(i)} = \left\lfloor \frac{M_i}{\sum_{j=1}^{n} M_j} \times CCE_{size} \right\rfloor \text{ or}$$

-continued $$\left\lfloor \frac{M_i}{\sum_{j=1}^{n} M_j} \times CCE_{size} + 0.5 \right\rfloor \text{ or round}\left( \frac{M_i}{\sum_{j=1}^{n} M_j} \times CCE_{size} \right)$$

2) $i = n$ $$N_{RE}^{symbol(i)} = CCE_{size} - \sum_{j=1}^{n-1} N_{RE}^{symbol(j)}$$

$$N_{CCE}^{max}(i) = \lfloor (M_i / (N_{RE}^{symbol(i)})) \rfloor$$

$$N_{CCE}^{max} = \min\{N_{CCE}^{max}(i)\}$$

$M_i$ = availableREs for PDCCH in $i$-th OFDM symbol $M$ = the number of REs in an OFDM symbol $CCE_{size}$ = # of REs in a CCE $N_{RE}^{symbol(i)}$ = the number of REs of a CCE in $i$-th symbol In Mathematical Expression 18, M denotes the number of PREs included in an OFDM symbol and $M_i$ denotes the number of PREs that can be used for control channel transmission in an ith OFDM symbol. Here, $M_i$ can be defined as the number of PREs other than all or part of PREs used for transmission of other control information. $CCE_{size}$ denotes the number of modulated symbols included in a CCE.

In addition, $N_{RE}^{symbol(i)}$ is defined as the number of REs mapped to an ith OFDM symbol when REs of a CCE are transmitted in a distributed manner over n OFDM symbols. As can be seen from Mathematical Expression 18, the value of $N_{RE}^{symbol(i)}$ of each ith OFDM symbol may vary depending on the value of $M_i$ at the OFDM symbol. The value of $N_{RE}^{symbol(i)}$ can be determined to be proportional to a ratio between the number PREs that can be used for control channel transmission in n OFDM symbols and the number PREs that can be used for control channel transmission in the ith OFDM symbol as in the example of Mathematical Expression 18.

An operation such as flooring or rounding can be performed in order to obtain an accurate $N_{RE}^{symbol(i)}$ value. When the flooring operation is used, an operation for adding 0.5 to $N_{RE}^{symbol(i)}$ may be performed to obtain the same effects as rounding in order to prevent excessive reduction of $N_{RE}^{symbol(i)}$ of one OFDM symbol due to flooring.

$N_{CCE}^{max}(i)$ is defined as the maximum number of CCEs that can transmit modulated symbols having a length of $N_{RE}^{symbol(i)}$ in an ith OFDM symbol. In addition, $N_{CCE}^{max}$ is defined as a value having the minimum value of $N_{CCE}^{max}(i)$ and the defined $N_{CCE}^{max}$ may be the maximum number of CCEs that can be transmitted in one subframe.

Using this method, the distribution of modulated symbols of a CCE for each OFDM symbol can be adjusted so as to achieve uniform frequency diversity gain for each OFDM symbol even in environments where the number of PREs that can be used for CCE transmission in each OFDM symbol varies.

The following Mathematical Expression 19 represents an example CCE segment configuration in the case where SFBC is used as a transmit diversity scheme for control channel transmission. Specifically, Mathematical Expression 19 represents an example where each PRE is defined as a pair of adjacent subcarriers in the case where a multiple antenna transmit diversity technique using two transmit antennas for control channel transmission is applied. Here, the pair of adjacent subcarriers may include two closest subcarriers among all subcarriers excluding subcarriers to which pieces of information not transmitted through CCEs are mapped.

[MATHEMATICAL EXPRESSION 19]

[SFBC case] – RE: # of paired sub-carrier

1) $i \neq n$ $$N_{RE}^{symbol(i)} = \left\lfloor \frac{M_i'}{\sum_{j=1}^{n} M_j'} \times CCE'_{size} \right\rfloor \text{ or}$$

$$\left\lfloor \frac{M_i'}{\sum_{j=1}^{n} M_j'} \times CCE'_{size} + 0.5 \right\rfloor$$

$$\text{or round}\left( \frac{M_i'}{\sum_{j=1}^{n} M_j'} \times CCE'_{size} \right)$$

2) $i = n$ $$N_{RE}^{symbol(i)} = CCE'_{size} - \sum_{j=1}^{n-1} N_{RE}^{symbol(j)}$$

$$N_{CCE}^{max}(i) = \lfloor M_i' / (N_{RE}^{symbol(i)}) \rfloor$$

$$N_{CCE}^{max} = \min\{N_{CCE}^{max}(i)\}$$

$M_i'$ = available REs for PDCCH in $i$-th $$\text{OFDM symbol} = \left\lfloor \frac{M_i}{2} \right\rfloor$$

$M'$ = the number of REs in an OFDM symbol = $\left\lfloor \frac{M}{2} \right\rfloor$ $CCE'_{size}$ = # of REs in a CCE = $\left\lfloor \frac{CCE_{size}}{2} \right\rfloor$ $N_{RE}^{symbol(i)}$ = the number of REs of a CCE in $i$-th symbol The meanings of notations defined in Mathematical Expression 19 are the same as those of Mathematical Expression 18. However, Mathematical Expression 19 represents an example where calculation is made using PREs, each including two subcarriers, taking into consideration SFBC. That is, taking into consideration PREs, each including two subcarriers, M, $M_i$, and $CCE_{size}$ can be redefined as M', $M_i'$, and $CCE'_{size}$ as illustrated in Mathematical Expression 2.

Mathematical Expressions 20 and 21 illustrate example calculations of Mathematical Expression 19 in the case where one CCE includes 36 REs and 48 REs and three OFDM symbols are used for a control channel when the system transmission bandwidth is 5 MHz and 10 MHz, respectively.

[MATHEMATICAL EXPRESSION 20]

Example) 5 MHz, 4Tx RE structure, SFBC $M' = 150$ $M_1' = 100, M_2' = 100, M_3' = 150$ $CCE'_{size} = 18$ $$N_{RE}^{symbol(1)} = \left\lfloor \frac{100}{350} \times 18 + 0.5 \right\rfloor = 5,$$

-continued $$N_{RE}^{symbol(2)} = \left\lfloor \frac{100}{350} \times 18 + 0.5 \right\rfloor = 5,$$

$$N_{RE}^{symbol(3)} = 18 - 10 = 8$$

$$N_{CCE}^{max}(1) = \left\lfloor \frac{100}{5} \right\rfloor = 20,$$

$$N_{CCE}^{max}(2) = \left\lfloor \frac{100}{5} \right\rfloor = 20,$$

$$N_{CCE}^{max}(3) = \left\lfloor \frac{150}{8} \right\rfloor = 18$$

$$N_{CCE}^{max} = 18$$

[MATHEMATICAL EXPRESSION 21]

Example) 10 MHz, 4Tx RE structure, SFBC $M' = 300$ $M'_1 = 200, M'_2 = 200, M'_3 = 300$ $CCE'_{size} = 24$ $$N_{RE}^{symbol(1)} = \left\lfloor \frac{200}{700} \times 24 + 0.5 \right\rfloor = 7,$$

$$N_{RE}^{symbol(2)} = \left\lfloor \frac{200}{700} \times 24 + 0.5 \right\rfloor = 7,$$

$$N_{RE}^{symbol(3)} = 24 - 14 = 10$$

$$N_{CCE}^{max}(1) = \left\lfloor \frac{200}{7} \right\rfloor = 28,$$

$$N_{CCE}^{max}(2) = \left\lfloor \frac{200}{7} \right\rfloor = 28,$$

$$N_{CCE}^{max}(3) = \left\lfloor \frac{300}{10} \right\rfloor = 30$$

$$N_{CCE}^{max} = 28$$

Figure 19:
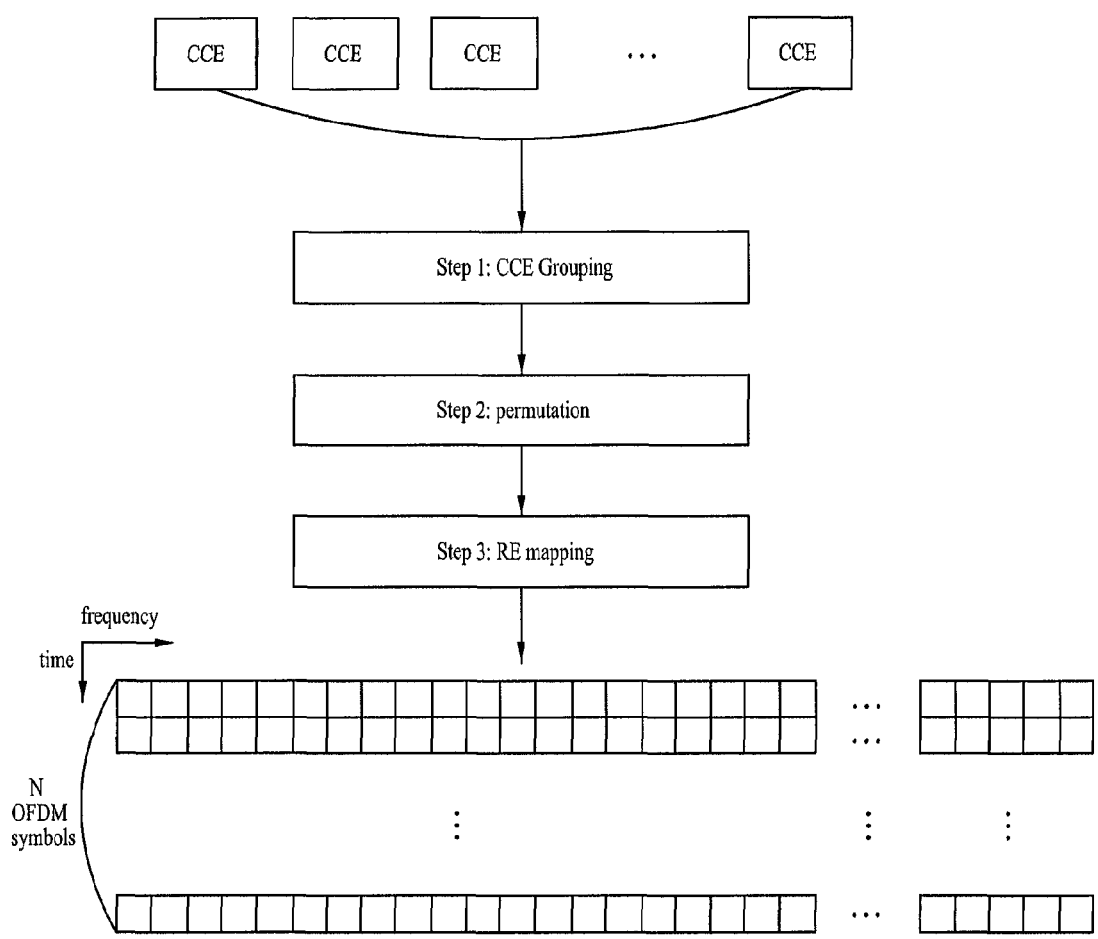
FIG. 19 illustrates a method for performing mapping using a group definition method according to an embodiment of the invention.

FIG. 19 illustrates a method for performing mapping using a group definition method according to an embodiment of the invention.

The first step (step 1) of the method can be referred to as a CCE grouping step. At this step, $N_{CCE}$ CCEs, each of which includes modulated symbols constructed from a control information bit sequence to be transmitted in each subframe, or partial CCE segments of each CCE can be defined as one or more groups (for example, $N_{GR}$ groups) for a given purpose.

The second step (step 2) can be referred to as a permutation step. At this step, to achieve a given purpose, permutation can be performed on sequences of REs of all or each of the $N_{GR}$ groups generated through the CCE grouping process of the first step.

The final, third step (step 3) can be referred to as an RE mapping step. At this step, a modulated symbol sequence permutated at the above second step can be mapped to one or more PREs defined according to a specific RE mapping method according to a given purpose. In the following description, the method of mapping modulated symbols in CCEs to PREs in the time-frequency domain in a physical channel is defined as an RE mapping method.

An embodiment of the RE mapping method can be provided as follows. In the case where one or more RE-level distribution transmission schemes are selected for the purpose of achieving frequency diversity gain for PREs that are defined as combinations of OFDM symbols and subcarriers or sets of subcarriers in an OFDMA system, a specific RE mapping method for mapping to specific REs to achieve the above purpose for a group(s) or all REs received from the previous step can be defined and performed at the third step.

The above steps can be combined to design a CCE-to-RE mapping procedure. The steps of the CCE-to-RE mapping procedure may be designed independently of each other and may also be designed in association with each other or designed as an integrated procedure for the sake of simplifying and optimizing the procedure. Reference will now be made in more detail to various embodiments that can implement the steps described above.

Figure 20:
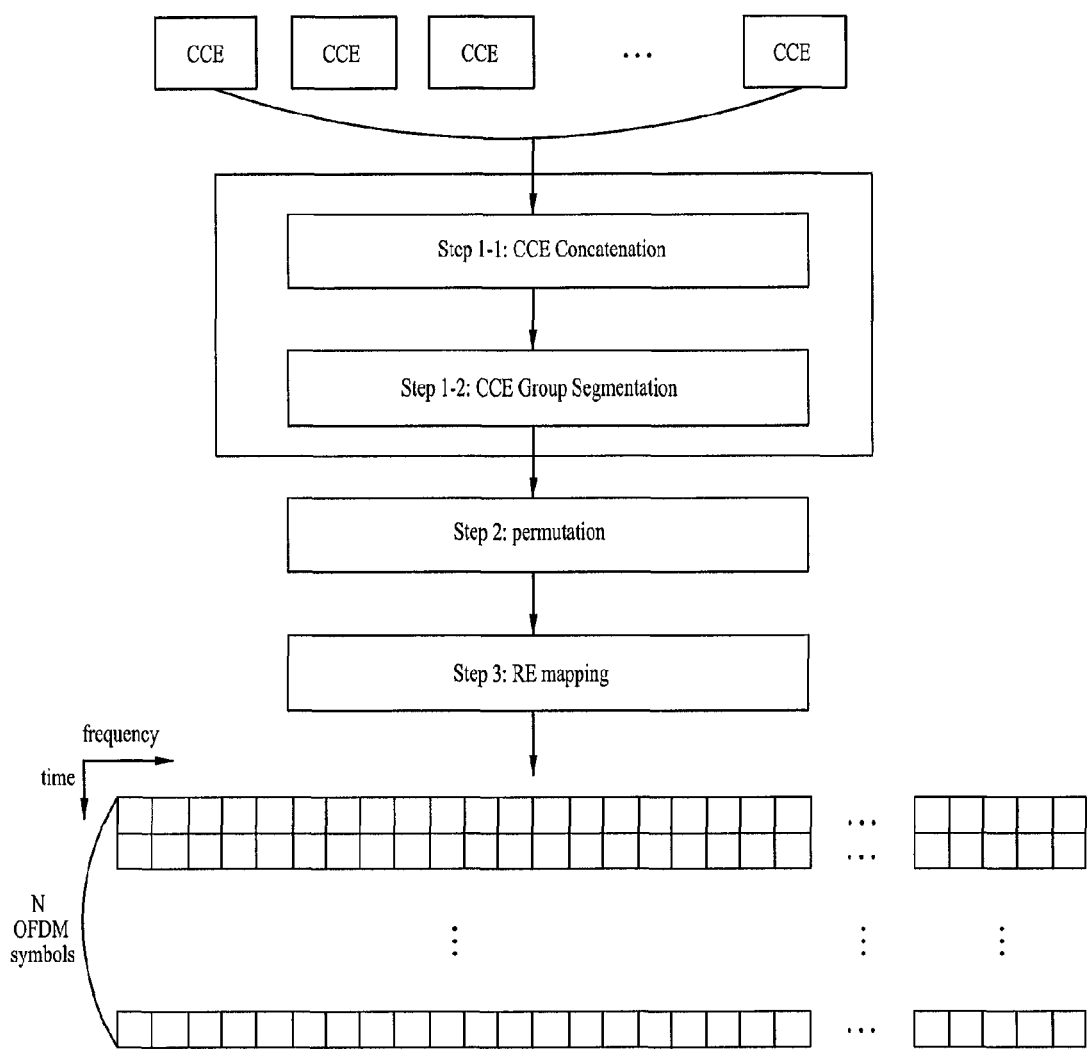
FIG. 20 illustrates an example method for performing mapping using a group definition method according to an embodiment of the invention.

FIG. 20 illustrates an example method for performing mapping using a group definition method according to an embodiment of the invention.

This embodiment is a detailed embodiment of step 1 of FIG. 19. Descriptions of operations of steps 2 and 3 are omitted since they are identical to those described above with reference to FIG. 19. This embodiment relates to an example where a method for defining groups of modulated symbols of CCEs constructed to be transmitted in a subframe in units of an arbitrary number of CCEs or modulated symbols is applied at step 1 of FIG. 19.

CCEs constructed to be transmitted in a subframe are integrated into a modulated symbol sequence at step 1-1 of FIG. 20 and the integrated modulated symbol sequence is divided into one or more groups at step 1-2. In the following description, a method of defining groups in units of an arbitrary number of CCEs is referred to as CCE level grouping. In this case, mapping to PREs defined in a time-frequency domain can be performed at the CCE level.

The number of groups $N_{GR}$ generated by the grouping and the size of each group can be equal or different depending on a given purpose and situation. Reference will now be made to examples of a method for determining the number of groups $N_{GR}$ generated by grouping and a CCE size of each group when the CCE level grouping scheme is applied.

Figure 21:
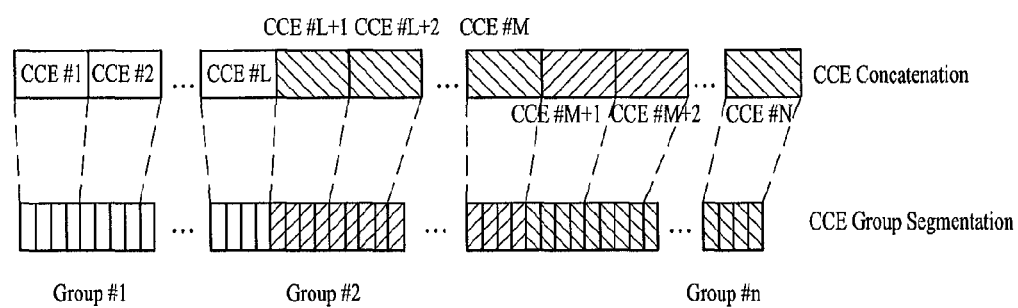
FIG. 21 illustrates an example method using the CCE level grouping scheme according to an embodiment of the invention.
Figure 21:
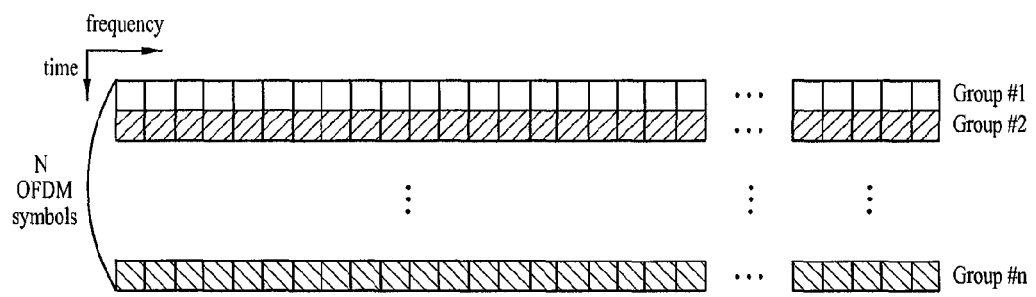

FIG. 21 illustrates an example method using the CCE level grouping scheme according to an embodiment of the invention.

The example of FIG. 21 is an embodiment of the CCE level grouping scheme, i.e., an embodiment of steps 1-1 and 1-2 of FIG. 20, wherein grouping is performed for each OFDM symbol in the time domain. That is, in this case, CCEs are integrated at step 1-1 and the integrated modulated symbol sequence is divided into one or more groups at step 1-2.

The number of groups ($N_{GR}$) generated by the grouping can be determined to be the number of OFDM symbols (n) and the CCE size of each group can be determined to be the number of available PREs included in an OFDM symbol corresponding to each group. Here, the size of each group can be equal or different depending on a given purpose and situation.

Figure 22:
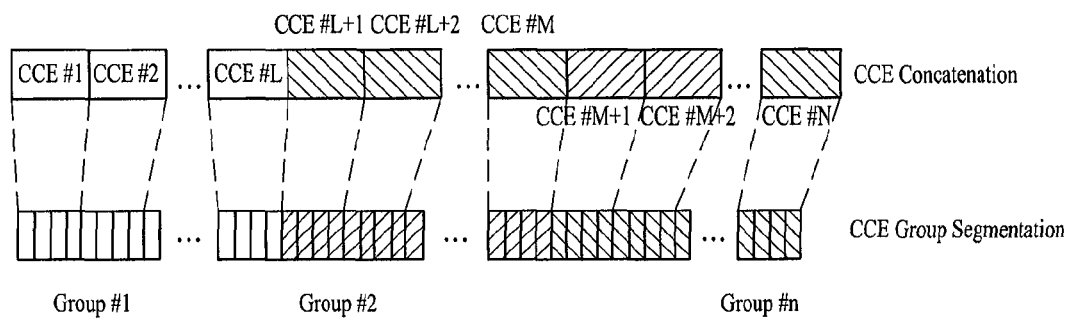
FIG. 22 illustrates another example method using the CCE level grouping scheme according to an embodiment of the invention.
Figure 22:
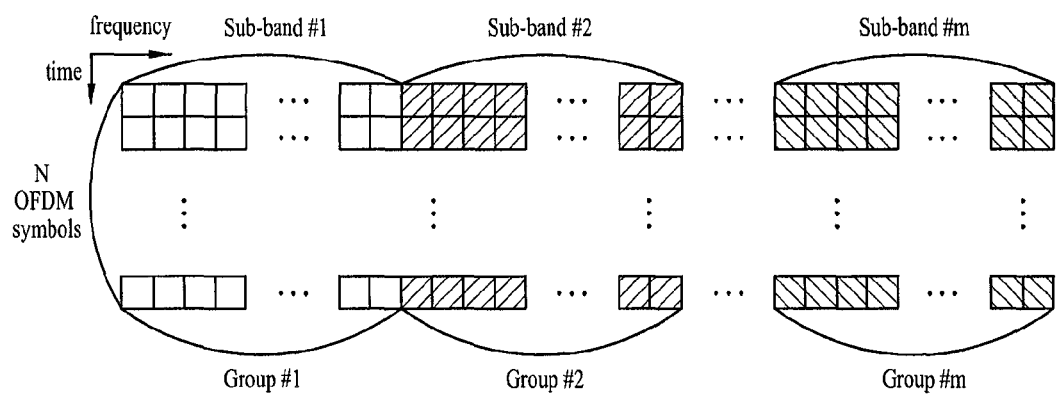

FIG. 22 illustrates another example method using the CCE level grouping scheme according to an embodiment of the invention.

The example of FIG. 22 is an embodiment of the CCE level grouping scheme, i.e., an embodiment of steps 1-1 and 1-2 of FIG. 20, wherein grouping is performed for each subband including an arbitrary number of subcarriers in the frequency domain. That is, in this case, the number of groups ($N_{GR}$) generated by grouping of an integrated RE sequence at step 1-1 can be determined to be the number of subbands (m) and the CCE size of each group can be determined to be the number of available PREs included in a subband corresponding to each group.

Each subband can be defined as a set of actual consecutive subcarriers or a set of subcarriers distributed in units of one or more subcarriers in a total system transmission band depending on the type of transmission. In this case, it is apparent that the size of each group can also be equal or different depending on a given purpose and situation.

Figure 23:
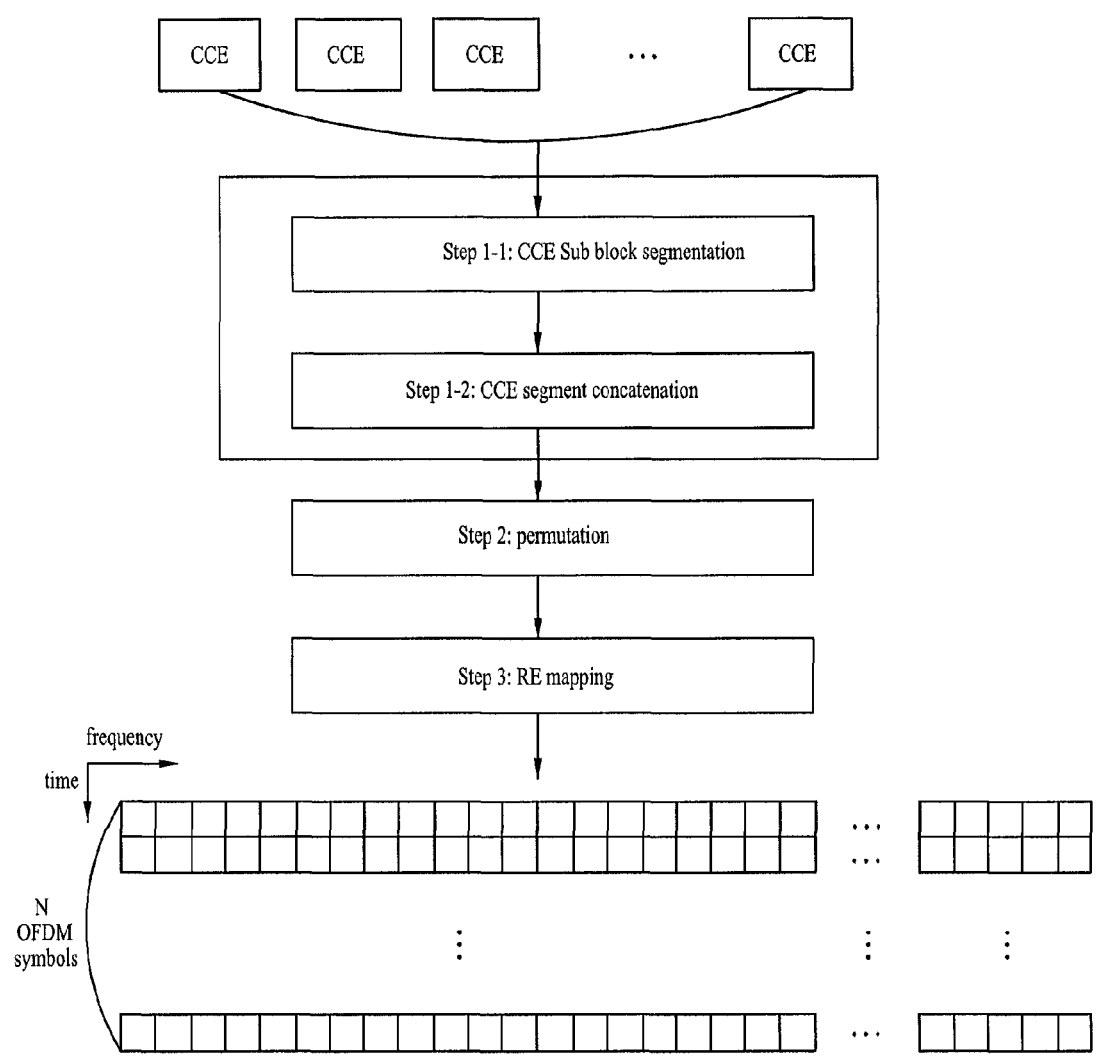
FIG. 23 illustrates an example method for performing mapping using a group definition method according to an embodiment of the invention.

FIG. 23 illustrates an example method for performing mapping using a group definition method according to an embodiment of the invention.

This embodiment is another detailed embodiment of step 1 of FIG. 19. Descriptions of operations of steps 2 and 3 are omitted since they are identical to those described above with reference to FIG. 19. This embodiment relates to an example where the method for defining groups of modulated symbols of CCEs, such that modulated symbols included in a CCE are distributed so as to be included in different groups described above with reference to FIG. 2(b), is applied at step 1 of FIG. 19.

At step 1-1 of FIG. 23, an operation for dividing modulated symbols included in each CCE into a number of CCE segments equal to or greater than the total number of groups is performed in order to distribute and map modulated symbols of CCEs. Then, at step 1-2, one or more of the divided CCE segments of each CCE are combined into a group. The method, in which each CCE is divided into one or more CCE segments and CCE segments are combined into a group in this manner, is defined as a CCE sub-block level grouping scheme.

The number of groups $N_{GR}$ generated by the grouping and the size of each group can be equal or different depending on a given purpose and situation. Reference will now be made to examples of a method for determining the number of groups $N_{GR}$ generated by grouping and a CCE segment size of each group when the CCE sub-block level grouping scheme is applied.

Figure 24:
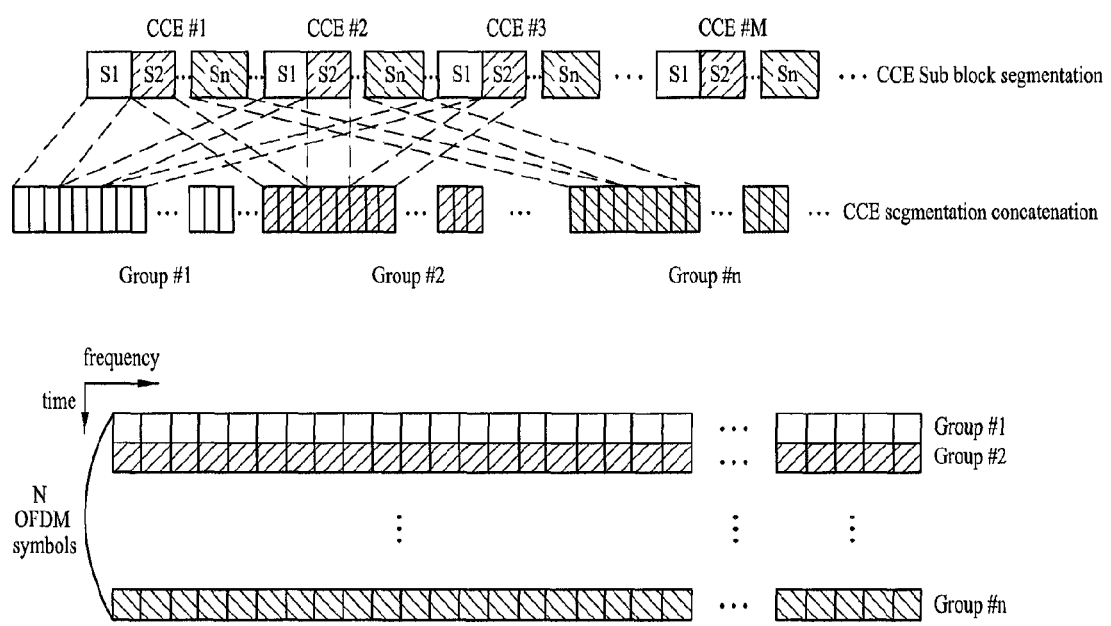
FIG. 24 illustrates an example method using the CCE sub-block level grouping scheme according to an embodiment of the invention.

FIG. 24 illustrates an example method using the CCE sub-block level grouping scheme according to an embodiment of the invention.

The example of FIG. 24 is an embodiment of the CCE sub-block level grouping scheme, i.e., an embodiment of steps 1-1 and 1-2 of FIG. 23, wherein grouping is performed for each OFDM symbol in the time domain. That is, in this case, CCEs are divided into segments at step 1-1 and divided CCE segments are combined to generate one or more groups at step 1-2.

The number of groups ($N_{GR}$) generated by the grouping can be determined to be the number of OFDM symbols (n) and the CCE segment size of each group can be determined to be the number of available PREs included in an OFDM symbol corresponding to each group. Here, the size of each group can be equal or different depending on a given purpose and situation.

Figure 25:
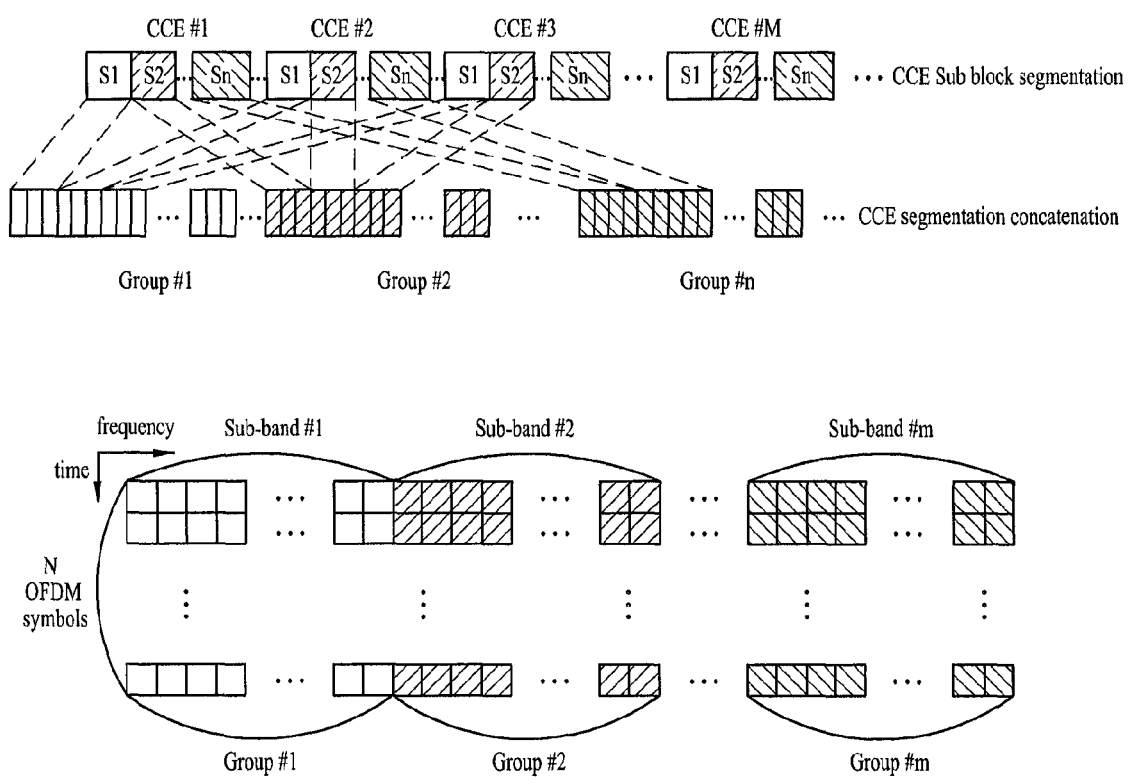
FIG. 25 illustrates another example method using the CCE sub-block level grouping scheme according to an embodiment of the invention.

FIG. 25 illustrates another example method using the CCE sub-block level grouping scheme according to an embodiment of the invention.

The example of FIG. 25 is an embodiment of the CCE sub-block level grouping scheme, i.e., an embodiment of steps 1-1 and 1-2 of FIG. 23, wherein grouping is performed for each subband including an arbitrary number of subcarriers in the frequency domain. That is, in this case, the number of groups ($N_{GR}$) generated by grouping divided CCE segments at step 1-1 can be determined to be the number of subbands (m) and the CCE size of each group can be determined to be the number of available PREs included in a subband corresponding to each group.

Each subband can be defined as a set of actual consecutive subcarriers or a set of subcarriers distributed in units of one or more subcarriers in a total system transmission band depending on the type of transmission. In this case, it is apparent that the size of each group can also be equal or different depending on a given purpose and situation.

It will also be apparent that the CCE level grouping scheme can be applied in conjunction with the CCE sub-block grouping scheme. For example, groups may be defined for some CCEs by dividing each CCE into CCE segments according to the CCE sub-block level grouping scheme and groups may be defined for some CCEs without dividing each CCE into CCE segments according to the CCE level grouping scheme.

The positions of modulated symbols of one or more groups generated through the process of step 1 are changed in the permutation process of step 2 in the method of FIG. 20. In the permutation process, a single permutation pattern can be applied or an independent permutation pattern can be applied for each individual RE group when the permutation is performed individually for each of the groups generated at step 1. On the other hand, all groups may be integrated and the permutation method of step 2 may be performed as a single process on the integrated groups.

Especially, in the case where multi-cell environments are taken into consideration, if the same RE mapping method as described above is applied to all cells, the same RE mapping method is provided for each cell. In this situation, the influence of inter-cell interference may be significant if the same RE mapping method is applied to each cell when power control of the control channel is applied and frequency-domain load of the control channel is great compared to a system transmission band in a given cell.

One method that can be considered to overcome this problem in such a situation is to implement cell-specific permutation. Examples of the cell-specific permutation method include a method for adjusting interference between cells by coordinating the RE mapping method of each cell, a method for randomizing inter-cell interference by statistically multiplexing resources, which are commonly used by each cell in a specific RE mapping method, in the time domain, and an inter-CCE permutation method which spreads, when the same RE mapping method is used for each cell, the influence of inter-cell interference over multiple CCEs to achieve channel coding gain, thereby reducing the influence of inter-cell interference.

In the case where inter-CCE permutation is used so that the influence of inter-cell interference is spread over a number of CCEs while an RE mapping method is commonly used for every cell in multi-cell environments, an advantage may be obtained in that the degree of freedom of randomization of the influence of inter-cell interference is increased. However, in this case, there may be a problem in that uniform distances between PREs for providing optimal diversity gain in the physical resource domain are not maintained for PREs to which modulated symbols of CCEs are mapped.

Figure 26:
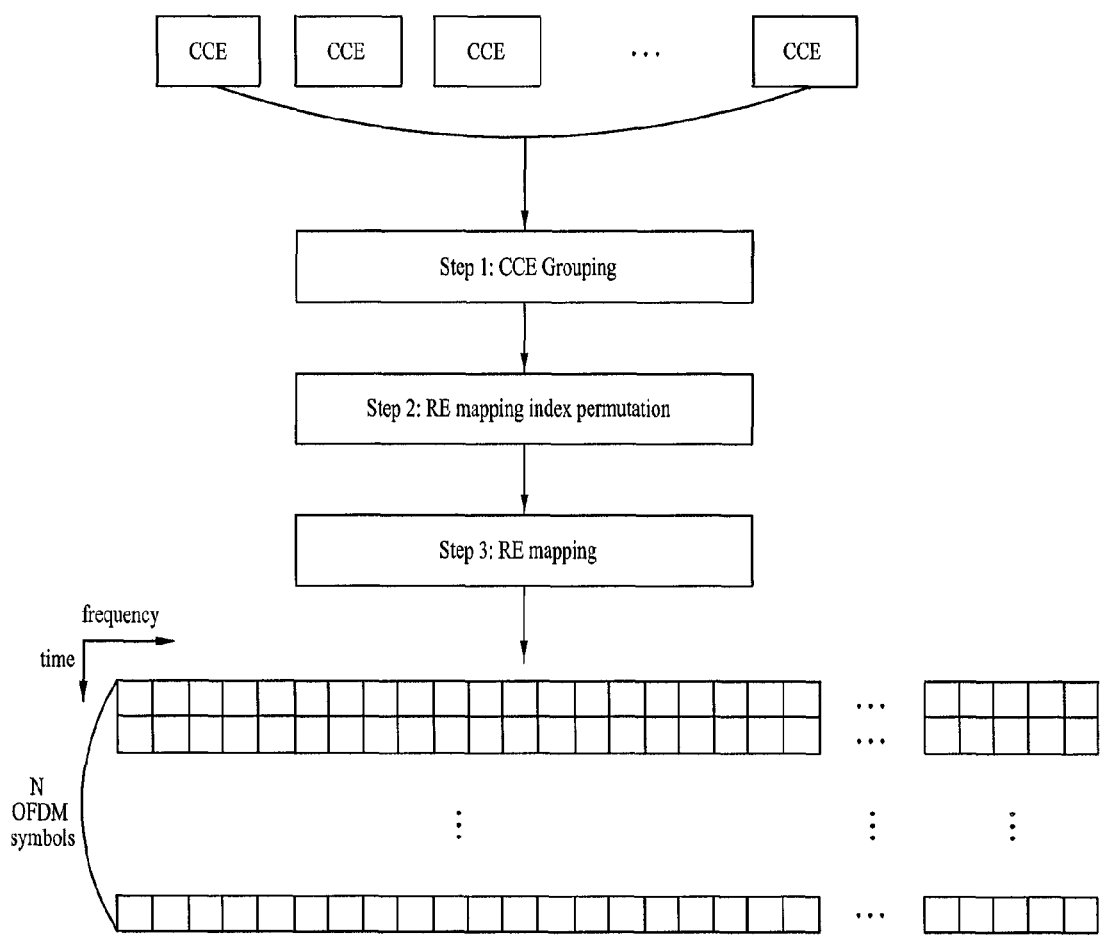
FIG. 26 illustrates a method for performing mapping using a group definition method according to an embodiment of the invention.

FIG. 26 illustrates a method for performing mapping using a group definition method according to an embodiment of the invention.

This embodiment is a detailed embodiment of step 2 of FIG. 19. Descriptions of operations of steps 1 and 3 are omitted since they are identical to those described above with reference to FIG. 19. This embodiment provides an RE mapping index permutation method as a method for performing the permutation process. The RE mapping index permutation method is a permutation method in which a sequence of modulated symbols of each arbitrary group or all groups defined at step 1 is reordered through cyclic shift using a predetermined shift offset.

Specifically, a sequence of modulated symbols of each arbitrary group or all groups is reordered through cyclic shift using a cell-specific shift offset in order to achieve coordination or randomization of inter-cell interference in multi-cell environments. A cell-specific RE mapping index offset of each cell can be generated using a unique index of each cell such as a cell ID or a cell group ID.

Here, the implementation of RE mapping index permutation through shift with a specific uniform-interval offset extracted by a cell ID or a combination of a cell ID and a cell group ID may be considered implementation for coordination of typical inter-cell interference. The method of performing permutation using a different random value for each subframe in the time domain and a random permutation pattern generated by a cell ID or a combination of a cell ID and a cell group ID can be considered a method implemented for randomization of statistical inter-cell interference.

If it is assumed that REs output from a block interleaver are sequentially mapped to PREs when the permutation operation is performed using the block interleaver, this RE mapping index permutation method can be basically considered an inter-row permutation operation in the block interleaver.

Figure 27:
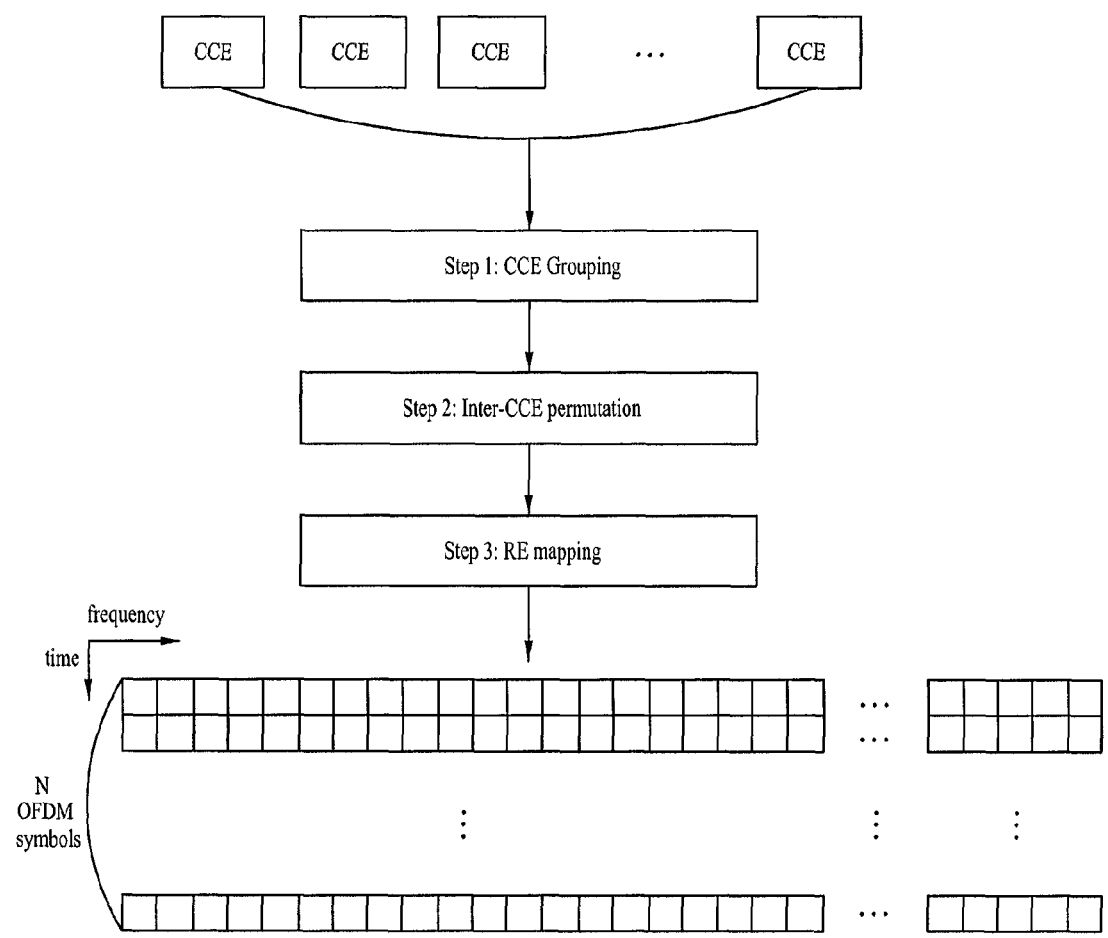
FIG. 27 illustrates an example method for performing mapping using a group definition method according to an embodiment of the invention.

FIG. 27 illustrates an example method for performing mapping using a group definition method according to an embodiment of the invention.

This embodiment is a detailed embodiment of step 2 of FIG. 19. Descriptions of operations of steps 1 and 3 are omitted since they are identical to those described above with reference to FIG. 19. This embodiment provides inter-CCE permutation as a method for performing the permutation process. The inter-CCE permutation method is a permutation method in which a sequence of modulated symbols of each arbitrary CCE or CCE segment group or a sequence of modulated symbols of all CCEs is reordered using a specific pattern. That is, using this permutation method, it is possible to perform mapping to PREs according to a specific RE mapping method while multiplexing multiple CCEs, thereby spreading interference.

Also in this case, the order of modulated symbols in a modulated symbol sequence of each arbitrary CCE or CCE segment group or a sequence of modulated symbols of all CCEs can be changed using a cell-specific permutation pattern in order to spread the influence of inter-cell interference over multiple CCEs in multi-cell environments as described above. In addition, a cell-specific permutation pattern of each cell can be generated using a unique index of each cell such as a cell ID or a cell group ID.

If it is assumed that REs output from a block interleaver are sequentially mapped to PREs when the permutation operation is performed using the block interleaver, this RE mapping index permutation method can be basically considered an intra-column shift operation in the block interleaver.

Figure 28:
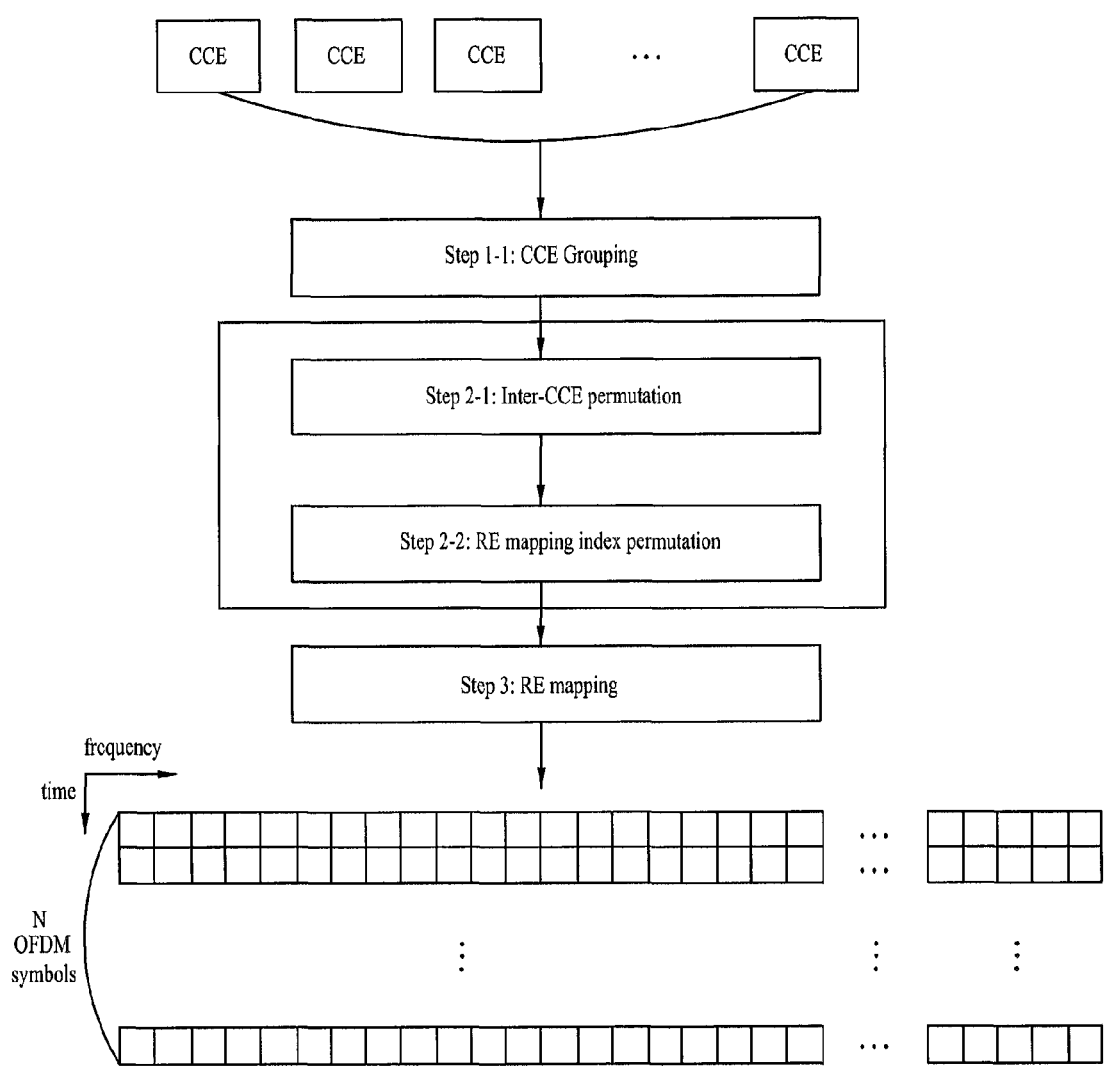
FIG. 28 illustrates an example method for performing mapping using a group definition method according to an embodiment of the invention.

FIG. 28 illustrates an example method for performing mapping using a group definition method according to an embodiment of the invention.

This embodiment is a detailed embodiment of step 2 of FIG. 19. Descriptions of operations of steps 1 and 3 are omitted since they are identical to those described above with reference to FIG. 19. This embodiment provides a method for performing a permutation process using both the RE mapping index permutation method and the inter-CCE permutation method.

The method for performing a permutation process using both the RE mapping index permutation method and the inter-CCE permutation method can be implemented by sequentially performing the RE mapping index permutation and the inter-CCE permutation. In addition, when the permutation operation is performed using the block interleaver, the RE mapping index permutation method and the inter-CCE permutation method can be freely implemented simultaneously or individually through an intra-column shift operation of the block interleaver.

As described above, the block interleaver can be used in the permutation process of step 3 of FIG. 19. Here, only one block interleaver can be implemented for REs mapped to OFDM symbols in the total time domain. Alternatively, the same number of block interleavers as the number of OFDM symbols can be provided such that one block interleaver is individually constructed for each OFDM symbol. The number of OFDM symbols "n" can be reported through a Control Channel Format Indicator (CCFI) or cat. 0. In this case, the size of each of the n block interleavers may be equal to $N_{RE}^{symbol(i)} \times N_{CCE}^{max}(i)$.

Figure 29:
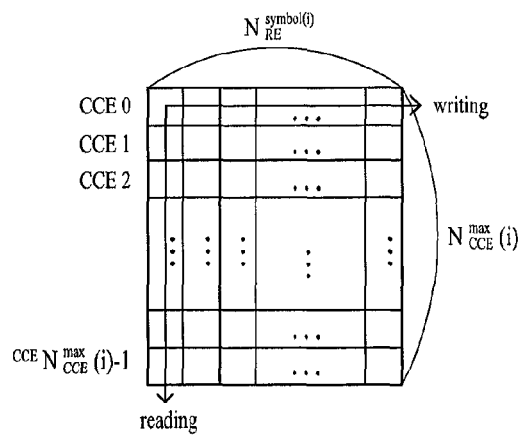
FIG. 29 illustrates an example configuration of a block interleaver that implements the CCE-to-RE mapping method according to an embodiment of the invention.

FIG. 29 illustrates an example configuration of a block interleaver that implements the CCE-to-RE mapping method according to an embodiment of the invention.

From the configuration of the block interleaver shown in FIG. 29, it can be seen that the size of each of the n block interleavers may be equal to $N_{RE}^{symbol(i)} \times N_{CCE}^{max}(i)$. $N_{RE}^{symbol(i)}$ of each of the $N_{CCE}^{max}$ CCEs to be mapped to an ith OFDM symbol is input to the block interleaver in a row direction of the block interleaver. After undergoing a series of operations, REs can be sequentially output in a column direction so that the output REs are mapped to PREs of a corresponding physical resource domain according to the RE mapping method and are then transmitted through the mapped PREs.

As shown in FIG. 29, CCE(0) is input to the first row of the block interleaver of the ith OFDM symbol. Then, CCE (0) is input to the second row, CCE(1) is input to the third row, and CCE($N_{CCE}^{max}(i)-1$) is input to the $N_{CCE}^{max}(i)$th row.

Figure 30:
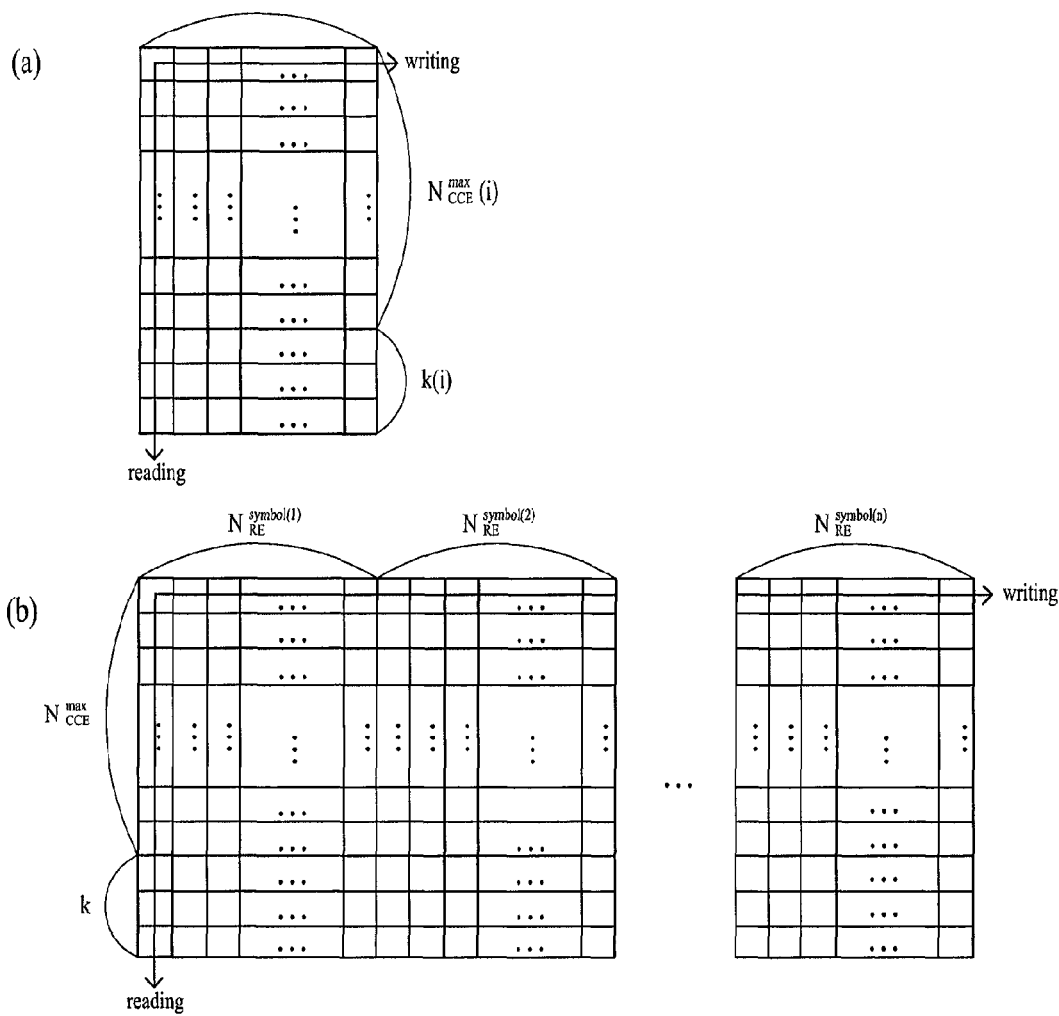
FIGS. 30(a) and 30(b) illustrate example configurations of a block interleaver that implements the CCE-to-RE mapping method according to an embodiment of the invention.

FIG. 30 illustrates an example configuration of a block interleaver that implements the CCE-to-RE mapping method according to an embodiment of the invention.

A group can be constructed from CCEs for each OFDM symbol. In the case where a method for specifying and allocating the number of REs of each CCE for an OFDM symbol is used, the number of PREs remaining for each OFDM symbol may exceed the number of REs of the CCE. In this case, the excess PREs can be allocated for transmission of an additional CCE.

Mathematical Expression 22 represents a method applied when the number of PREs remaining for each OFDM symbol exceeds the number of REs in a CCE. To implement this method, $N_{CCE}^{max}$ is defined as a minimum value of $N_{CCE}^{max}(i)$ for each OFDM symbol.

[MATHEMATICAL EXPRESSION 22]

$$Q(i) = \# \text{ of residual } REs \text{ in } i\text{-th } OFDM \text{ symbol}$$

$$Q(i) = M_i - \left(N_{CCE}^{max} \cdot N_{Re}^{symbol(i)}\right)$$

$$Q'(i) = M_i - \left(N_{CCE}^{max}(i) \cdot N_{Re}^{symbol(i)}\right)$$

$$\text{if } \sum_{i=1}^{n} Q(i) > CCE_{size}$$

$$l = \left\lfloor \frac{\sum_{i=1}^{n} Q(i)}{CCE_{size}} \right\rfloor$$

-continued if $Q'(i) > 0$ $k(i) = N_{CCE}^{max}(i) - N_{CCE}^{max} + 1$ else $k(i) = N_{CCE}^{max}(i) - N_{CCE}^{max}$ $k = \max\{k(i)\}$ Here, PREs, which are not used for transmitting modulated symbols of CCEs for each OFDM symbol, are generated. The number of PREs which are not used for CCE transmission for each OFDM symbol can be defined as Q(i) and Mathematical Expressions 18 and 19 can be referred to for other notations.

If the sum of Q(i) in a subframe is greater than $CCE_{size}$ when CCEs are transmitted using n OFDM symbols in the subframe, it is possible to transmit a larger number of CCEs than $N_{CCE}^{max}$. Accordingly, the number of OFDM symbols used for CCE transmission in the subframe is n as can be seen from Mathematical Expression 22. Here, l and k(i) are defined when the sum of Q(i) of the n OFDM symbols is greater than $CCE_{size}$.

When the sum of Q(i) of the n OFDM symbols is greater than $CCE_{size}$, l is the number of CCEs that can be transmitted in addition to $N_{CCE}^{max}$ CCEs in the subframe. When block interleavers constructed respectively for the OFDM symbols are used, k(i) is the number of rows in an interleaver of an ith OFDM symbol, which are used for transmitting l more CCEs other than $N_{CCE}^{max}$ CCEs, other than $N_{CCE}^{max}$ rows in the interleaver of the ith OFDM symbol.

Even when l rows are added for transmitting l more CCEs other than $N_{CCE}^{max}$ CCEs, the number of used PREs may be insufficient for $M_i$. Q'(i) is defined to use all PREs remaining in this case. Q'(i) represents a smaller number of PREs than $N_{Re}^{symbol(i)}$ in one OFDM symbol.

FIG. 30(a) illustrates an example configuration of an interleaver of an ith OFDM symbol when Q(i) and Q'(i) are taken into consideration and FIG. 30(b) illustrates an example configuration of respective interleavers of n OFDM symbols when Q(i) and Q(i) are taken into consideration.

Using the block interleaver constructed according to Q(i), Q'(i), l, and k(i) can reduce the number of PREs that are not used for CCE transmission in each OFDM symbol. Through puncturing, mapping to PREs may not performed for columns in a k(i)th row whose column indices are greater than the length of Q'(i) when Q(i) is greater than 0.

As shown in FIGS. 30(a) and 30(b), the same number of k rows as the maximum of k(i) of n OFDM symbols used for CCE transmission can be added to $N_{CCE}^{max}$ rows to transmit l more CCEs. When this method is employed, the input and output of the interleaver can be estimated based on indices of the interleaver. Therefore, when k rows are added for one OFDM symbol so that the number of modulated symbols in the CCE exceeds $M_i$, mapping to PREs may not be performed by carrying out puncturing based on the indices.

When the method employing the permutation process of step 2 through the block interleaver is applied, the various types of intra-column shift operations described above can be defined as representative functions which are expressed by the following Mathematical Expression 23.

Input(r,c) $r=0,1,\ldots,N_{CCE}^{max}(i)-1$ $c=0,1,\ldots,N_{RE}^{symbol(i)}-1$ Output(r',c) $r'=(r+v(cell\_ID,cell\_group\_ID)+w(c))$ mod $N_{CCE}^{max}(i)$ [MATHEMATICAL EXPRESSION 23]

Mathematical Expression 23 represents an example of generalization of a function v(cell_ID, cell_group_ID) that represents coordination and randomization for allocating a cell-specific RE mapping scheme and a general function w(c) for various types of implementation of inter-CCE permutation.

In Mathematical Expression 23, v(cell_ID, cell_group_ID) is a generalized representation of a function that intermediates an intra-column shift operation that can generate a unique RE mapping scheme for each cell or each cell group based on cell_ID and cell_group_ID. And, w(c) is a generalized representation of a function for generating various offsets that can be used for inter-CCE permutation.

When inter-CCE permutation is implemented using an intra-column shift operation, only the v(cell_ID, cell_group_ID) function may be used and only the w(c) function may also be used and both the functions or none of the functions may also be used in the following generalized equations.

A description of the present embodiments will be described with reference to an example where a method of mapping each group generated according to a CCE-level grouping method to each subband is applied in the CCE grouping process of step 1 in the implementation of CCE-to-RE mapping described above and an RE mapping index permutation method is applied in the permutation process of step 2. Particularly, the description will be given with reference to the case where a block interleaver is used.

Coordination and randomization of inter-cell interference can be performed using a block interleaver in order to reduce the influence of inter-cell interference in the case where no inter-CCE permutation is taken into consideration.

Figure 31:
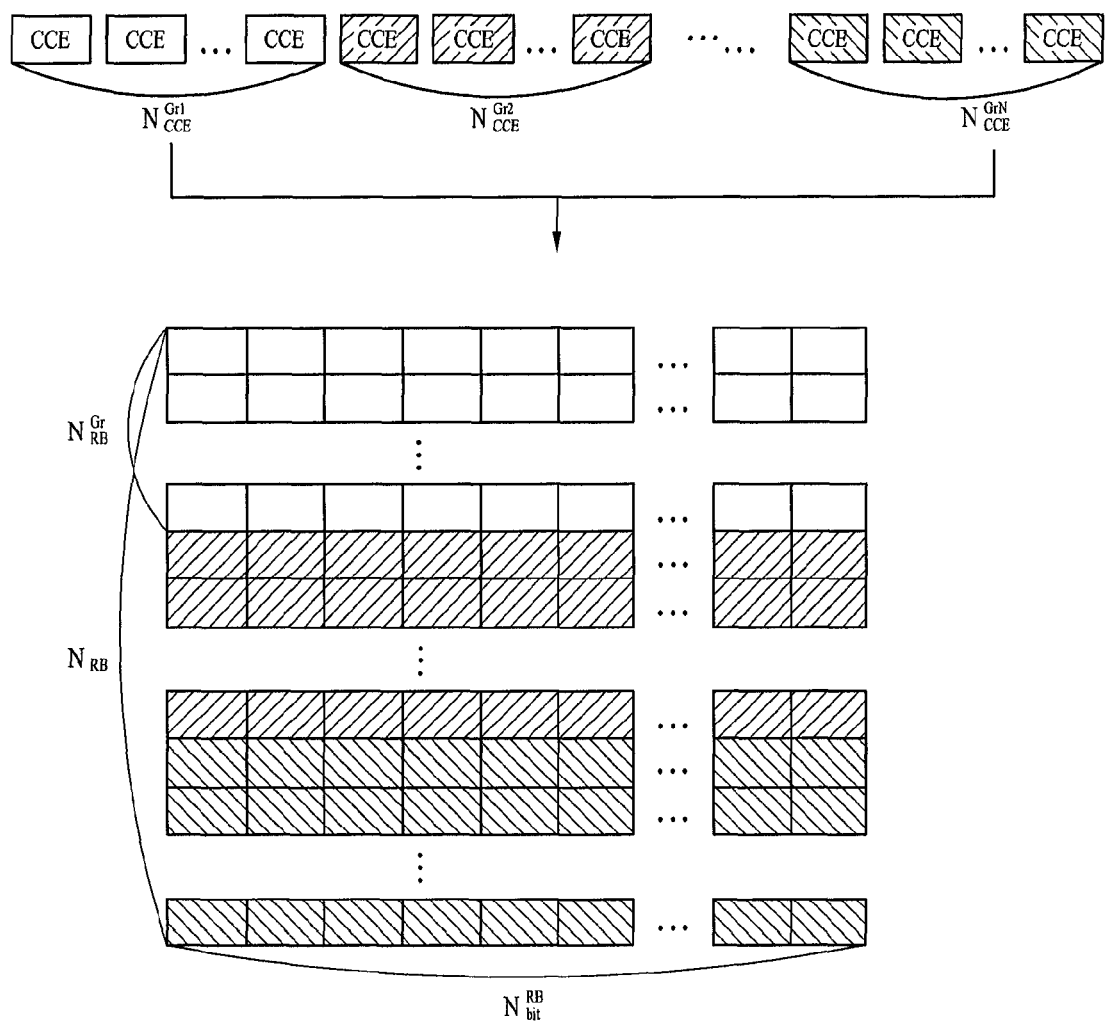
FIG. 31 illustrates an example method for performing control channel mapping using a block interleaver according to an embodiment of the invention.

FIG. 31 illustrates an example method for performing control channel mapping using a block interleaver according to an embodiment of the invention.

Frequency diversity can be obtained in units of resource blocks, each including an arbitrary number of PREs, in the time-frequency domain in distributed time-frequency resource conditions of an OFDM communication system. In this case, resource blocks can be considered units of OFDM symbols and can also be considered subband units, each including a predetermined number of subcarriers as described above.

In FIG. 31, $N_{bit}^{RB}$ is the number of CCEs per resource block and $N_{RB}$ is the total number of resource blocks used for control channels in the system. And, $N_{RB}^{Gr}$ is the number of resource blocks used for a group of $N_{CCE}^{Gr}$; CCEs.

It may be necessary to perform mapping through individual block interleaving for each OFDM symbol in the case where the number of available Physical Resource Elements (PREs) is not uniform for each OFDM symbol. In this case, $N_{bit}^{RB}$ and $N_{RB}$ (and $N_{RB}^{Gr}$ as needed) can be applied as values in an OFDM symbol.

$N_{ant}$ subcarriers are defined as one RE when $N_{ant}$ transmit antennas are used for SFBC employing a multiple antenna transmit diversity scheme. In the case where mapping is performed in an RE-level distributed transmission mode in a resource block level when $N_{ant}$ transmit antennas are used, the value of $N_{bit}^{RB}$ is equal to $N_{ant}$, $N_{RB}^{Gr}$ is defined as the product of $N_{CCE}^{Gr}$ and $N_{RE}^{CCE}$ which is the number of REs per CCE, and $N_{RB}$ is defined as the product of $N_{RB}^{GR}$ and $N_{ant}$ thereby implementing mapping of the transmission mode.

Figure 32:
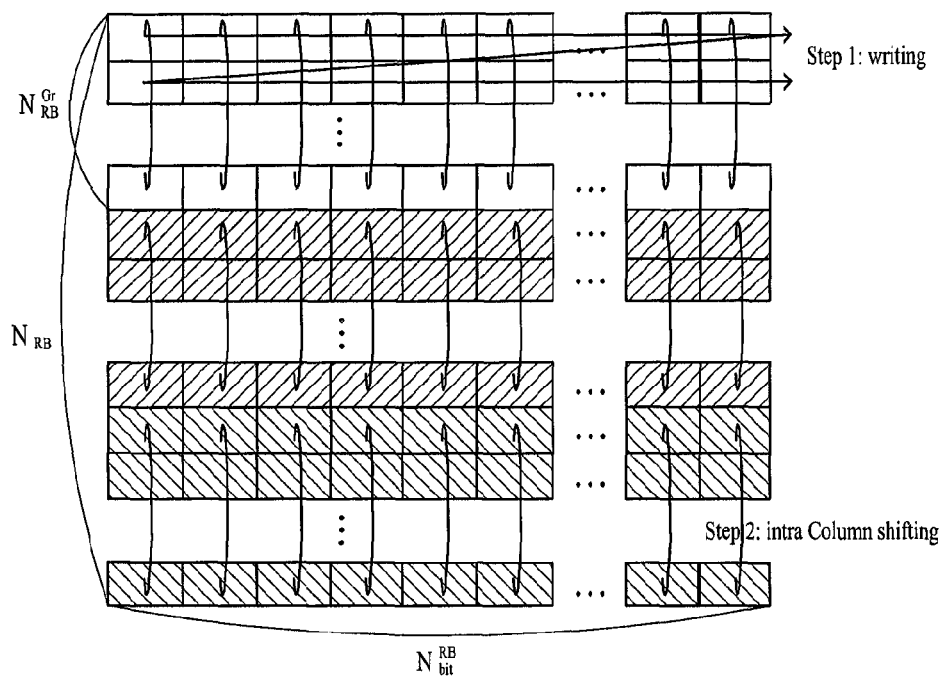
FIGS. 32 and 33 illustrate, in a stepwise manner, example operations of a block interleaver constructed according to an embodiment of the invention.
Figure 33:
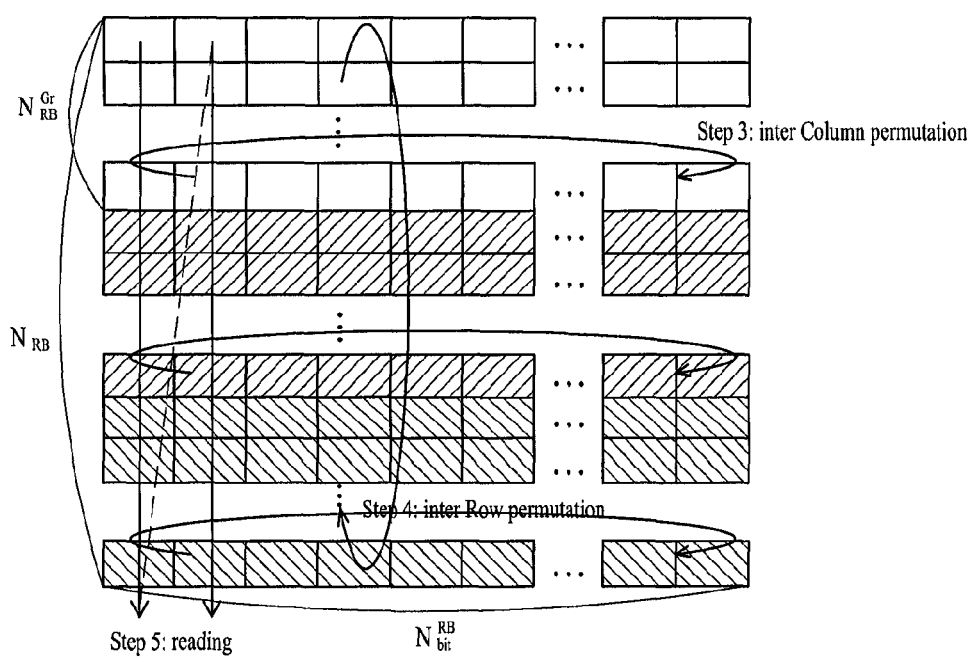

FIGS. 32 and 33 illustrate, in a stepwise manner, example operations of a block interleaver constructed according to an embodiment of the invention.

Specifically, FIG. 32 illustrates an input process and an intra-column shift operation of the block interleaver and FIG. 33 illustrates an inter-column permutation operation, an inter-row permutation operation, and an output process of the block interleaver.

The block interleaver operations will now be described with reference to FIGS. 32 and 33. At step 1, CCEs used for a total control channel are sequentially input to the block interleaver in a row direction and, at step 2, an intra-column shift operation is performed in units of NZ rows in order to distribute modulated symbols in each CCE over N resource blocks in a corresponding group for each CCE. In an embodiment of step 2, a shift offset of each column can be determined as expressed in the following Mathematical Expression 24.

$$D_{offset} = (c \cdot k) \% N_{RB}^{Gr},$$
$$c = 0, 1, \ldots, N_{RB} - 1 \quad \text{[MATHEMATICAL EXPRESSION 24]}$$

In Mathematical Expression 24, k is an integer value that defines a column-based shift offset.

At step 3, inter-column permutation is performed in order to distribute CCEs in a resource block. A permutation pattern used in this process may use a previously suggested scheme or a scheme defined to be optimized for the number of columns "$N_{bit}^{RB}$".

Additional benefit can be expected if this operation is applied to the case where the frequency band of the resource block is larger than a coherent bandwidth of frequency selective fading when allocation is made to subcarriers in units of resource blocks in a frequency region.

In addition, randomization of inter-cell interference can be implemented as an operation for shifting by a fixed value uniquely generated for each cell through a cell ID or a combination of a cell ID and a cell group ID.

In an alternative method, randomization of inter-cell interference can be implemented as an operation of shifting uniquely in each row by applying values generated by a random generation function obtained from a cell ID and a cell group ID to each subframe unit in the time domain or each row unit corresponding to a resource block in the frequency domain or both the units in the time-frequency domain.

At step 4, it is possible to implement a function to locate resource blocks so as to achieve frequency diversity in a total system transmission band and a function to apply coordination of inter-cell interference by assigning a cell-specific offset to each cell. Each function can be represented by the following Mathematical Expression 25.

Input($r,c$) $r = 0, 1, \ldots, N_{RB} - 1$ $c = 0, 1, \ldots, N_{RB}^{bit} - 1$ Output($r',c$) $r' = (s(r,M) + t$
(cell_ID))mod $N_{RB}$ [MATHEMATICAL EXPRESSION 25]

In Mathematical Expression 25, M is a value representing the distance between resource blocks of the same group in a system transmission band, and $s(r,M)$ can be represented by the following Mathematical Expression 26.

$$s(r,M) = \lfloor r/N_{RB}^{Gr} \rfloor + M \cdot (r \% N_{RB}^{Gr}) \quad \text{[MATHEMATICAL EXPRESSION 26]}$$

Here, $s(r,M)$ can be represented by the following Mathematical Expression 27 when M is defined as the number of groups "$N_{Gr}$" set in the band. Here, $N_{Gr}$ may be a value obtained by dividing the total number of resource blocks "$N_{RB}^{Gr}$" used in a transmission band by the number of resource blocks "$N_{RB}$" per group.

$$s(r,M) = \lfloor r/N_{RB}^{Gr} \rfloor + N_{Gr} \cdot (r \% N_{RB}^{Gr}) = \lfloor r/N_{RB}^{Gr} \rfloor + (N_{RB}/N_{RB}^{Gr}) \cdot (r \% N_{RB}^{Gr}) \quad \text{[MATHEMATICAL EXPRESSION 27]}$$

When it is assumed that "M" is equal to or greater than the number of cells "R" in a base station, a function t(cell_ID) that serves as coordination of inter-cell interference is basically defined as expressed in the following Mathematical Expression 28.

$$t(\text{cell\_ID}) = \text{cell\_ID},$$
$$\text{cell\_ID} = 0, 1, \ldots, R - 1 \quad \text{[MATHEMATICAL EXPRESSION 28]}$$

At the final step 5, modulated symbols are sequentially read and output from the block interleaver in a row direction and modulated symbols corresponding respectively to elements of each row are mapped to REs of each resource block.

Figure 34:
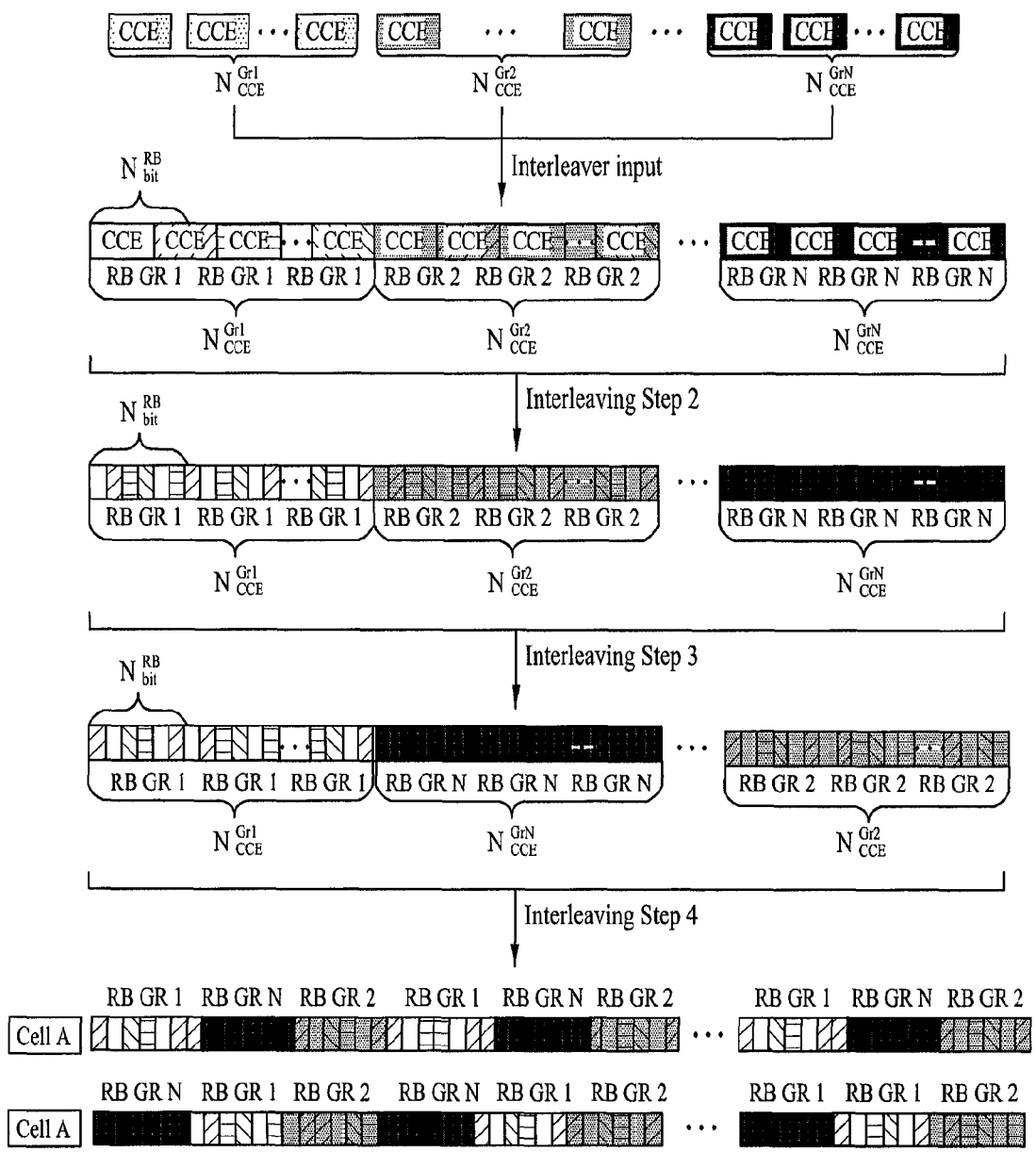
FIG. 34 is a flow diagram sequentially illustrating CCE-to-RE mapping processes according to an embodiment of the invention.

FIG. 34 is a flow diagram sequentially illustrating CCE-to-RE mapping processes according to an embodiment of the invention.

Specifically, FIG. 34 illustrates CCEs and changes in the positions of modulated symbols in the CCEs when an interleaving operation has been performed at each step in the case where a block interleaving operation is implemented in a cell A according to the 5 steps described above with reference to FIGS. 31 to 33. A bottom portion of FIG. 34 illustrates CCEs and changes in the positions of modulated symbols in the CCEs when an interleaving operation has been performed using a different shift offset and permutation pattern different from those of the cell A in the case where a block interleaving operation is implemented in another cell (i.e., cell B) according to the 5 steps described above with reference to FIGS. 31 to 33.

Embodiment 7

In this embodiment, when an arbitrary one of a variety of downlink control channels is transmitted through one or more OFDM symbols, interleaving can be performed on modulated symbols or mini-CCEs included in a CCE of the arbitrary control channel transmitted through each OFDM symbol. Specifically, modulated symbols or mini-CCEs of CCEs are divided into n groups so that the modulated symbols or mini-CCEs can be transmitted through n OFDM symbols and interleaving is performed on modulated symbols or mini-CCEs of CCEs transmitted through the same OFDM symbol, taking into consideration the respective OFDM symbols to which the groups are mapped.

Although the following description is limited to mapping of mini-CCEs, it will be apparent that the same method can be applied to mapping of modulated symbols.

Figure 35:
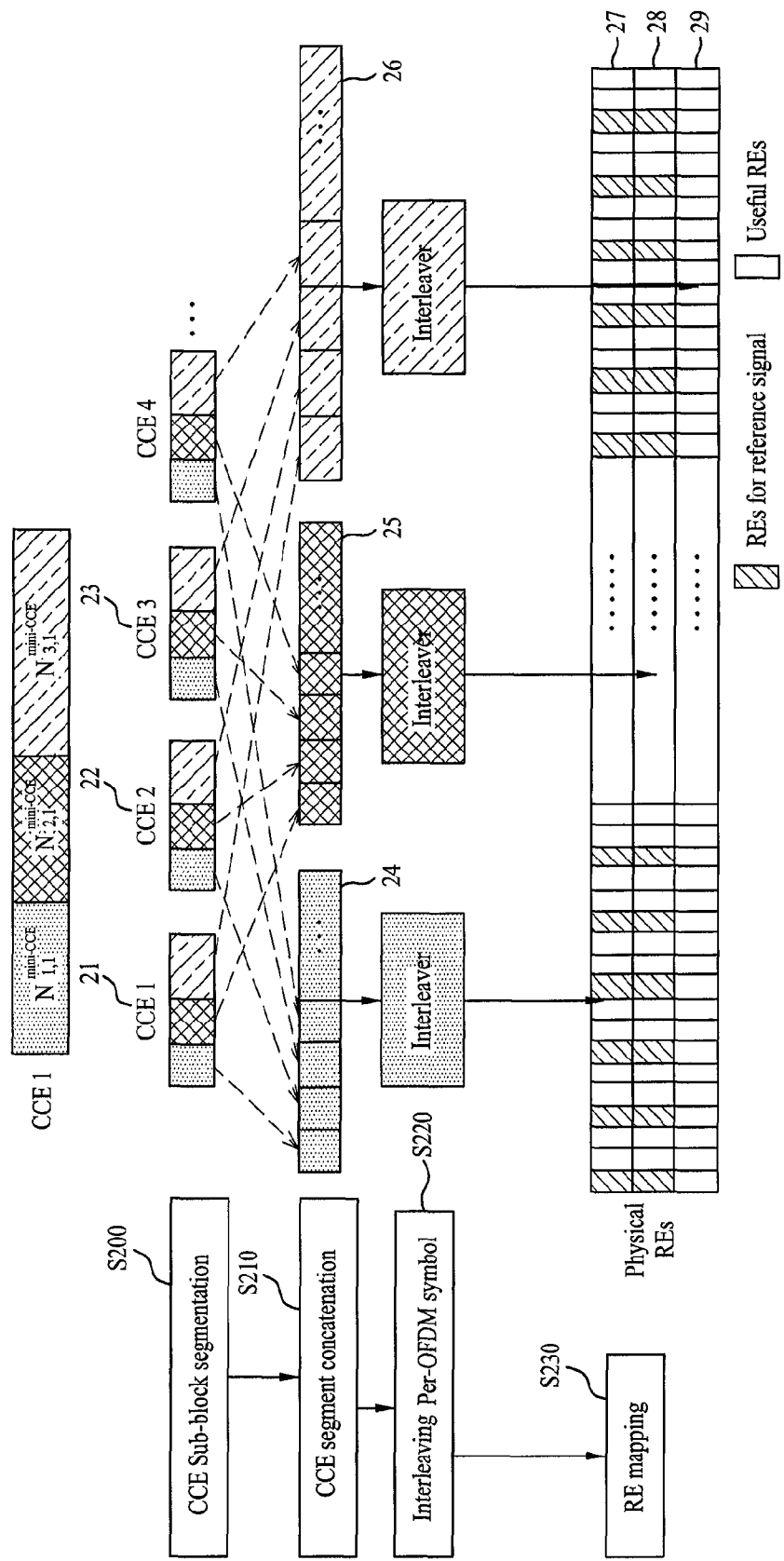
FIG. 35 illustrates an example method for performing mapping after interleaving is done for each OFDM symbol according to an embodiment of the invention.

FIG. 35 illustrates an example method for performing mapping after interleaving is done for each OFDM symbol according to an embodiment of the invention.

Specifically, FIG. 35 illustrates an example procedure in which CCEs, which are unit elements of a control channel, are combined to perform interleaving and are then mapped to one or more OFDM symbols. Especially, it can be seen from FIG. 35 that interleaving is performed on mini-CCEs in CCEs transmitted through the same OFDM symbols.

First, a control channel includes one or more CCEs, and each CCE is divided into one or more sub-blocks at step S200. In the case where the control channel is transmitted through one or more symbols, this process serves to distribute and transmit each CCE over the OFDM symbols carrying the control channel, thereby increasing diversity gain and making power of each symbol as uniform as possible.

In the example of FIG. 35, each of the CCEs (CCE 1 (21), CCE 2 (22), and CCE 3 (23)) is divided into three sub-blocks in the case where the number of OFDM symbols carrying a control channel is 3. Here, the size of each CCE sub-block size, i.e., the number of mini-CCEs included in each sub-block, is determined according to a ratio of the number of physical resource element groups that can be used for transmission of a specific control channel(s) or all control channels among remaining resource elements, other than resource elements used for a specific signal or channel such as a reference signal, to the total number of resource elements that can be used for each OFDM symbol.

In this case, mini-CCEs included in the first sub-block of each CCE are transmitted through the first OFDM symbol 27, mini-CCEs included in the second sub-block of each CCE are transmitted through the second OFDM symbol 28, and mini-CCEs included in the third sub-block of each CCE are transmitted through the third OFDM symbol 29.

First, when $N_i^{RE}$ is the number of available physical resource elements in an ith OFDM symbol, the number $N_i^{REG}$ of available resource element groups in the ith OFDM symbol can be represented by the following Mathematical Expression 29.

[MATHEMATICAL EXPRESSION 29]

$$N_i^{REG} = \left\lfloor \frac{N_i^{RE}}{k} \right\rfloor, i = 0, \ldots, n-1$$

In Mathematical Expression 29, k is a variable indicating the number of resource elements used in one mini-CCE. This variable is used when a multiple antenna transmit diversity scheme is applied as described above.

In Mathematical Expression 29, the number $N_i^{REG}$ of available resource element groups can be determined excluding the number of resource element groups used for transmission of all or part of channels such as a PCFICH, a PHICH, and a PICH and a reference signal in the ith OFDM symbol.

The following Mathematical Expression 30 represents an example method for determining the number of mini-CCEs $M_i$ included in each sub-block when each CCE is divided into sub-blocks.

[MATHEMATICAL EXPRESSION 30]

$$M_i = \left\lfloor N_{mini-CCE}^{CCE} \cdot \frac{N_i^{REG}}{\sum_{i=0}^{n-1} N_i^{REG}} \right\rfloor, i = 0, \ldots, n-1$$

Mathematical Expression 30 represents a method for determining the number of mini-CCEs $M_i$ included in each sub-block by multiplying the total number of mini-CCEs $N_{min\ i\text{-}CCE}^{CCE}$ included in one CCE by the ratio of the number of available resource element groups $N_i^{REG}$ in the ith OFDM symbol to the number of available resource element groups $$\sum_{i=0}^{n-1} N_i^{REG}$$

in the OFDM symbols carrying the control channel.

If the number of mini-CCEs $M_i$ included in each sub-block is determined using the method of Mathematical Expression 30, it is possible to more efficiently perform the method for performing interleaving for each mini-CCE transmitted through the OFDM symbols according to this embodiment since the size of each sub-block is determined using the ratio of the number of available resource element groups for each OFDM symbol.

If the size of each sub-block is determined in this manner, an interleaving set is constructed from each CCE by combining sub-blocks of each OFDM symbol. Here, the interleaving set is a unit for interleaving. An interleaving set 24 associated with the first OFDM symbol, an interleaving set 25 associated with the second OFDM symbol, and an interleaving set 26 associated with the third OFDM symbol are illustrated in FIG. 35.

Then, at step S220, interleaving is performed on each interleaving set. That is, interleaving is performed for each OFDM symbol. Here, interleaving may be performed using a cell-specific pattern or a cell-common pattern in multi-cell environments. When interleaving is performed using a cell-common pattern, a random pattern can be used to reduce inter-cell interference or a specific permutation pattern or an arbitrary permutation pattern can be used to reduce inter-cell interference. It is also possible to use a method of performing shifting using a cell-specific value based on cell-specific information such as a cell ID.

A block interleaver can be used to perform interleaving at step S220. Interleaving can be performed for each row or column of the block interleaver. A random pattern or a specific permutation pattern can be used as the interleaving pattern as described above. Details of the configuration and operation of the block interleaver will be described below with reference to FIG. 35.

After interleaving is performed in this manner, mini-CCEs interleaved for each of the first, second, and third OFDM symbols 27, 28, and 29 are mapped to resource element groups in the corresponding OFDM symbol and are then transmitted through the mapped resource element groups at step S230.

The number of mini-CCEs allocated to each individual OFDM symbol of each control channel can be set to be different according to an index of each CCE or control channel so as to support as many control channels or as many as CCEs required to transmit control channels in a subframe as possible.

For example, the number of mini-CCEs can be set to be different according to whether the index of the control channel or CCE is even or odd. Alternatively, the number of mini-CCEs for indices set in a specific period among total indices can be set to be different from the number of mini-CCEs for remaining indices. In addition, some indices can be specified and the number of mini-CCEs in an OFDM symbol for the specified indices can be set to be different from that of remaining indices.

Reference will now be made to an example method for individually determining the respective numbers of mini-CCEs allocated to each OFDM symbol for CCEs of control channels.

The following Mathematical Expression 31 represents an example method for determining the number $N_{i,j}^{min\ i\text{-}CCE}$ of mini-CCEs, which are transmitted through each ith OFDM symbol, in a jth CCE among all CCEs of control channels in a subframe.

[MATHEMATICAL EXPRESSION 31]

$$N_{i,j}^{mini-CCE} = M_i + [(j + \lfloor i/2 \rfloor)\% \ 2] \cdot [\{(i+1) \cdot 2^{3-n}\}\% \ 2],$$

$$i = 0, \ldots, n-1,$$

$$j = 0, \ldots, \min_{i=0,\ldots,n-1}\left\{\left\lfloor\frac{N_i^{mini-CCE}}{M_i}\right\rfloor\right\} - 1$$

"$M_i$" calculated in Mathematical Expression 30 can be used as the number of mini-CCEs $M_i$ included in each sub-block in Mathematical Expression 31. As can be seen from a bottom portion of Mathematical Expression 31, an index j identifying each CCE ranges from 0 to the minimum of the respective numbers of CCEs that can be transmitted through the OFDM symbols.

The following Table 6 illustrates an example of $N_{i,j}^{min\ i-CCE}$ determined through the above Mathematical Expression 31 in the case of n=3.

TABLE 6

| j | i 0 | 1 | 2 |
|---|---|---|---|
| 0 | 1 | 3 | 5 |
| 1 | 2 | 3 | 4 |
| 2 | 1 | 3 | 5 |
| . | . | . | . |
| . | . | . | . |

If the same ratio of the numbers of mini-CCEs of sub-blocks is used as a value of $M_i$ for every CCE, the ratio of the respective numbers of mini-CCEs of OFDM symbols will be determined to be 1:3:5 for each CCE. However, if different ratios are applied to CCEs according to Mathematical Expression 31, a ratio of 2:3:4 can be applied to the second CCE (j=1) so that it is possible to increase the number of mini-CCEs transmitted through the first OFDM symbol and to reduce the number of mini-CCEs transmitted through the third OFDM symbol as can be seen from Table 6.

According to this method, a fixed ratio is not applied as the value of $M_i$, and, instead, the respective numbers of mini-CCEs transmitted for the OFDM symbols can be controlled flexibly within a predetermined range of the ratio, thereby supporting a larger number of control channels or a larger number of CCEs required to transmit control channels than when a fixed ratio is applied.

The following Mathematical Expression 32 represents another example method for determining the number $N_{i,j}^{min\ i-CCE}$ of mini-CCEs, which are transmitted through each ith OFDM symbol, in a jth CCE among all CCEs of control channels in a subframe.

[MATHEMATICAL EXPRESSION 32]

$$N_{i,j}^{mini-CCE} = M_i + \{\lfloor(j\%3)/2\rfloor \cdot (-i)^i + i\} \cdot \left\{1 - \left\lfloor\frac{i}{2}\right\rfloor\right\},$$

$$i = 0, \ldots, n-1,$$

$$j = 0, \ldots, \min_{i=0,\ldots,n-1}\left\{\left\lfloor\frac{N_i^{mini-CCE}}{M_i}\right\rfloor\right\} - 1$$

Details of Mathematical Expression 32 are similar to those of Mathematical Expression 31. The following Table 7 illustrates an example of $N_{i,j}^{min\ i-CCE}$ determined through the above Mathematical Expression 32 in the case of n=3.

TABLE 7

| j | i 0 | 1 | 2 |
|---|---|---|---|
| 0 | 2 | 3 | 4 |
| 1 | 2 | 3 | 4 |
| 2 | 3 | 2 | 4 |
| . | . | . | . |
| . | . | . | . |
| . | . | . | . |

In the example of Table 7, a ratio of 3:2:4 can also be applied to the third CCE (j=2) so that it is possible to increase the number of mini-CCEs transmitted through the first OFDM symbol and to reduce the number of mini-CCEs transmitted through the second OFDM symbol as can be seen from Table 6.

The following Mathematical Expression 33 represents another example method for determining the number $N_{i,j}^{min\ i-CCE}$ of mini-CCEs, which are transmitted through each ith OFDM symbol, in a jth CCE among all CCEs of control channels in a subframe.

[MATHEMATICAL EXPRESSION 33]

$$N_{i,j}^{mini-CCE} = M_i + i,$$

$$i = 0, \ldots, n-1,$$

$$j = 0, \ldots, \min_{i=0,\ldots,n-1}\left\{\left\lfloor\frac{N_i^{mini-CCE}}{M_i}\right\rfloor\right\} - 1$$

Details of Mathematical Expression 33 are similar to those of Mathematical Expression 31. The following Table 8 illustrates an example of $N_{i,j}^{min\ i-CCE}$ determined through the above Mathematical Expression 32 in the case of

TABLE 8

| j | i 0 | 1 |
|---|---|---|
| 0 | 4 | 5 |
| 1 | 4 | 5 |
| 2 | 4 | 5 |
| . | . | . |
| . | . | . |
| . | . | . |

The above method, in which the number of mini-CCEs allocated to each individual OFDM symbol of each control channel is set to be different according to an index of each CCE or control channel, can be applied when the number of mini-CCEs allocated to each individual OFDM symbol of each control channel, calculated according to a ratio of available resource element groups of all control channels or a specific control channel(s) for each OFDM symbol, is not a positive integer.

The number of available resource element groups of a control channel of interest can be calculated excluding resource element groups carrying a different type of control channel from the control channel of interest as described above. In this case, if the number of OFDM symbols carrying a different type of control channel or the number of resource element groups for each OFDM symbol is changed, then the number of available resource element groups for the control channel of interest can also be changed. Accordingly, the method can also be applied to this case.

That is, when a control channel is transmitted through three OFDM symbols, the example of Table 6 can be considered an example that can be applied when a different type of control channel is transmitted through a first OFDM symbol and the example of Table 7 can be considered an example that can be applied when a different type of control channel is transmitted through all the three OFDM symbols allocated for control channel transmission. In addition, when a control channel is transmitted through two OFDM symbols, the example of Table 8 can be considered an example that can be applied when a different type of control channel is transmitted through first and second OFDM symbols.

Embodiment 8

Figure 36:
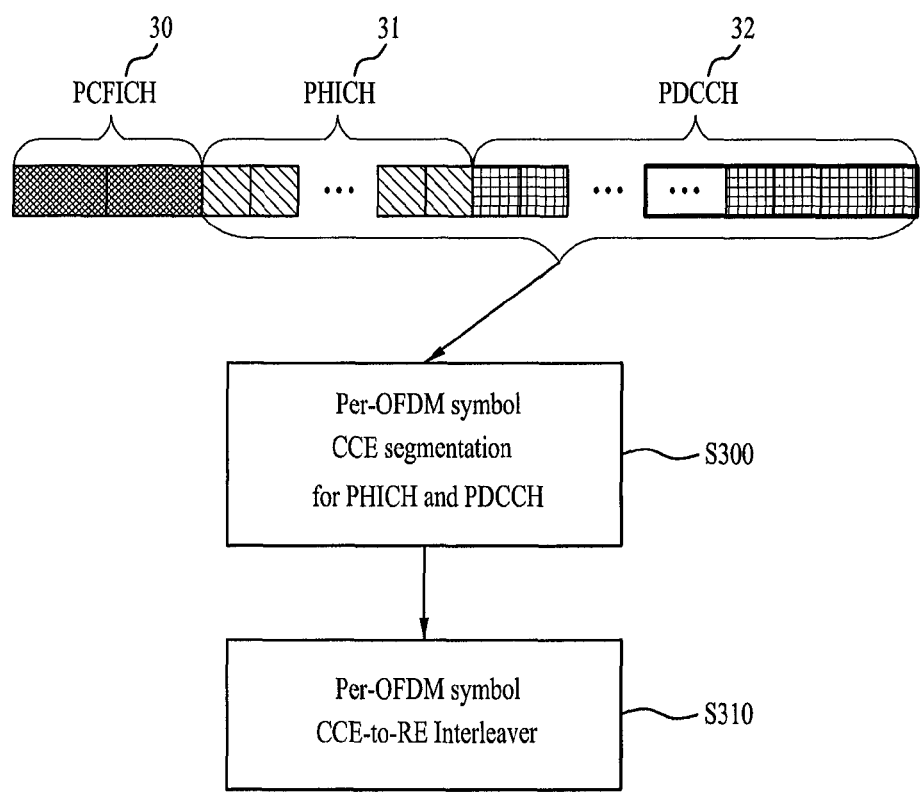
FIG. 36 illustrates an example method for transmitting different types of control channels according to an embodiment of the invention.

FIG. 36 illustrates an example method for transmitting different types of control channels according to an embodiment of the invention.

This embodiment provides a method in which, when different types of control channels are transmitted, interleaving is performed on mini-CCEs included in CCEs of one or more types of control channels instead of individually performing interleaving for each of the types of control channels.

As described above, downlink control channels include not only a PDCCH transmitting control information of downlink transmission data but also various types of control channels such as a PCFICH, a PHICH, and a PICH and a reference signal.

FIG. 36 illustrates an example in which a PCFICH 30, a PHICH 31, and a PDCCH 32 are transmitted as downlink control channels. Here, even though the PCFICH 30 should generally be separately taken into consideration since the position of the PCFICH 30 transmitted in the OFDM symbol is predetermined, it is possible to take into consideration the PHICH 31 and the PDCCH 32 together so that both the PHICH 31 and the PDCCH 32 can be mapped to resource element groups of OFDM symbols and then be transmitted through the mapped resource element groups.

Here, interleaving can be performed taking into consideration the PHICH 31 and the PDCCH 32 together so that both the PHICH 31 and the PDCCH 32 can be mapped to resource element groups of OFDM symbols and then be transmitted through the mapped resource element groups. It will also be possible to apply the method in which interleaving is performed on each mini-CCE transmitted for each OFDM symbol as described above with reference to FIG. 35.

For example, an interleaving set for performing interleaving taking into consideration all CCEs of the PHICH 31 and the PDCCH 32 can be determined at step 300 and interleaving can be performed to transmit them through one or more OFDM symbols at step S310. To determine the interleaving set at step S300, it is possible to apply a method identical or similar to the method described above with reference to FIG. 35.

For use of OFDM symbols, the PHICH can be defined separately from the PDCCH. For example, even when a total of three OFDM symbols is used for PDCCH transmission, the PHICH can use only one OFDM symbol.

That is, the PHICH can be transmitted selectively using at least one of the OFDM symbols carrying control channels. The OFDM symbol transmitting the PHICH can be defined as a PHICH duration, which can be divided into a normal mode and an extended mode. For example, in the case of the normal mode, the use of the OFDM symbols for transmitting the PHICH can be defined such that the PHICH is transmitted using the first of the OFDM symbols carrying control channels in the case of the normal mode and the PHICH is transmitted using all the OFDM symbols carrying control channels in the case of the extended mode.

The following description will be given with reference to a definition of the use of OFDM symbols for PHICH transmission such that the PHICH is transmitted using the first OFDM symbol in the case of a permutation duration of "1", the PHICH is transmitted using the first and second OFDM symbols in the case of a permutation duration of "2", and the PHICH is transmitted using the first, second, and third OFDM symbols in the case of a permutation duration of "3".

Figure 37:
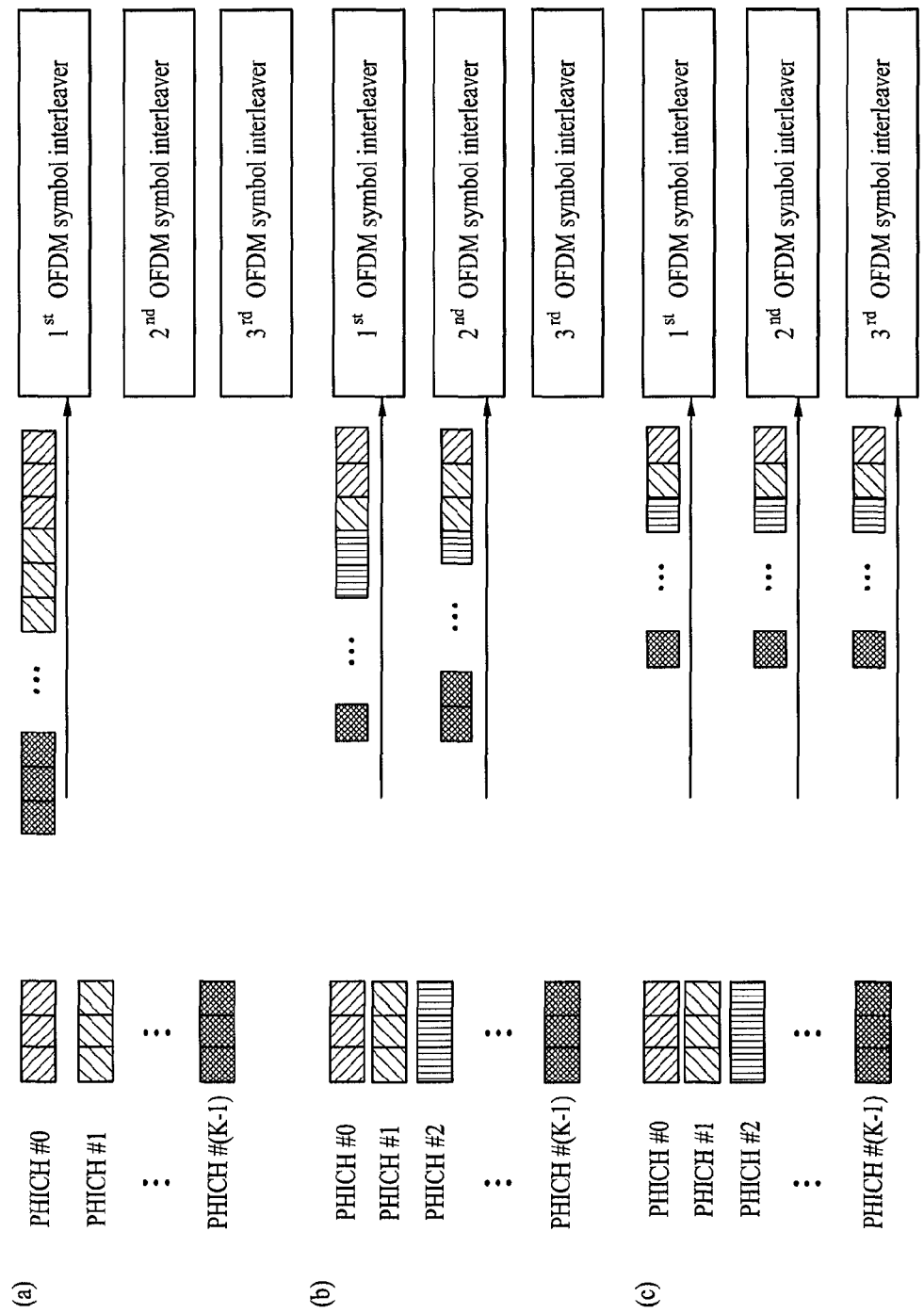
FIGS. 37(a) to 37(c) illustrate an example method for allocating mini-CCEs of a PHICH transmitted through each OFDM symbol when interleaving is performed on the PHICH for each OFDM symbol according to an embodiment of the invention.

FIGS. 37(a) to 37(c) illustrate an example method for allocating mini-CCEs of the PHICH transmitted through each OFDM symbol when interleaving is performed on the PHICH for each OFDM symbol according to an embodiment of the invention.

In the example of FIGS. 37(a) to 37(c), a total of K PHICHs are transmitted through one subframe and PHICHs are shown as three blocks under the assumption that each PHICH extended according to a spreading factor of SF=4 is repeated three times. That is, since one PHICH is extended according to SF=4, it can be assumed that one block corresponds to one mini-CCE when one PHICH is mapped in units of mini-CCEs including four symbols.

FIG. 37(a) illustrates an example method for allocating mini-CCEs of PHICHs transmitted through each OFDM symbol when the PHICH duration is "1." In the case where the PHICH duration is "1," the PHICH is transmitted only through the first OFDM symbol and therefore K PHICHs are all interleaved together during the interleaving of the first OFDM symbol without performing separate allocation.

FIG. 37(b) illustrates an example method for allocating mini-CCEs of PHICHs transmitted through each OFDM symbol when the PHICH duration is "2." In the case where the PHICH duration is "2," the PHICH is transmitted through the first and second OFDM symbols and therefore it is difficult to transmit one PHICH using two OFDM symbols uniformly in the case where one PHICH consists of three mini-CCEs as in this embodiment. Accordingly, in the case of this embodiment, a different rate of use of each OFDM symbol can be applied to each PHICH so that it is possible to transmit each PHICH using two OFDM symbols uniformly when a total of K PHICHs are taken into consideration.

Specifically, two mini-CCEs of PHICH #0 can be transmitted through the first OFDM symbol and the remaining one mini-CCE can be transmitted through the second OFDM symbol. In the case of PHICH #1, one mini-CCE can be transmitted through the first OFDM symbol and the remaining two mini-CCEs can be transmitted through the second OFDM symbol, unlike the case of PHICH #0. Repeating this pattern will allow each PHICH to be transmitted using two OFDM symbols uniformly when a total of K PHICHs are taken into consideration.

FIG. 37(c) illustrates an example method for allocating mini-CCEs of PHICHs transmitted through each OFDM symbol when the PHICH duration is "3." In this case, since each PHICH consists of mini-CCEs, mini-CCEs of each PCFICH can be transmitted through each OFDM symbol.

Although the methods of FIGS. 37(a) to 37(c) have been described simply with reference to examples where each PHICH consists of three mini-CCEs, the methods can be applied to any other examples. The following Mathematical Expression 34 represents an example method for determining the number $N_{i,k\_PHICH}^{min\ i-CCH}$ of mini-CCEs transmitted through an ith OFDM symbol in a kth PHICH.

[MATHEMATICAL EXPRESSION 34]

$$N_{i,k\_PHICH}^{mini-CCE} = \left\lfloor \frac{N_{PHICH}^{mini-CCE}}{N_{PHICH}} \right\rfloor + \{(N_{PHICH} + 1) \cdot (i + k + 1)\}\% \ 2$$

In Mathematical Expression 34, $N_{PHICH}$ represents a PHICH duration and $N_{PHICH}^{min\ i-CCE}$ represents the total number of mini-CCEs in each PHICH.

When one of different types of control channels requires stable frequency diversity, it is possible to satisfy this requirement by performing distribution and multiplexing at an input terminal of an interleaver before interleaving.

Figure 38:
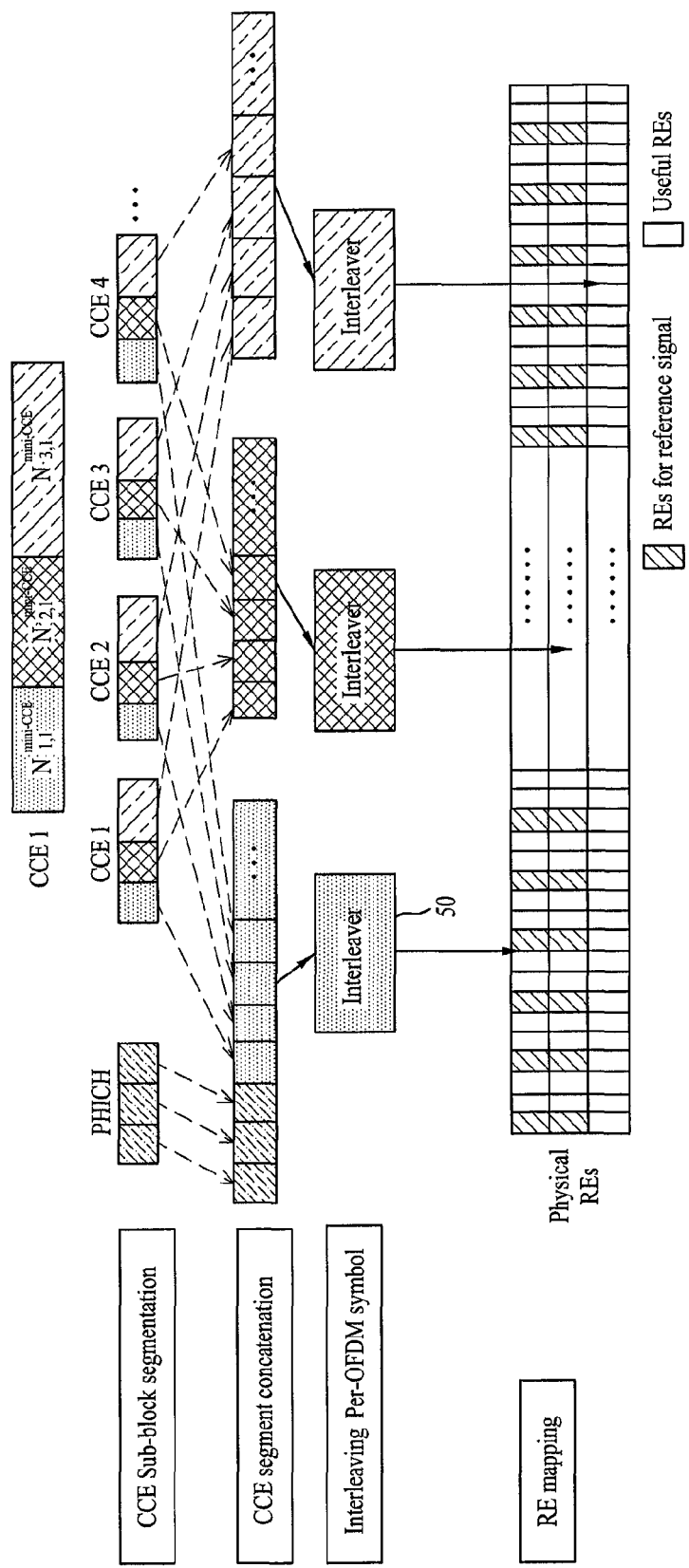
FIG. 38 illustrates an example method for transmitting two or more different types of control channels by performing interleaving on the different types of control channels together for each OFDM symbol according to an embodiment of the invention.

FIG. 38 illustrates an example method for transmitting two or more different types of control channels by performing interleaving on the different types of control channels together for each OFDM symbol according to an embodiment of the invention.

Although the method of FIG. 38 is similar to that of FIG. 35, the method of FIG. 38 differs from that of FIG. 35 in that two different types of control channels, a PDCCH and a PHICH for ACK/NACK transmission, are taken into consideration together. Specifically, FIG. 38 illustrates an example where the PHICH is transmitted through only the first OFDM symbol while the PDCCH is transmitted through three OFDM symbols. As shown in FIG. 38, mini-CCEs in CCEs of the PHICH and the PDCCH that has been determined to be transmitted through the first OFDM symbol are input together to an interleaver 50 of the first OFDM symbol so that the mini-CCEs in the PHICH and the PDCCH are interleaved together at the interleaver 50.

Figure 39:
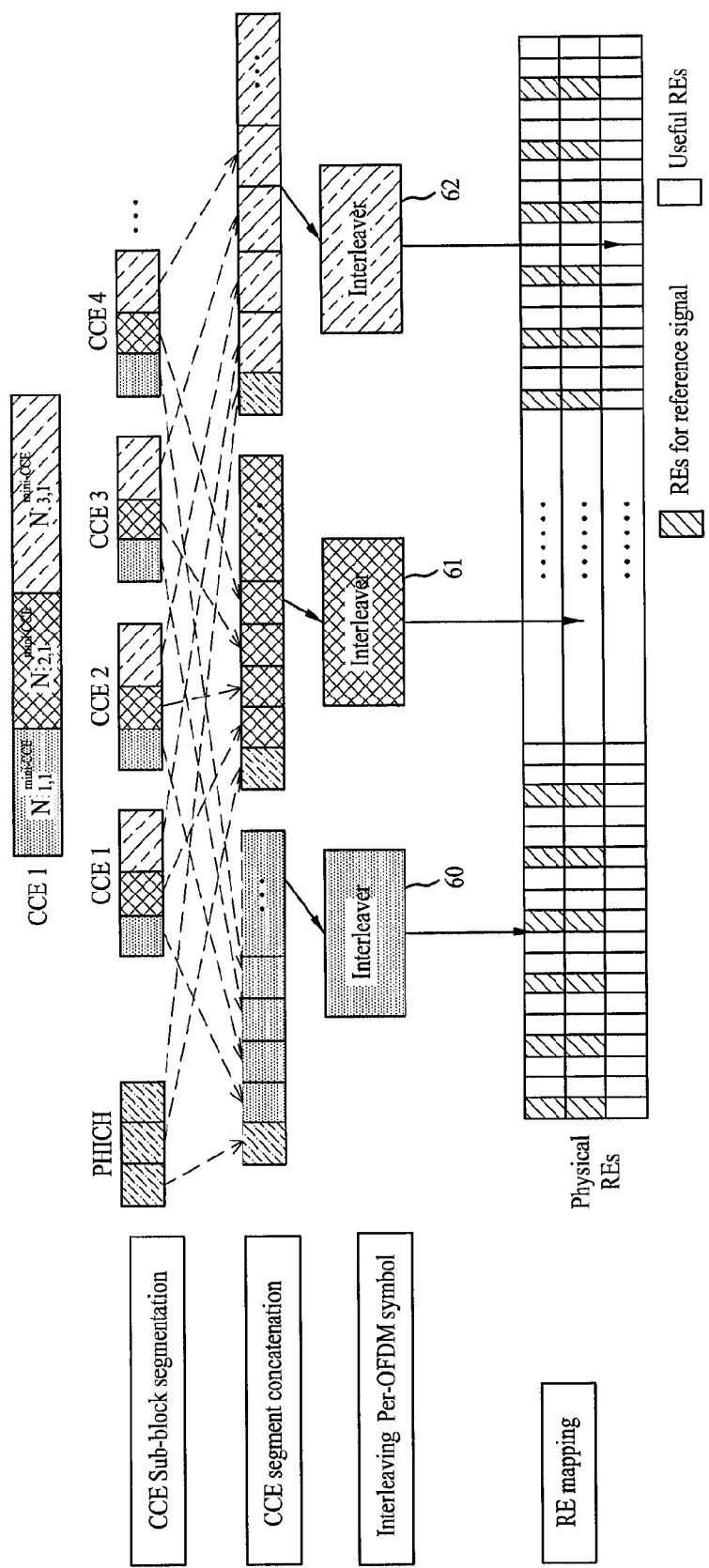
FIG. 39 illustrates another example method for transmitting two or more different types of control channels by performing interleaving on the different types of control channels together for each OFDM symbol according to an embodiment of the invention.

FIG. 39 illustrates another example method for transmitting two or more different types of control channels by performing interleaving on the different types of control channels together for each OFDM symbol according to an embodiment of the invention.

Although the method of FIG. 39 is similar to that of the embodiment of FIG. 35, the method of FIG. 38 differs from that of FIG. 35 in that two different types of control channels, a PDCCH and a PHICH, are taken into consideration together. Specifically, FIG. 39 illustrates an example where the PHICH is transmitted through three OFDM symbols while the PDCCH is also transmitted through the three OFDM symbols.

As shown in FIG. 39, mini-CCEs in CCEs of the PDCCH and mini-CCEs in the PHICH that has been determined to be transmitted through the first OFDM symbol are input together to an interleaver 60 of the first OFDM symbol so that the mini-CCEs in the PHICH and the PDCCH are interleaved together at the interleaver 60. In addition, mini-CCEs in CCEs of the PDCCH and mini-CCEs in the PHICH determined to be transmitted through the second OFDM symbol are input together to an interleaver 61 of the second OFDM symbol so that the mini-CCEs in the PHICH and the PDCCH are interleaved together at the interleaver 61. In addition, mini-CCEs in CCEs of the PDCCH and mini-CCEs in the PHICH determined to be transmitted through the third OFDM symbol are input together to an interleaver 62 of the third OFDM symbol so that the mini-CCEs in the PHICH and the PDCCH are interleaved together at the interleaver 62.

In the case where two or more different types of control channels are interleaved together as shown in FIGS. 38 and 39, resource element groups transmitting different types of control channels that are interleaved together are taken into consideration as opposed to being excluded when the number of available resource element groups is determined in each OFDM symbol. In addition, as shown in FIGS. 38 and 39, the resource element groups may be multiplexed in a sequential manner and may also be distributed and multiplexed for the sake of optimizing frequency domain diversity.

Reference will now be made to a method in which a block interleaver is used to perform interleaving on each OFDM symbol according to the invention. Particularly, it is possible to use a block interleaver that operates with different input and output directions. The order of elements before they are input to the block interleaver and the order of elements that are output from the block interleaver can be changed (or can be made different) through the simple method of using different input and output directions, thereby allowing channel elements to be distributed and transmitted uniformly over resources.

A block interleaver, which performs row-wise writing (or row-directional input) and column-wise reading (or column-directional output), permutes row positions of elements in each column and outputs the elements. On the other hand, a block interleaver, which performs column-wise writing (or column-directional input) and column-wise reading (or row-directional output), permutes column positions of elements in each row and outputs the elements.

Here, permutation can be performed through reordering according to a specific random pattern and can also be performed according to a specific pattern. In the case where a rule is used to generate a pattern, a rule may be generated and applied based on a corresponding column or row index and a rule may also be generated and applied regardless of a column or row index. To reduce inter-cell interference, it is possible to generate a cyclically shifted version of the permuted pattern using cell-specific information such as a cell ID.

According to this embodiment, it is possible to implement respective interleavers of OFDM symbols used for control channel transmission to perform interleaving for each OFDM symbol. When the configuration of the interleaver of each of the OFDM symbols is defined by the number of rows and the number of columns, the number of rows and the number of columns of each symbol interleaver can be set to be equal and can also be set to be different for given purposes.

Reference will now be made to the configuration and operation of a block interleaver which performs row-wise writing (or row-directional input) and column-wise reading (or column-directional output). Similar detailed operations can be applied to a block interleaver which performs column-wise writing (or column-directional input) and column-wise reading (or row-directional output), with the only difference being row or column directions.

The number of columns of the block interleaver of each OFDM symbol can be defined in association with the number of mini-CCEs, allocated to the OFDM symbol, of all control channels or CCEs. Of course, the number of columns can also be defined using a given rule for a given purpose.

In one method for defining the number of rows, first, a basic row size can be set based on the total number of mini-CCEs input to the block interleaver and a different row size from the basic row size can be set based on a preset rule of reordering or permutation of each column.

In the case where interleaving is performed on different types of control channels, the method for performing intra-column permutation and the method for setting the number of rows and the number of columns taking into consideration characteristics and requirements of a specific channel can be used for each type of control channel by setting a specific value and pattern based on the purposes described above.

The following Mathematical Expression 35 represents an example method for determining the number $C_i$ of columns of an interleaver of each OFDM symbol when interleaving is applied only to a PDCCH and the following Mathematical Expression 36 represents an example method for determining the number $C_i$ of columns of an interleaver of each OFDM symbol when a PDCCH and a PHICH are interleaved together.

[MATHEMATICAL EXPRESSION 35]

$$C_i = \max_{all\ j} \{N_{i,j}^{mini-CCE}\}$$

[MATHEMATICAL EXPRESSION 36]

$$C_i = \max_{all\ j,k} \{N_{i,j}^{mini-CCE}, N_{i,k\_PHICH}^{mini-CCE}\}$$

$N_{i,j}^{min\ i-CCE}$ in Mathematical Expressions 35 and 36 represents the number of mini-CCEs of a jth CCE transmitted through an ith OFDM symbol and $N_{i,k\_PHICH}^{min\ i-CCE}$ in Mathematical Expression 36 represents the number of mini-CCEs of a kth PHICH transmitted through the ith OFDM symbol.

The following Mathematical Expression 37 represents an example method for determining the number $R_i$ of rows of an interleaver of each OFDM symbol when interleaving is applied only to a PDCCH and the following Mathematical Expression 38 represents an example method for determining the number $R_i$ of rows of an interleaver of each OFDM symbol when a PDCCH and a PHICH are interleaved together.

[MATHEMATICAL EXPRESSION 37]

$$R_i = \left\lceil \frac{N_i^{mini-CCE}}{C_i} \right\rceil$$

[MATHEMATICAL EXPRESSION 38]

$$R_i = \left\lceil \frac{N_i^{mini-CCE} + N_{PHICH\_i}^{mini-CCE}}{C_i} \right\rceil$$

$N_i^{min\ i-CCE}$ in Mathematical Expressions 37 and 38 represents the number of mini-CCEs of a PDCCH transmitted through an ith OFDM symbol and $N_{PHICH\_i}^{min\ i-CCE}$ Mathematical Expression 38 represents the number of mini-CCEs of a PHICH transmitted through the ith OFDM symbol. Here, $N_{PHICH\_i}^{min\ i-CCE}$ can be determined as in the following Mathematical Expression 39.

[MATHEMATICAL EXPRESSION 39]

$$N_{PHICH\_i}^{mini-CC} = \left\lceil \frac{N_{UL\_VRB}}{SF} \right\rceil \cdot RPF$$

SF in Mathematical Expression 39 represents a spreading factor, RPF represents the number of repetitions of the PHICH, and $N_{UL\_VRB}$ represents the number of uplink resource blocks (UL VRBs) allocated to a system bandwidth. The value of $N_{UL\_VRB}$ can vary according to the system bandwidth.

The positions of resources through which a downlink PHICH is transmitted can be determined according to downlink resource blocks through which each terminal transmits data. For example, in the case where the system bandwidth is 5 MHz, the number of uplink resource blocks is 25 and the maximum value "25" can be set as $N_{UL\_VRB}$ since the downlink PHICH needs to indicate any resource block through which data has been transmitted. That is, since $N_{UL\_VRB}$ can vary according to the system bandwidth, the number of mini-CCEs of a PHICH transmitted through the ith OFDM symbol can be determined using $N_{UL\_VRB}$ as a variable as in Mathematical Expression 39.

When interleaving is performed on different types of control channels using a symbol interleaver of the block interleaver, interleaving can be implemented using a method in which specific control channels are fixed to specific positions (or specific row/column indices) in the interleaver or a method in which, when a symbol sequence is input to the interleaver, the order of symbols of the input symbol sequence is changed according to an arbitrary method in order to accomplish the purposes described above.

Figure 40:
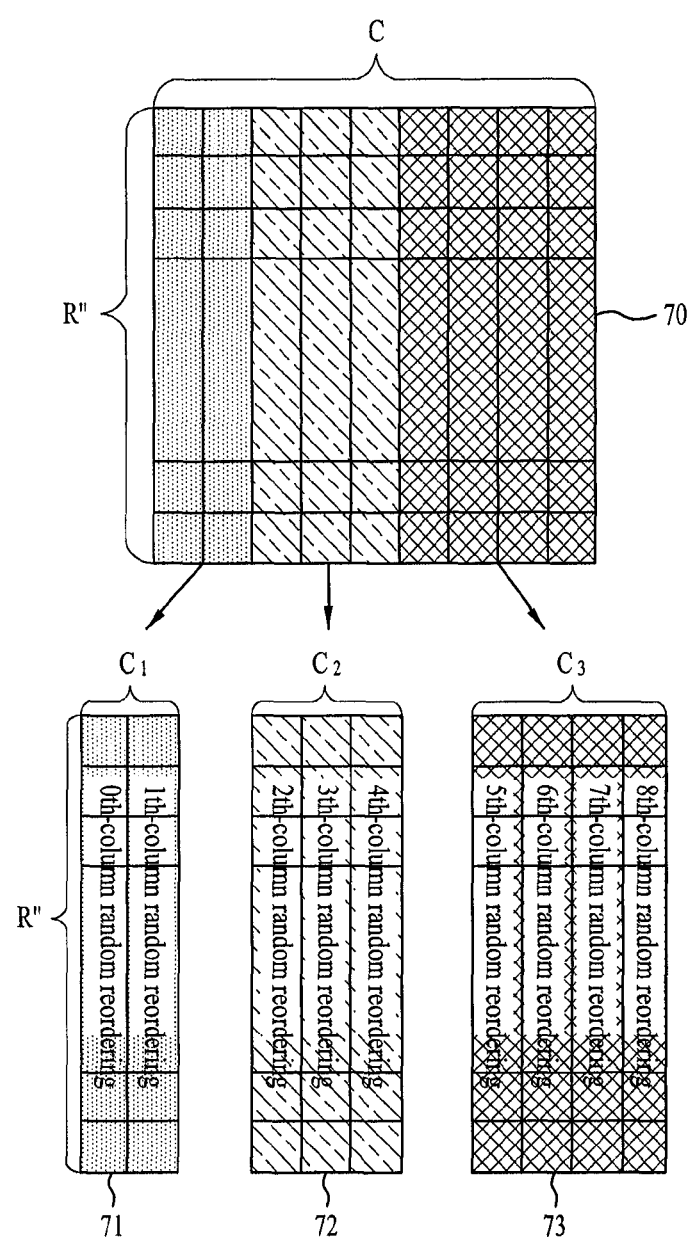
FIG. 40 illustrates an example method for performing interleaving for each OFDM symbol using a block interleaver according to an embodiment of the invention.

FIG. 40 illustrates an example method for performing interleaving for each OFDM symbol using a block interleaver according to an embodiment of the invention.

In the case where respective mini-CCEs that are to be mapped to OFDM symbols are distinguished before interleaving, a column reordering or permutation pattern for an individual block interleaver to be applied to each OFDM symbol can be defined by dividing a block interleaver 70 that is virtually provided for all OFDM symbols into groups of columns to apply an individual block interleaver to each OFDM symbol. Here, the column reordering or permutation pattern can be defined as a random pattern as described above and can also be defined as a pattern according to a specific rule.

The following Mathematical Expression 40 represents an example method for defining the number C of columns when respective block interleavers of OFDM symbols are regarded as one block interleaver 70.

[MATHEMATICAL EXPRESSION 40]

$$C = \sum_{i=1}^{n} C_i$$

As can be seen from Mathematical Expression 40, the number of columns C can be represented by the sum of the respective numbers of columns of OFDM symbols calculated through Mathematical Expression 35 or 36.

As shown in FIG. 40, in the case where control channels are transmitted through three OFDM symbols, the numbers of columns of respective block interleavers 71, 72, and 73 of the OFDM symbols can be defined C1, C2, and C3. The respective numbers of columns of the block interleavers of the OFDM symbols can be set according to a ratio of the numbers of physical mini-CCEs that can be used to transmit control channels for the OFDM symbols. Of course, the respective numbers of columns of the block interleavers can be set to other values for other purposes. For example, "C" of the virtual block interleaver in FIG. 40 can be determined to be the number of mini-CCEs of an arbitrary CCE and the values of "C1", "C2", and "C3" can be set according to the ratio of available mini-CCEs in the OFDM symbols and the requirement that C=C1+C2+C3.

In addition, the numbers of rows of the block interleavers applied respectively to the OFDM symbols can be defined to be different when an arbitrary one of different types of control channels is mapped only to a specific OFDM symbol and can be alternatively defined to be equal by applying pruning. mini-CCEs not used in individual OFDM symbols can be incorporated into corresponding block interleavers so that they are interleaved by the block interleavers, and the values of R1, R2, and R3 can be determined taking into consideration the interleaving of such mini-CCEs.

Figure 41:
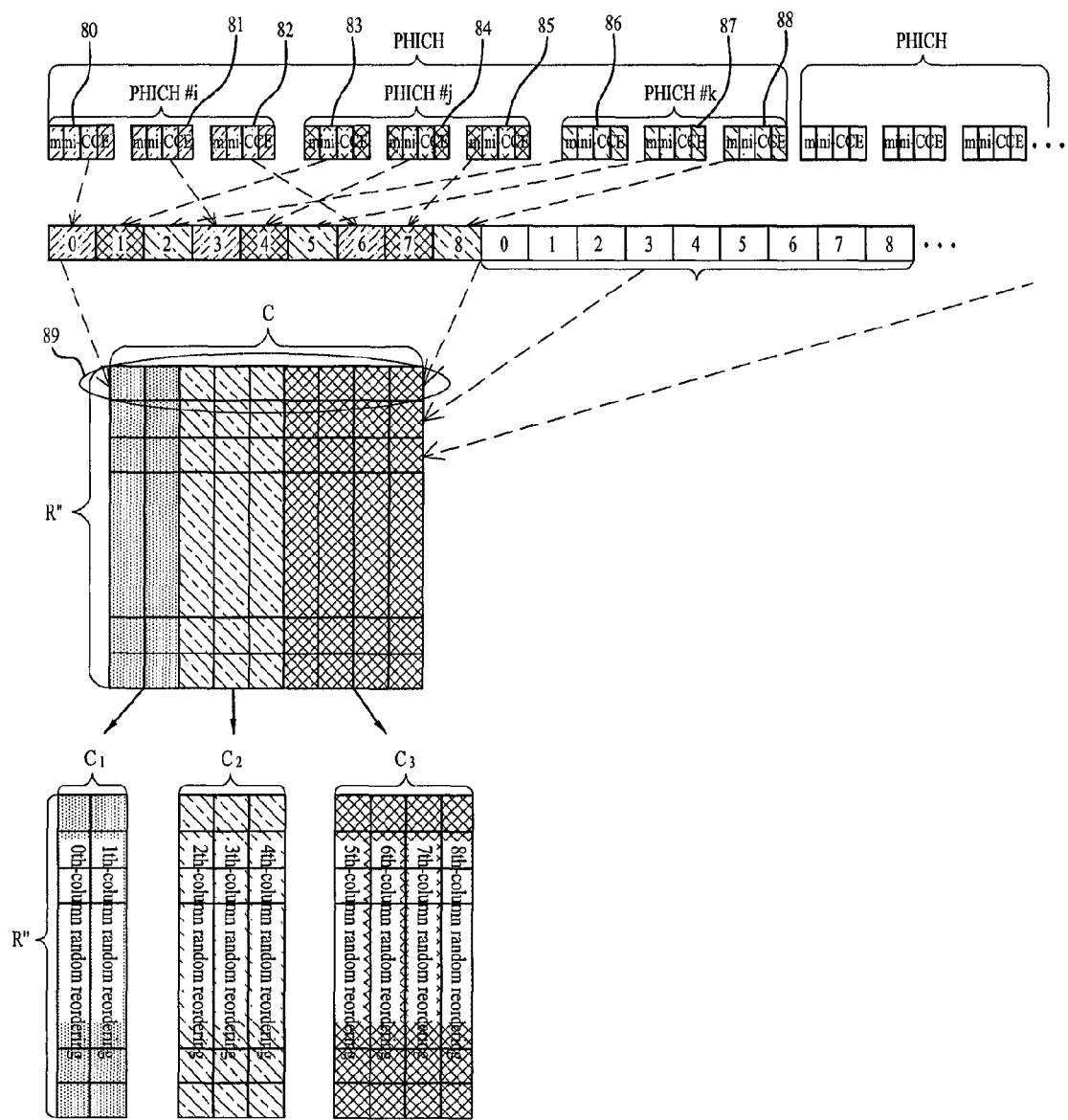
FIG. 41 illustrates an example method in which two or more control channels are interleaved together and are then multiplexed and transmitted according to an embodiment of the invention.

FIG. 41 illustrates an example method in which two or more control channels are interleaved together and are then multiplexed and transmitted according to an embodiment of the invention.

Specifically, FIG. 41 illustrates an example where two control channels, a PDCCH and a PHICH, are interleaved together. As shown in FIG. 41, divided interleavers can be constructed according to the same method as described above with reference to FIG. 40. When an input sequence of a PHICH to a block interleaver is constructed, mini-CCEs of a PHICH can be defined according to the characteristics of the block interleaver in order to optimize frequency diversity.

As shown in FIG. 41, each of a plurality of PHICHs including PHICH #i, PHICH #j, and PHICH #k is transmitted by repeating a mini-CCE, which corresponds to a symbol extended with a spreading factor of SF=4, 3 times in the frequency axis. First symbol mini-CCEs 80, 83, and 86, second mini-CCEs 81, 84, and 87, and third mini-CCEs 82, 85, and 88 of the PHICHs are sequentially input (or written) to a first row 89 of a block interleaver. Thus, the three mini-CCEs of each PHICH can be interleaved in different block interleavers. Accordingly, the method can obtain effects of uniform distribution and multiplexing over a specific or entire range of column indices.

The following Mathematical Expression 41 represents an example method for column-wise permutation or reordering of a block interleaver of an ith OFDM symbol in an interleaving operation of a block interleaver constructed using the above method.

$$(r',c')=\{(r^*(1+c)+c+P)\% R'',c\}, \quad \text{[MATHEMATICAL EXPRESSION 41]}$$

where r=0, 1, . . . , R''−1
c=0, 1, . . . , Ci−1
i=1, . . . , n(≤3)
P=R''−R'

Specifically, Mathematical Expression 41 represents an example where three block interleavers, which are constructed with respective sizes of R''×C1, R''×C2, and R''×C3, are applied to three OFDM symbols, respectively, as shown in FIG. 40. Here, the same number of rows R'' is applied to each block interleaver. In Mathematical Expression 41, C1, C2, and C3 may be equal to or different from each other when a block interleaver is individually applied to each OFDM symbol. Some of the variables may have a different value and the value of each variable may match the number of columns of the interleaver of each individual OFDM symbol and may also be defined based on a specific pattern or a random value.

A value used in association with each column of an OFDM symbol interleaver in Mathematical Expression 41 represents a column index that is increased by 1 every column. However, a value not associated with the column index can also be applied to each column.

In the case where a block interleaver operates using a specific function to perform interleaving, it may be preferable that the number R of rows of the block interleaver be set to a prime number. When the determined value (R') of R is a prime number, it can be immediately determined to be the number of rows R (R'') of the block interleaver.

When the determined value (R') of R is not a prime number, the smallest prime number greater than the value R determined above can be determined to be the number of rows R (R'') of the block interleaver. That is, "P" in Mathematical Expression 41 represents the difference between the finally determined value (R'') of R in the case where the number of rows of the block interleaver is determined to be a prime number and the value (R') of R determined without taking into consideration primeness.

On the other hand, different offsets can be allocated to column indices of respective block interleavers of OFDM symbols so that mini-CCEs of CCEs are input in a distributed manner to the block interleavers of the OFDM symbols and mini-CCEs are also distributed over all OFDM symbols when interleaving is performed for each OFDM symbol in order to reliably provide frequency domain diversity to CCEs.

The following Mathematical Expression 42 represents an example method for allocating different offsets to column indices of respective block interleavers of OFDM symbols.

$$(r',c')=\{(r^*(1+c\_i)+c\_i+P)\% R'',c\}, \quad \text{[MATHEMATICAL EXPRESSION 42]}$$

where r=0, 1, . . . , R''−1
c=0, 1, . . . , Ci−1
c_1=c, c_2=c+C1, c_3=c+C1+C2
i=1, . . . , n(≤3)
P=R''−R'

In the example of Mathematical Expression 42, three block interleavers are constructed respectively for three OFDM symbols. In this example, when a column index of a block interleaver of each OFDM symbol is defined as "c," an index value of each column of the block interleaver of the first OFDM symbol is equal to a value of the index "c" corresponding to the column. An index value of each column of the block interleaver of the second OFDM symbol is defined as the sum of a value of the index "c" corresponding to the column and the number "C1" of columns of the block interleaver of the first OFDM symbol so that the column index values of the block interleaver of the second OFDM symbol are set to continue from those of the block interleaver of the second OFDM symbol. The index values of columns of the block interleaver of the third OFDM symbol are set in the same manner.

In this manner, different offsets are allocated to column indices of the respective block interleavers of OFDM symbols so that mini-CCEs are distributed over all OFDM symbols, thereby reliably providing frequency domain diversity to CCEs.

In the above method for mapping virtual resources to physical resources and using block interleaving, an interleaver can be commonly used for multiple cells while mapping can be performed taking into consideration cell-specific information, for example a cell identifier (ID), in order to minimize inter-cell interference in multi-cell environments.

As described above, interleaver elements can be output from the interleaver after the elements are cyclically shifted using cell-specific information such as a cell ID for each cell after a block interleaving process is completed. In addition, when outputs of the interleaver are mapped to physical resources, the interleaver elements cyclically shifted using cell-specific information such as a cell ID for each cell can also be mapped to physical resources.

For example, for a cell having a shift factor of "0", an output sequence of an interleaver can be directly mapped to physical resource elements without shifting a random pattern generated using the interleaver and, for a cell having a shift factor of "10", the output sequence of the interleaver can be mapped to physical resource elements after cyclically shifting elements in a random pattern in the interleaver output sequence by 10. That is, a cyclic shift method is applied such that elements interleaved on a column basis are mapped to physical resources after a cyclic shift is applied to an interleaving pattern of all elements of the interleaver using information such as a cell ID for each cell, unlike the previously described method.

The invention may also provide a method in which, before all mini-CCEs of CCEs used for control channel transmission are input to the interleaver, the mini-CCEs are divided according to OFDM symbols used for control channel transmission and interleaving common to a corresponding cell is performed on mini-CCEs that are to be mapped to resource element groups of each OFDM symbol. Here, a mini-CCE sequence input to the block interleaver may be constructed in a format in which various control channels are multiplexed.

Mathematical Expression 43 represents an example method of representing an algorithm that can implement virtual interleaving for an interleaving operation using the block interleaver described above.

[MATHEMATICAL EXPRESSION 43]

$$k = (j) \% \ C_i$$

$$s_j^i = \left[\left\{\left\lfloor \frac{j}{C_i} \right\rfloor \cdot \left\{1 + \left(k + \sum_{m=0}^{i} C_m - C_i\right)\right\} + \left(k + \sum_{m=0}^{i} C_m - C_i\right) + P_i\right\} \% \ R_i^l\right] +$$

$$k \cdot R_i^l$$

where, $j = 0, 1, \ldots , (R_i^l \cdot C_i - 1)$

In Mathematical Expression 43, $S_j^i$ represents an output position index of a mini-CCE corresponding to an input position index j at an ith OFDM symbol interleaver. This value may represent a position index in a block interleaver allocated for virtual interleaving. In addition, values calculated using the same method as those used when an individual block interleaver of each ith OFDM symbol is implemented can be used as $R_i^j$, $C_i$, and $P_i$.

The above embodiments of the present disclosure have been described focusing on the data communication relationship between a terminal (UE) and a base station. The base station is a terminal node in a network which performs communication directly with the terminal. Specific operations which have been described as being performed by the base station may also be performed by upper nodes as needed. That is, it will be apparent to those skilled in the art that the base station or any other network node may perform various operations for communication with terminals in a network including a number of network nodes. The term "base station" may be replaced with another term such as "fixed station", "Node B", "eNode B (eNB)", or "access point". The term "terminal" may also be replaced with another term such as "user equipment (UE)", "mobile station (MS)", or "mobile subscriber station (MSS)".

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

The present invention relates to a method for transmitting control channels to one or more mobile terminals in a mobile communication system and provides a method for distributing, when a control channel is transmitted, modulated control channel symbols uniformly over transmission resources by additionally performing interleaving using a block interleaver to transmit the modulated control channels through the transmission resources. The invention can also reduce inter-cell interference by performing shifting using a cell-specific factor. The invention is not necessarily applied to a specific system and can be applied to base stations, relay stations, terminals, etc., of various wireless communication systems according to standards including 3GPP LTE, IEEE 802.16e, and IEEE 802.16m and various other standards compatible with these standards.

The invention claimed is:

1. A method for receiving a physical downlink control channel (PDCCH) in a mobile communication system, the method comprising:
   receiving at least one PDCCH at one or more OFDM symbols in a subframe,
   wherein the at least one PDCCH has been configured by:
      inputting one or more symbol groups to a block interleaver;
      outputting permuted symbol groups from the block interleaver;
      mapping the outputted symbol groups to resource elements allocated for the at least one PDCCH at the one or more OFDM symbols, and
   wherein the outputted symbol groups are cyclically shifted using a cell identifier.

2. The method according to claim 1, wherein the one or more symbol groups are written to the block interleaver in a row direction, and the one or more permuted symbol groups are read from the block interleaver in a column direction.

3. The method according to claim 1, wherein the performed symbol groups is permuted by using a specific permutation pattern.

4. The method according to claim 1, wherein a size of the block interleaver is determined according to a number of the cyclically shifted symbol groups transmitted in the subframe.

5. The method according to claim 4, wherein a number of rows of the block interleaver is determined based on a predetermined number of columns of the block interleaver and the number of the cyclically shifted symbol groups transmitted in the subframe.

6. A apparatus for receiving a physical downlink control channel (PDCCH) in a mobile communication system, the apparatus comprising:
a memory;
one or more reception antennas; and
a processor functionally connected with the memory and the one or more reception antennas,
wherein the processor is configured to receive at least one PDCCH at one or more OFDM symbols in a subframe,
wherein the at least one PDCCH has been configured by:
inputting one or more symbol groups to a block interleaver;
outputting permuted symbol groups from the block interleaver;
mapping the outputted symbol groups to resource elements allocated for the at least one PDCCH at the one or more OFDM symbols; and
wherein the outputted symbol groups are cyclically shifted using a cell identifier.

7. The apparatus according to claim 6, wherein the one or more symbol groups are written to the block interleaver in a row direction, and the one or more permuted symbol groups are read from the block interleaver in a column direction.

8. The apparatus according to claim 6, wherein the performed symbol groups is permuted by using a specific permutation pattern.

9. The apparatus according to claim 6, wherein a size of the block interleaver is determined according to a number of the cyclically shifted symbol groups transmitted in the subframe.

10. The apparatus according to claim 9, wherein a number of rows of the block interleaver is determined based on a predetermined number of columns of the block interleaver and the number of the cyclically shifted symbol groups transmitted in the subframe.

* * * * *